US012754796B2

(12) United States Patent
Mishra et al.

(10) Patent No.: US 12,754,796 B2
(45) Date of Patent: Oct. 6, 2026

(54) SELF-HEALING EDGE COMPUTING APPARATUSES AND DEPLOYMENTS USING DYNAMIC FAULT TREE-BASED DETECTION AND REMEDIATION

(71) Applicant: Armada Systems Inc., San Francisco, CA (US)

(72) Inventors: Pragyana Mishra, San Francisco, CA (US); Anish Swaminathan, San Francisco, CA (US)

(73) Assignee: Armada Systems Inc., San Francisco, CA (US)

( * ) Notice: Subject to any disclaimer, the term of this patent is extended or adjusted under 35 U.S.C. 154(b) by 0 days.

(21) Appl. No.: 18/934,683

(22) Filed: Nov. 1, 2024

(65) Prior Publication Data

US 2025/0138937 A1 May 1, 2025

Related U.S. Application Data

(60) Provisional application No. 63/595,216, filed on Nov. 1, 2023.

(51) Int. Cl.
*G06F 11/07* (2006.01)
*G06F 9/50* (2006.01)
*G06N 20/00* (2019.01)

(52) U.S. Cl.
CPC ........ *G06F 11/0793* (2013.01); *G06F 9/5083* (2013.01); *G06F 11/0751* (2013.01); *G06N 20/00* (2019.01)

(58) Field of Classification Search
CPC . G06F 9/5083; G06F 11/0793; G06F 11/0751
See application file for complete search history.

(56) References Cited

U.S. PATENT DOCUMENTS 7,610,269 B1 * 10/2009 Gupta ..................... G06F 16/00
10,419,106 B1 9/2019 Liu et al.
(Continued)

FOREIGN PATENT DOCUMENTS

CN 112685069 A 4/2021
CN 114358953 A 4/2022
(Continued)

OTHER PUBLICATIONS

Deng, R. et al. "Ultra-Dense LEO Satellite Based Formation Flying." IEEE Transactions on Communications 69 (2021): 3091-3105.
(Continued)

*Primary Examiner* — Jonathan D Gibson
(74) *Attorney, Agent, or Firm* — Polsinelli PC

(57) ABSTRACT

Systems and techniques are provided for self-healing at the edge. A plurality of faults can be detected for an edge device based on monitoring log information of the edge device, with remediation information indicative of remediation actions performed for individual faults or combinations of faults included in the plurality of faults. A hierarchical fault tree data structure can be generated mapping between the plurality of faults and the remediation information, each fault comprising root or child node of the fault tree, and each remediation action comprising a leaf node of the fault tree. An indication of one or more faults can be provided to a self-healing machine-learning or artificial intelligence engine configured to generate a corresponding fault remediation action based on traversing the hierarchical fault tree according to the indicated one or more faults. The fault remediation action can be output for self-healing of the indicated one or more faults.

16 Claims, 11 Drawing Sheets

(56) References Cited

U.S. PATENT DOCUMENTS

| | | | | |
|---|---|---|---|---|
| 10,776,409 | B2 * | 9/2020 | Dubyak | G06N 5/022 |
| 11,145,208 | B1 | 10/2021 | Nanda et al. | |
| 11,201,939 | B1 | 12/2021 | Mokashi et al. | |
| 11,238,849 | B1 | 2/2022 | Mimassi | |
| 11,322,017 | B1 | 5/2022 | Ghadiok et al. | |
| 11,392,447 | B2 * | 7/2022 | Spiro | G06F 18/23 |
| 11,405,801 | B1 | 8/2022 | Qureshi et al. | |
| 11,410,423 | B1 | 8/2022 | Naslavsky et al. | |
| 11,593,235 | B2 * | 2/2023 | Jayaram | G06F 11/2041 |
| 11,695,632 | B1 | 7/2023 | Zoualfaghari et al. | |
| 11,741,760 | B1 | 8/2023 | Dubin et al. | |
| 11,876,858 | B1 | 1/2024 | Nair et al. | |
| 11,907,093 | B1 | 2/2024 | Nair et al. | |
| 11,995,476 | B1 | 5/2024 | Datta et al. | |
| 12,034,801 | B1 | 7/2024 | Nair et al. | |
| 12,627,554 | B2 * | 5/2026 | Yao | H04L 41/0631 |
| 2005/0156715 | A1 | 7/2005 | Zou et al. | |
| 2009/0079555 | A1 | 3/2009 | Aguirre De Carcer et al. | |
| 2009/0249215 | A1 | 10/2009 | Paek | |
| 2012/0123951 | A1 | 5/2012 | Hyatt et al. | |
| 2012/0253862 | A1 | 10/2012 | Davidson | |
| 2015/0067400 | A1 * | 3/2015 | Ishii | G06F 11/0706 714/37 |
| 2015/0120749 | A1 | 4/2015 | Phanishayee et al. | |
| 2015/0262133 | A1 | 9/2015 | Banchero | |
| 2016/0093119 | A1 | 3/2016 | Ahn et al. | |
| 2016/0117059 | A1 | 4/2016 | Folken et al. | |
| 2016/0266739 | A1 | 9/2016 | Folken et al. | |
| 2017/0285623 | A1 | 10/2017 | Figoli et al. | |
| 2017/0351251 | A1 * | 12/2017 | Eeckhout | G05B 23/0283 |
| 2018/0025304 | A1 | 1/2018 | Fisher et al. | |
| 2018/0032915 | A1 | 2/2018 | Nagaraju et al. | |
| 2018/0082152 | A1 | 3/2018 | Katz et al. | |
| 2018/0341720 | A1 | 11/2018 | Bhatia et al. | |
| 2018/0356810 | A1 * | 12/2018 | Höfig | G06F 30/33 |
| 2019/0156246 | A1 | 5/2019 | Kuo et al. | |
| 2019/0210742 | A1 | 7/2019 | Satak et al. | |
| 2019/0212754 | A1 | 7/2019 | Smith | |
| 2019/0258747 | A1 | 8/2019 | Milev | |
| 2019/0370686 | A1 | 12/2019 | Pezzillo et al. | |
| 2020/0027033 | A1 | 1/2020 | Garg et al. | |
| 2020/0112612 | A1 | 4/2020 | Chandaria | |
| 2020/0136994 | A1 | 4/2020 | Doshi et al. | |
| 2020/0153623 | A1 | 5/2020 | Asanghanwa et al. | |
| 2020/0160207 | A1 | 5/2020 | Song et al. | |
| 2020/0198739 | A1 | 6/2020 | Sheldon-Coulson et al. | |
| 2020/0241953 | A1 * | 7/2020 | Ali | G06F 11/0787 |
| 2020/0267053 | A1 | 8/2020 | Zheng et al. | |
| 2020/0286020 | A1 | 9/2020 | Kobayashi et al. | |
| 2020/0349852 | A1 | 11/2020 | DiCosola | |
| 2020/0374974 | A1 | 11/2020 | Sun et al. | |
| 2020/0379805 | A1 | 12/2020 | Porter et al. | |
| 2020/0401891 | A1 | 12/2020 | Xu et al. | |
| 2021/0006636 | A1 | 1/2021 | Koehler et al. | |
| 2021/0108937 | A1 | 4/2021 | Fox et al. | |
| 2021/0112441 | A1 | 4/2021 | Sabella et al. | |
| 2021/0117859 | A1 | 4/2021 | Rogers et al. | |
| 2021/0124478 | A1 | 4/2021 | Reese et al. | |
| 2021/0136869 | A1 | 5/2021 | Radmand et al. | |
| 2021/0243232 | A1 | 8/2021 | Verma et al. | |
| 2021/0266225 | A1 | 8/2021 | Kozhaya et al. | |
| 2021/0304418 | A1 | 9/2021 | Soon-Shiong | |
| 2021/0360070 | A1 | 11/2021 | Cella et al. | |
| 2021/0392049 | A1 | 12/2021 | Jeuk et al. | |
| 2022/0012129 | A1 * | 1/2022 | Doshi | G06F 11/2038 |
| 2022/0015269 | A1 | 1/2022 | Xu et al. | |
| 2022/0019422 | A1 | 1/2022 | Anderson | |
| 2022/0035878 | A1 | 2/2022 | Sarah et al. | |
| 2022/0060455 | A1 | 2/2022 | Rosenstein et al. | |
| 2022/0066853 | A1 * | 3/2022 | He | G06F 11/0709 |
| 2022/0121556 | A1 | 4/2022 | Guim Bernat et al. | |
| 2022/0150125 | A1 | 5/2022 | Kumar et al. | |
| 2022/0172100 | A1 | 6/2022 | Balasubramanian et al. | |
| 2022/0197304 | A1 | 6/2022 | Cochran et al. | |
| 2022/0206868 | A1 | 6/2022 | Dreyer et al. | |
| 2022/0303280 | A1 | 9/2022 | Dance | |
| 2022/0326757 | A1 | 10/2022 | Sydir et al. | |
| 2022/0335837 | A1 | 10/2022 | Agyekum et al. | |
| 2022/0342649 | A1 | 10/2022 | Cao et al. | |
| 2022/0345518 | A1 | 10/2022 | Nicolo | |
| 2022/0353732 | A1 | 11/2022 | Filippou et al. | |
| 2022/0360957 | A1 | 11/2022 | Seawall et al. | |
| 2022/0383859 | A1 | 12/2022 | Mimassi | |
| 2022/0405157 | A1 | 12/2022 | Bender | |
| 2022/0410750 | A1 | 12/2022 | Mangal et al. | |
| 2023/0021216 | A1 | 1/2023 | Shilawat et al. | |
| 2023/0028338 | A1 | 1/2023 | Samuelsson et al. | |
| 2023/0044620 | A1 | 2/2023 | Shochat et al. | |
| 2023/0064472 | A1 | 3/2023 | Endel et al. | |
| 2023/0066765 | A1 | 3/2023 | Thomas et al. | |
| 2023/0069177 | A1 * | 3/2023 | Albright | G06F 11/3089 |
| 2023/0101308 | A1 | 3/2023 | Amano | |
| 2023/0141055 | A1 | 5/2023 | Kim et al. | |
| 2023/0147814 | A1 | 5/2023 | Carver et al. | |
| 2023/0164033 | A1 | 5/2023 | Lee et al. | |
| 2023/0171235 | A1 | 6/2023 | Chhibber et al. | |
| 2023/0205606 | A1 | 6/2023 | Palermo et al. | |
| 2023/0205994 | A1 | 6/2023 | Wei et al. | |
| 2023/0208510 | A1 | 6/2023 | Palermo et al. | |
| 2023/0229319 | A1 * | 7/2023 | Klein | G06F 3/0659 711/113 |
| 2023/0244470 | A1 | 8/2023 | Shimon et al. | |
| 2023/0280059 | A1 | 9/2023 | Khan et al. | |
| 2023/0300195 | A1 | 9/2023 | Sharma et al. | |
| 2023/0316927 | A1 | 10/2023 | Kumavat et al. | |
| 2023/0325725 | A1 | 10/2023 | Lester et al. | |
| 2023/0359600 | A1 | 11/2023 | Donthireddy et al. | |
| 2023/0360679 | A1 | 11/2023 | Sharma et al. | |
| 2023/0368281 | A1 | 11/2023 | Kobel et al. | |
| 2023/0368637 | A1 | 11/2023 | Ngala-Ngala et al. | |
| 2024/0019859 | A1 * | 1/2024 | Cheim | G05B 23/0275 |
| 2024/0070012 | A1 * | 2/2024 | Baldassarre | G06F 11/2025 |
| 2024/0134366 | A1 * | 4/2024 | Davis | G05B 15/02 |
| 2024/0248790 | A1 * | 7/2024 | Verma | G06F 11/0712 |
| 2025/0013524 | A1 * | 1/2025 | Patel | G06F 11/0793 |
| 2025/0086036 | A1 * | 3/2025 | Abdelhameed | B60W 50/0205 |
| 2025/0123915 | A1 * | 4/2025 | Sethi | G06N 20/00 |
| 2025/0138937 | A1 * | 5/2025 | Mishra | G06F 9/5083 |
| 2025/0156244 | A1 * | 5/2025 | Nair | H04B 7/18521 |
| 2025/0238023 | A1 * | 7/2025 | Mills | G06F 9/45558 |

FOREIGN PATENT DOCUMENTS

| | | | |
|---|---|---|---|
| EP | 0611500 | B1 | 7/1999 |
| EP | 3737003 | A1 | 11/2020 |
| WO | 2002007330 | A2 | 1/2002 |
| WO | 2020006160 | A1 | 1/2020 |
| WO | 2023220652 | A1 | 11/2023 |
| WO | 2024030685 | A2 | 2/2024 |
| WO | 2025053869 | A1 | 3/2025 |
| WO | 2025053870 | A1 | 3/2025 |
| WO | 2025053878 | A1 | 3/2025 |
| WO | 2025053879 | A1 | 3/2025 |
| WO | 2025090112 | A1 | 5/2025 |

OTHER PUBLICATIONS

Sharma, D., et al. "Enabling Inference and Training of Deep Learning Models for AI Applications on IoT Edge Devices." Internet of Things (2022): 17 pages.

Huang, L. et al. "Towards Elasticity in Heterogeneous Edge-dense Environments." 2022 IEEE 42nd International Conference on Distributed Computing Systems (ICDCS) (2022): 403-413.

Hsu, T.H. et al. "A Cloud-Edge-Smart IoT Architecture for Speeding Up the Deployment of Neural Network Models with Transfer Learning Techniques." Electronics (2022): 14 pages.

Huang, L. et al. "Armada: A Robust Latency-Sensitive Edge Cloud in Heterogeneous Edge-Dense Environments." ArXiv abs/2111.12002 (2021): 13 pages.

Abbas, K. et al. "Network Slice Lifecycle Management for 5G Mobile Networks: An Intent-Based Networking Approach." IEEE Access 9 (2021): 80128-80146.

(56) References Cited

OTHER PUBLICATIONS

Wang, H. et al. "Optimizing Federated Learning on Non-IID Data with Reinforcement Learning." IEEE Infocom 2020—IEEE Conference on Computer Communications (2020): 1698-1707.
Wang, N. et al. "ENORM: A Framework For Edge NOde Resource Management." IEEE Transactions on Services Computing 13 (2017): 1086-1099.
Xu, W. et al. "Accelerating Federated Learning for IoT in Big Data Analytics With Pruning, Quantization and Selective Updating." IEEE Access 9 (2021): 38457-38466.
Orescanin, M., et al., "Federated Fine-Tuning Performance on Edge Devices," 2021 20th IEEE International Conference on Machine Learning and Applications (ICMLA), Pasadena, CA, USA, 2021, pp. 1174-1181, doi: 10.1109/ICMLA52953.2021.00191.
International Search Report and Written Opinion mailed on Aug. 7, 2024, in International Patent Application No. PCT/US2024/014091, 11 pages.
Mohammadi, M., et al., "Deep Learning for IoT Big Data and Streaming Analytics: A Survey," in IEEE Communications Surveys & Tutorials, vol. 20, No. 4, pp. 2923-2960, Fourthquarter 2018, doi: 10.1109/COMST.2018.2844341.
Wu, D., et al., "A Fog Computing-based Framework for Process Monitoring and Prognosis in Cyber-Manufacturing", Journal of Manufacturing Systems, vol. 43, Apr. 2017, pp. 25-34, DOI:10.1016/j.jmsy.2017.02.011.
Nirmit, D., et al. "AI@Edge-Model Fingerprinting: Choosing the Right Model for the Edge and Knowing when the Model Doesn't Know", Medium, (2012), 12 pages.

* cited by examiner

SELF-HEALING EDGE COMPUTING APPARATUSES AND DEPLOYMENTS USING DYNAMIC FAULT TREE-BASED DETECTION AND REMEDIATION

CROSS-REFERENCE TO RELATED APPLICATIONS

This application claims the benefit of priority to U.S. Provisional Patent Application No. 63/595,216 filed Nov. 1, 2023 and entitled "RESILIENCY AND REDUNDANCY FOR SELF-HEALING EDGE COMPUTING APPARATUSES AND DEPLOYMENTS," the disclosure of which is hereby incorporated by reference in its entirety and for all purposes.

TECHNICAL FIELD

The present disclosure pertains to edge computing, and more specifically pertains to systems and techniques for implementing resiliency, redundancy, and self-healing for a containerized edge compute unit (e.g., a containerized edge data center unit).

BACKGROUND

Edge computing is a distributed computing paradigm that can be used to decentralize data processing and other computational operations by bringing compute capability and data storage closer to the edge (e.g., the location where the compute and/or data storage is needed, often at the "edge" of a network such as the internet). Edge computing systems are often provided in the same location where input data is generated and/or in the same location where an output result of the computational operations is needed. The use of edge computing systems can reduce latency and bandwidth usage, as data is ingested and processed locally at the edge and rather than being transmitted to a more centralized location for processing.

In many existing cloud computing architectures, data generated at endpoints (e.g., mobile devices, Internet of Things (IoT) sensors, robots, industrial automation systems, security cameras, etc., among various other edge devices and sensors) is transmitted to centralized data centers for processing. The processed results are then transmitted from the centralized data centers to the endpoints requesting the processed results. The centralized processing approach may present challenges for growing use cases, such as for real-time applications and/or artificial intelligence (AI) and machine learning (ML) workloads. For instance, centralized processing models and conventional cloud computing architectures can face constraints in the areas of latency, availability, bandwidth usage, data privacy, network security, and the capacity to process large volumes of data in a timely manner.

In the context of edge computing, the "edge" refers to the edge of the network, close to the endpoint devices and the sources of data. In an edge computing architecture, computation and data storage are distributed across a network of edge nodes that are near the endpoint devices and sources of data. The edge nodes can be configured to perform various tasks relating to data processing, storage, analysis, etc. Based on using the edge nodes to process data locally, the amount of data that is transferred from the edge to the cloud (or other centralized data center) can be significantly reduced. Accordingly, the use of edge computing has become increasingly popular for implementing a diverse range of AI and ML applications, as well as for serving other use cases that demand real-time processing, minimal latency, high availability, and high reliability.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for implementing resiliency and redundancy to hardware and/or software faults (and combinations thereof) that are detected for an edge computing device (e.g., a containerized data center apparatus). In some aspects, the systems and techniques can additionally, or alternatively, be used to provide self-healing of detected faults for the edge computing device, based on using one or more machine learning (ML) and/or artificial intelligence (AI) models. For instance, the one or more ML and/or AI models can be included in an ML/AI self-healing engine, as will be described in greater depth below.

According to at least one illustrative example, a method of automated and redundant provisioning is provided, where the method includes: obtaining configuration information corresponding to provisioning an edge device, wherein the edge device includes a plurality of nodes each associated with a respective rack of a plurality of racks; provisioning a first subset of the plurality of nodes as a management cluster for workloads deployed to the edge device, wherein the management cluster is provisioned based on the configuration information and includes multiple redundant management control plane nodes each distributed across different respective racks of the plurality of racks; and provisioning a workload cluster on a remaining portion of the plurality of nodes, wherein the workload cluster includes: multiple redundant workload control plane nodes each distributed across different respective racks of the plurality of racks; and a respective plurality of worker nodes provisioned on each rack of the plurality of racks.

In another illustrative example, an apparatus is provided. The apparatus includes at least one memory and at least one processor coupled to the at least one memory and configured to: obtain configuration information corresponding to provisioning an edge device, wherein the edge device includes a plurality of nodes each associated with a respective rack of a plurality of racks; provision a first subset of the plurality of nodes as a management cluster for workloads deployed to the edge device, wherein the management cluster is provisioned based on the configuration information and includes multiple redundant management control plane nodes each distributed across different respective racks of the plurality of racks; and provision a workload cluster on a remaining portion of the plurality of nodes, wherein the workload cluster includes: multiple redundant workload control plane nodes each distributed across different respective racks of the plurality of racks; and a respective plurality of worker nodes provisioned on each rack of the plurality of racks.

In another illustrative example, a non-transitory computer-readable storage medium is provided and comprises instructions stored thereon which, when executed by at least one processor, causes the at least one processor to: obtain configuration information corresponding to provisioning an edge device, wherein the edge device includes a plurality of nodes each associated with a respective rack of a plurality of racks; provision a first subset of the plurality of nodes as a management cluster for workloads deployed to the edge device, wherein the management cluster is provisioned based on the configuration information and includes multiple redundant management control plane nodes each distributed across different respective racks of the plurality of racks; and provision a workload cluster on a remaining portion of the plurality of nodes, wherein the workload cluster includes: multiple redundant workload control plane nodes each distributed across different respective racks of the plurality of racks; and a respective plurality of worker nodes provisioned on each rack of the plurality of racks.

In another illustrative example, an apparatus is provided. The apparatus includes: means for obtaining configuration information corresponding to provisioning an edge device, wherein the edge device includes a plurality of nodes each associated with a respective rack of a plurality of racks; means for provisioning a first subset of the plurality of nodes as a management cluster for workloads deployed to the edge device, wherein the management cluster is provisioned based on the configuration information and includes multiple redundant management control plane nodes each distributed across different respective racks of the plurality of racks; and means for provisioning a workload cluster on a remaining portion of the plurality of nodes, wherein the workload cluster includes: multiple redundant workload control plane nodes each distributed across different respective racks of the plurality of racks; and a respective plurality of worker nodes provisioned on each rack of the plurality of racks.

According to another illustrative example, a method of automatic fault detection and self-healing of detected faults for an edge computing device is provided, where the method includes: obtaining monitoring log information corresponding to an edge device and a plurality of connected edge assets associated with the edge device; detecting, based on the monitoring log information, a plurality of faults for the edge device or for one or more connected edge assets of the plurality of connected edge assets; obtaining remediation information indicative of one or more remediation actions performed for individual faults or combinations of faults included in the plurality of faults; generating a hierarchical fault tree data structure mapping between the plurality of faults and the remediation information, wherein each fault of the plurality of faults corresponds to a root node or child node of the fault tree, and wherein each remediation action corresponds to a leaf node of the fault tree; providing an indication of one or more faults to a self-healing machine-learning (ML) or artificial intelligence (AI) engine configured to generate a corresponding fault remediation action based on traversing the hierarchical fault tree according to the indicated one or more faults; and outputting the fault remediation action for self-healing of the indicated one or more faults.

In another illustrative example, an apparatus is provided. The apparatus includes at least one memory and at least one processor coupled to the at least one memory and configured to: obtain monitoring log information corresponding to an edge device and a plurality of connected edge assets associated with the edge device; detect, based on the monitoring log information, a plurality of faults for the edge device or for one or more connected edge assets of the plurality of connected edge assets; obtain remediation information indicative of one or more remediation actions performed for individual faults or combinations of faults included in the plurality of faults; generate a hierarchical fault tree data structure mapping between the plurality of faults and the remediation information, wherein each fault of the plurality of faults corresponds to a root node or child node of the fault tree, and wherein each remediation action corresponds to a leaf node of the fault tree; provide an indication of one or more faults to a self-healing machine-learning (ML) or artificial intelligence (AI) engine configured to generate a corresponding fault remediation action based on traversing the hierarchical fault tree according to the indicated one or more faults; and output the fault remediation action for self-healing of the indicated one or more faults.

In another illustrative example, a non-transitory computer-readable storage medium is provided and comprises instructions stored thereon which, when executed by at least one processor, causes the at least one processor to: obtain monitoring log information corresponding to an edge device and a plurality of connected edge assets associated with the edge device; detect, based on the monitoring log information, a plurality of faults for the edge device or for one or more connected edge assets of the plurality of connected edge assets; obtain remediation information indicative of one or more remediation actions performed for individual faults or combinations of faults included in the plurality of faults; generate a hierarchical fault tree data structure mapping between the plurality of faults and the remediation information, wherein each fault of the plurality of faults corresponds to a root node or child node of the fault tree, and wherein each remediation action corresponds to a leaf node of the fault tree; provide an indication of one or more faults to a self-healing machine-learning (ML) or artificial intelligence (AI) engine configured to generate a corresponding fault remediation action based on traversing the hierarchical fault tree according to the indicated one or more faults; and output the fault remediation action for self-healing of the indicated one or more faults.

In another illustrative example, an apparatus is provided. The apparatus includes: means for obtaining monitoring log information corresponding to an edge device and a plurality of connected edge assets associated with the edge device; means for detecting, based on the monitoring log information, a plurality of faults for the edge device or for one or more connected edge assets of the plurality of connected edge assets; means for obtaining remediation information indicative of one or more remediation actions performed for individual faults or combinations of faults included in the plurality of faults; means for generating a hierarchical fault tree data structure mapping between the plurality of faults and the remediation information, wherein each fault of the plurality of faults corresponds to a root node or child node of the fault tree, and wherein each remediation action corresponds to a leaf node of the fault tree; means for providing an indication of one or more faults to a self-healing machine-learning (ML) or artificial intelligence (AI) engine configured to generate a corresponding fault remediation action based on traversing the hierarchical fault tree according to the indicated one or more faults; and means for outputting the fault remediation action for self-healing of the indicated one or more faults.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), robotic unit (e.g., uncrewed ground vehicle, uncrewed aerial vehicle, articulated arm, visual inspection system, cobot, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

The term "network entity" or "base station" may refer to a single physical Transmission-Reception Point (TRP) or to multiple physical Transmission-Reception Points (TRPs) that may or may not be co-located. For example, where the term "network entity" or "base station" refers to a single physical TRP, the physical TRP may be an antenna of a base station (e.g., satellite constellation ground station/internet gateway) corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Because a TRP is the point from which a base station transmits and receives wireless signals, as used herein, references to transmission from or reception at a base station are to be understood as referring to a particular TRP of the base station. An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim. The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. The use of a same reference numbers in different drawings indicates similar or identical items or features. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
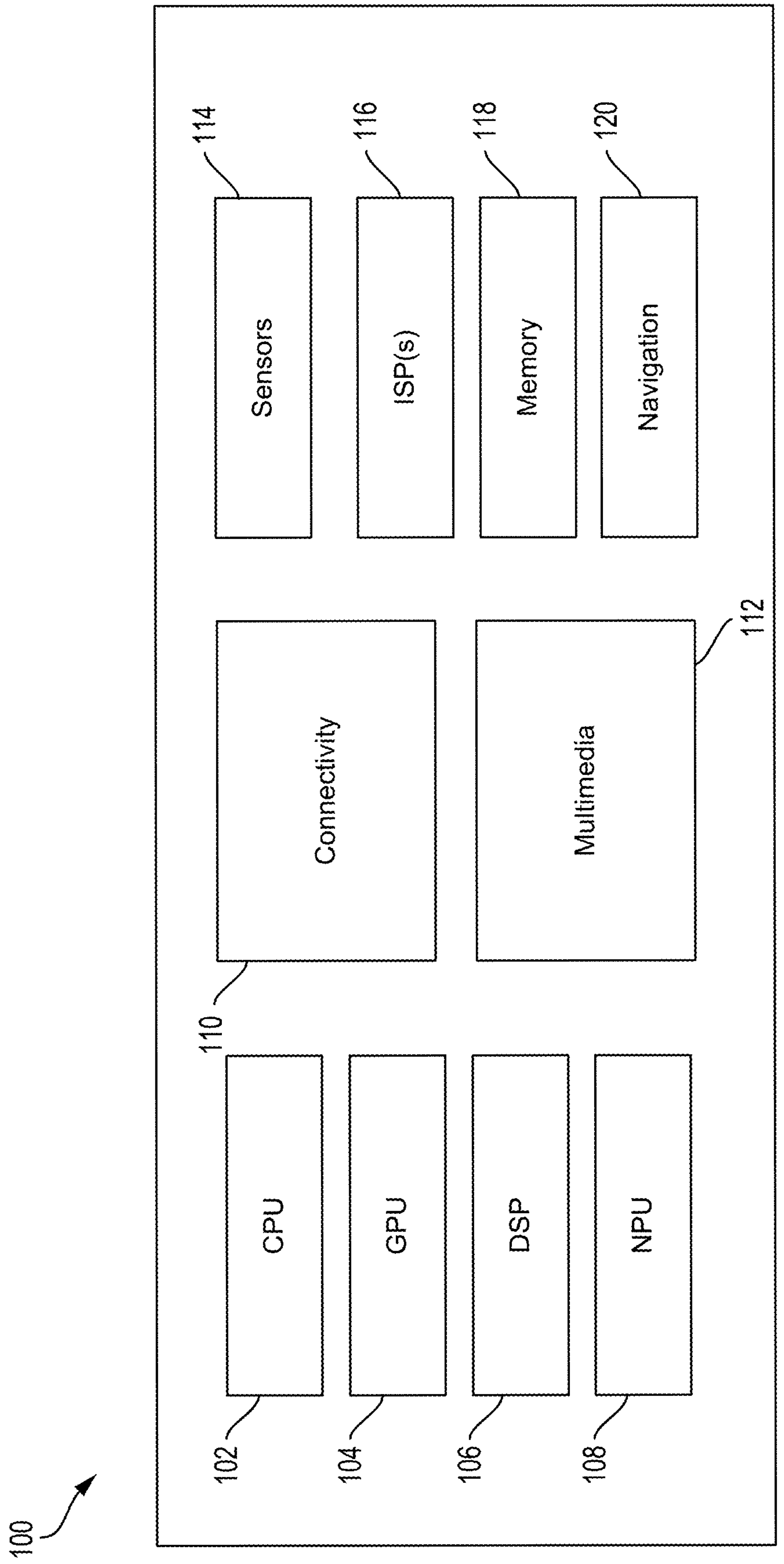
FIG. 1 illustrates an example implementation of a system-on-a-chip (SoC), in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive. The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Overview

Systems, apparatuses, methods (also referred to as processes), and computer-readable media (collectively referred to herein as "systems and techniques") are described herein for implementing resiliency and redundancy to hardware and/or software faults (and combinations thereof) that are detected for an edge computing device (e.g., a containerized data center apparatus). In some aspects, the systems and techniques can additionally, or alternatively, be used to provide self-healing of detected faults for the edge computing device, based on using one or more machine learning (ML) and/or artificial intelligence (AI) models. For instance, the one or more ML and/or AI models can be included in an ML/AI self-healing engine, as will be described in greater depth below.

In some embodiments, a containerized data center apparatus (interchangeably referred to herein as an "edge compute unit") can include and/or implement a software stack that is configured to provide resiliency to various hardware faults, software faults, and/or combinations thereof. In one illustrative example, the resiliency can be implemented at the time of provisioning of one or more logical or physical nodes included in respective server racks (of a plurality of server racks) included in an edge compute unit. For instance, the resiliency in the software stack can be based on hardware provisioning performed for an edge compute unit prior to deployment of the edge compute unit to an edge site or edge location. In some embodiments, the provisioning-based (e.g., provisioning-enabled) resiliency and redundancy implementations described herein can be provided at a time of manufacture, assembly, or final configuration of an edge compute unit for deployment to an edge site or edge location where the edge compute unit will be deployed to perform various high-performance computing tasks, ML tasks, AI tasks, etc.

In another illustrative example, the systems and techniques described herein can provide self-healing features and/or capabilities for an edge compute unit, based on using an ML/AI-based self-healing engine implemented by or for an edge computing unit. The self-healing can be performed to remediate at least a first subset of detected faults in a fully automated manner (e.g., automatically detecting the fault, automatically determining one or more appropriate or optimal remediation actions for resolving the automatically detected fault, and implementing the one or more remediation actions in hardware and/or software of the edge compute unit to resolve the fault). The self-healing can additionally, or alternatively, be performed to remediate at least a second subset of detected faults in a partially automated manner-such as for faults that require manual or human actions to be performed for remediation. For instance, the self-healing ML/AI engine can automatically detect and determine the remediation actions for such class of faults, and may implement at least a portion of the remediation action that is automatable, while providing an output recommendation or indication to a human user for performing the required physical action(s) or component(s) of the automatically generated remediation action(s). In another example, the self-healing ML/AI engine can detect a fault that requires fully physical (e.g., manual, physical, etc.) intervention in order to achieve remediation. In such cases, the self-healing ML/AI engine of the edge compute unit can detect and generate the recommended optimal remediation actions for the fault without human intervention, and generate an output to one or more users indicative of the required, recommended, optimal, etc., manual/physical intervention for resolving the detected fault(s).

Further details regarding the systems and techniques described herein will be discussed below with respect to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system. In some examples, the sensor processor 114 can be associated with or connected to one or more sensors for providing sensor input(s) to sensor processor 114. For example, the one or more sensors and the sensor processor 114 can be provided in, coupled to, or otherwise associated with a same computing device.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected. SOC 100 and/or components thereof may be configured to perform image processing using machine learning techniques according to aspects of the present disclosure discussed herein. For example, SOC 100 and/or components thereof may be configured to perform semantic image segmentation and/or object detection according to aspects of the present disclosure.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can be an output of applying one or more filters, kernels, weights, or the like to an input. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figures 2A, 2B:
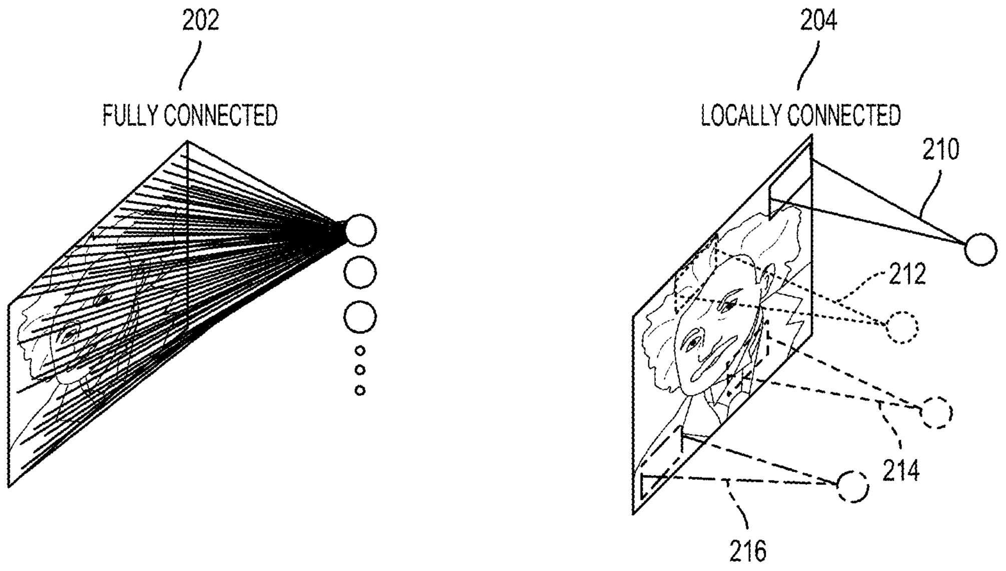
FIG. 2A illustrates an example of a fully connected neural network, in accordance with some examples.
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, as the higher layer neurons in a given region may receive inputs that are tuned through training to the properties of a restricted portion of the total input to the network.

EXAMPLE EMBODIMENTS

As noted previously above, the use of edge computing has become increasingly popular for implementing a diverse range of AI and ML applications, as well as for serving other use cases that demand real-time processing, minimal latency, high availability, and high reliability. Systems, apparatuses, methods (also referred to as processes), and computer-readable media (collectively referred to herein as "systems and techniques") are described herein for a containerized data center apparatus that can be used to provide resilient and self-contained high-performance computing at the edge (e.g., edge computing). The containerized data center apparatus can also be referred to herein as a "containerized data center unit," a "containerized edge data center," an "edge compute unit," etc.

In some aspects, the systems and techniques can be used to implement resiliency and redundancy for an edge compute unit, based on provisioning a control plane for a management cluster across multiple redundant nodes that are each located on a different rack of or within the edge compute unit. For instance, an edge compute unit can include a plurality of racks of compute hardware (e.g., a plurality of server racks), where each rack includes a plurality of nodes. A management cluster can be implemented using multiple control plane nodes and multiple worker bodes. For instance, the management cluster (MC) control plane can include a first MC control plane node located on a first rack of the edge compute unit, a second (redundant) MC control plane node located on a second rack of the edge compute unit, a third (redundant) MC control plane node located on a third rack of the edge compute unit, etc., where the first, second, third, . . . , etc., racks are each different and distinct from one another. A workload cluster can be implemented for the edge compute unit by provisioning the remaining nodes of the edge compute unit racks as either workload cluster (WC) control plane nodes or WC worker nodes. For example, a first workload cluster (WC) control plane node can be located on a first rack of the edge compute unit, a second (redundant) WC control plane node can be located on a second rack of the edge compute unit, a third (redundant) WC control plane node can be located on a third rack of the edge compute unit, . . . , etc., where the first, second, and third racks used to implement the WC control plane nodes are each different and distinct from one another.

In some aspects, a given rack of the plurality of racks included in the edge compute unit may include a maximum of one control plane node, either from the management cluster or the workload cluster, but not both (e.g., each rack includes either one MC control plane node, one WC control plane node, or no control plane nodes). In other examples, a given rack of the plurality of racks may implement zero control plane nodes, one control plane node (either an MC control plane node or a WC control plane node), or multiple control plane nodes (e.g., one or more MC control plane nodes, or one or more WC control plane nodes, or a combination thereof, etc.). These and further aspects of the systems and techniques for resiliency, redundancy, and/or ML/AI-based self-healing implementations for edge compute units will be described in greater detail below with respect to FIGS. 8-10.

Figure 3A:
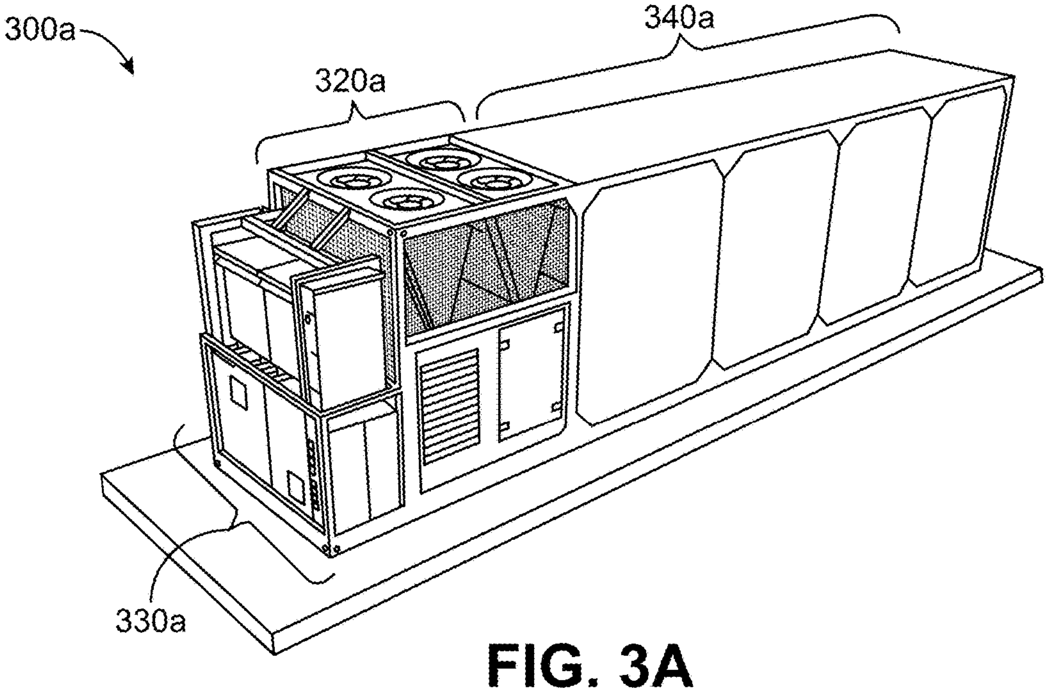
FIG. 3A is a diagram illustrating an example perspective view of a containerized data center unit for edge computing deployments, in accordance with some examples.
Figure 3B:
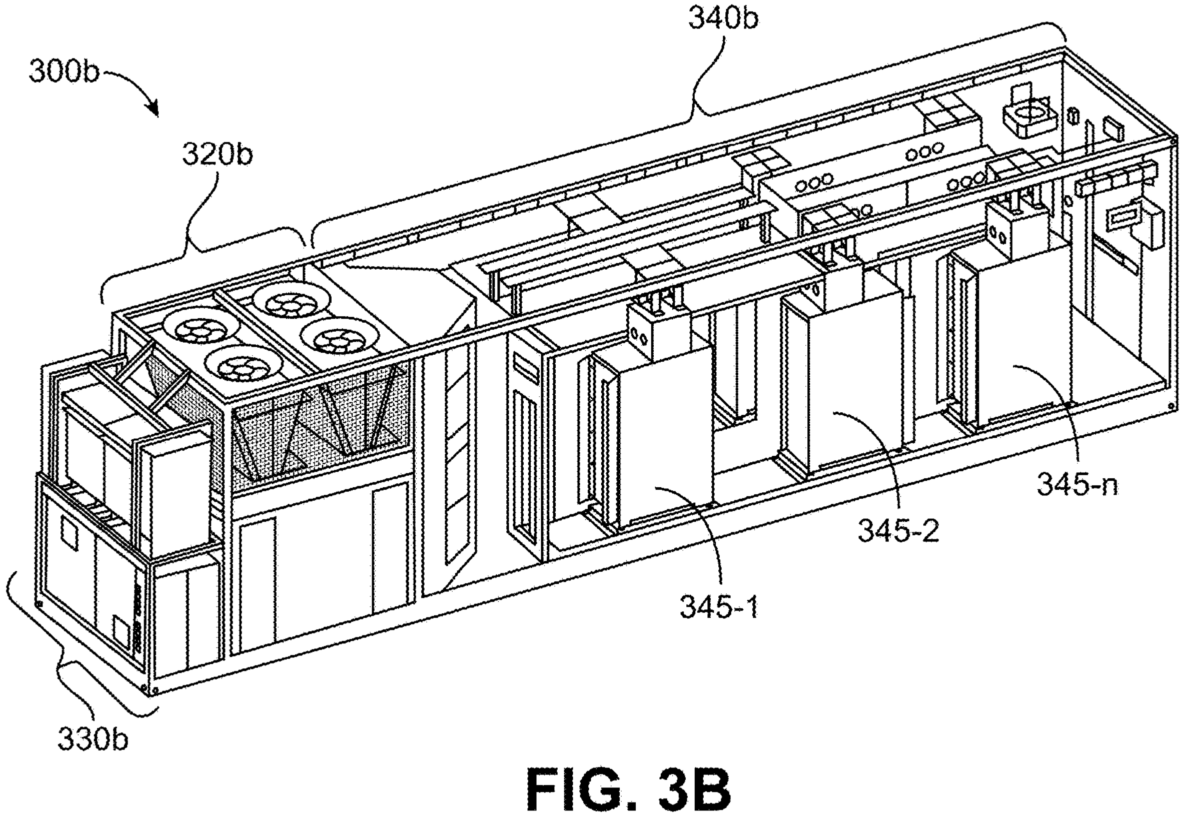
FIG. 3B is a diagram illustrating an interior perspective view of a containerized data center unit for edge computing deployments, in accordance with some examples.

The disclosure turns first to FIGS. 3A and 3B. In particular, FIG. 3A is a diagram illustrating an example perspective view of a containerized data center unit 300*a* for edge computing deployments, in accordance with some examples; and FIG. 3B is a diagram illustrating an interior perspective view of a containerized data center unit 300*b* for edge computing deployments, in accordance with some examples. In some embodiments, the containerized edge data center unit 300*a* of FIG. 3A can be the same as or similar to the containerized edge data center unit 300*b* of FIG. 3B.

As illustrated, the containerized edge data center unit 300*a* of FIG. 3A can include power distribution components 330*a* (e.g., also referred to as a power distribution system or module 330*a*), cooling or HVAC components 320*a* (e.g., also referred to as cooling/HVAC system or module 320*a*), and compute components or hardware 340*a* (e.g., also referred to as compute system or module 340*a*). Similarly, the containerized edge data center unit 300*b* of FIG. 3B can include power distribution components 330*b* that are the same as or similar to the power distribution components 330*a* of FIG. 3A; cooling/HVAC components 320*b* that are the same as or similar to the cooling/HVAC components 320*a* of FIG. 3A; and compute components 340*b* that are the same as or similar to the compute components 340*a* of FIG. 3A.

As used herein, for purposes of the following description and discussion, the containerized edge data center unit 300*a* of FIG. 3A and the containerized edge data center unit 300*b* of FIG. 3B are collectively referred to herein using the reference numeral "400." For instance, the containerized edge data center unit 300 may refer to the containerized edge data center unit 300*a* of FIG. 3A only, the containerized edge data center unit 300*b* of FIG. 3B only, either one of the containerized edge data center unit 300*a* of FIG. 3A or the containerized edge data center unit 300*b* of FIG. 3B, and/or both of the containerized edge data center unit 300*a* of FIG. 3A and the containerized edge data center unit 300*b* of FIG. 3B, etc.

Likewise, power distribution components or module 330 can collectively refer to one of or both the power distribution module 330*a* or 330*b*; cooling/HVAC module 320 can collectively refer to one of or both the cooling/HVAC module 320*a* or 320*b*; and compute module 340 can collectively refer to one of or both the compute module 340*a* or 340*b*.

The containerized edge data center 300 can be configured to deliver enterprise-grade performance in remote environments with limited infrastructure and operations support. For instance, given remote deployment siting/locations, service calls (break-fix) service-level agreements (SLAs) may commonly extend to 24 hours or greater—and high-performance edge computing instances typically have a downtime tolerance that is significantly less than the service call or SLA window. Accordingly, it is contemplated that the containerized edge data center can be implemented with resiliency and redundancy to minimize or eliminate downtime, even in remote deployment locations, such that high-performance edge computing can be maintained without modification of existing service call or SLA response times. The containerized edge data center can provide deployment versatility in locales without constant (e.g., 24×7) support staff, without dedicated or conditioned spaces (e.g., without concrete pads, warehousing, sheltering, etc.), among various other deployment scenarios that typically are challenging for high-performance computing.

Critical infrastructure components of the containerized edge data center 300 can include one or more (or all) of the power distribution module 330, the cooling/HVAC module 320, and/or the compute module 340. Critical infrastructure may additionally, or alternatively, include HVAC, power distribution, control systems, environmental monitoring and control, etc. In one illustrative example, critical infrastructure components may be selected based upon ease and/or modularity of assembly, as well as constituent materials quality, so as to reduce or eliminate common failure modes that may be associated with conventional edge computing deployments. Sub-systems of the containerized edge data center 300 can include at least a portion of (or all of) one or more of the power distribution module 330, the cooling/HVAC module 320, and/or the compute module 340. In some embodiments, sub-systems of the containerized edge data center unit 300 can be selected based on serviceability by ubiquitous mechanical and electrical trades (e.g., containerized edge data center unit 300 can be designed to be serviceable in the field and/or at remote edge locations, without requiring specialized equipment, tools, knowledge, training, etc.).

In some aspects, containerized edge data center unit 300 can be implemented using a containerized and structural design (inside and out) that assumes or is at least compatible with a multiple deployment scenario or configuration (e.g., in which a particular containerized edge data center unit 300 is one of a plurality of containerized edge data center units 300 that are deployed within and included in an enterprise user's fleet). In some embodiments, the compute module 340 can include a plurality of compute hardware racks (e.g., 2x, 3x, 4x, 6x, etc., 42U (or other size) racks). In some embodiments, each server rack within the compute module 340 can be configured with base-isolation on a per-rack level to provide isolation on some (or all) compute and networking hardware during both shipping/transportation as well as during deployment at the remote edge location.

In some examples, commodity and/or third-party compute, storage, and/or networking hardware can be utilized to provide various hardware configurations of the containerized edge data center units 300. For instance, third-party or commodify bare metal components can be used as a baseline hardware configuration for the compute, storage, and/or networking hardware of the containerized edge data center units 300, and may be integrated with the ISO-conformal containerized housing at the time of manufacture. In some aspects, different configurations of the hardware of containerized edge data center units 300 can be provided, as noted previously above, based on factors such as industry use-case, edge deployment site or location characteristics, existing infrastructure and utility support or availability, etc. In some aspects, some (or all) of the hardware configuration for one or more of the power distribution components 330, cooling/HVAC components 320, and/or compute components 340 can be customizable based on configuration or selection preferences indicated by an end user or customer that will take delivery of a particular containerized edge data center unit 300. For example, an end user or customer request corresponding to a particular hardware configuration of a containerized edge data center unit 300 may correspond to a request for hyperconverged infrastructure (e.g., Dell, HP, Azure, etc., among various other examples). In some embodiments, at least a portion of the hardware components of the containerized edge data center unit 300 (e.g., at least a portion of one or more of the power distribution module 330, cooling/HVAC module 320, compute module 340, and/or various other systems or modules such as command and control, critical systems or environmental monitoring, etc.) may be custom-designed at the chassis and/or silicon layers of the containerized edge data center unit 300, thereby providing cost and/or performance advantages over commodity or third-party hardware implementations of like components.

A containerized edge data center unit 300 can be preconfigured at the factory (e.g., at the time of manufacture or end user build-out) with the corresponding communications hardware and/or software to support multiple and various types, modes, modalities, etc., of wired and/or wireless communication. For instance, the containerized edge data center unit 300 can include one or more networked communications modules to provide backhaul connectivity (e.g., from the containerized edge data center unit 300 to a cloud or public network such as the internet, etc.) and can include one or more networked communications modules to provide local network connectivity between the containerized edge data center unit 300 and one or more edge sensors or edge assets that are collocated with the containerized edge data center unit 300 at the same edge deployment site or location.

In one illustrative example, the containerized edge data center unit 300 can use a first set of one or more networked communications modules to provide wired or wireless backhaul data network connectivity. For instance, the backhaul can be an internet backhaul, which may be implemented using one or more of a fiber communication link (e.g., wired fiber optic connectivity from the local site/edge compute unit 300 to internet infrastructure that is connectable to a desired remote location or server; a direct or point-to-point wired fiber optic connectivity from the local site/edge compute unit 300 to the desired remote location or server; etc.). The internet backhaul may additionally, or alternatively, be implemented using one or more satellite communication links. For instance, internet backhaul can be a wireless communication link between edge compute unit 300 and a satellite of a satellite internet constellation. In some aspects, it is contemplated that the edge compute unit 300 can include (or otherwise be associated with) one or more satellite transceivers for implementing satellite connectivity to and/or from the edge compute unit 300. In some aspects, the one or more satellite transceivers can be integrated in or coupled to a housing (e.g., container, where edge compute unit 300 is a containerized data center) of the edge compute unit 300 and used to provide satellite connectivity capable of implementing the internet backhaul network capability. In another example, the one or more satellite transceivers can additionally, or alternatively, be provided at the local edge site where edge compute unit 300 is deployed.

The containerized edge data center unit 300 can use a second set of one or more networked communications modules to provide wired or wireless local data network connectivity between the containerized edge data center unit and various sensors, edge assets, IoT devices, and various other computing devices and/or networked devices that are associated with the same edge site deployment location as the containerized edge data center unit 300. For instance, A local network connectivity module can be used to provide one or more communication links between the edge compute unit 300 and respective ones of a plurality of edge assets/sensors/devices etc. In one illustrative example, a local network connectivity module of the containerized edge compute unit 300 can be used to implement local network connectivity based on a private LTE, 3G, 5G or other private cellular network; based on a public LTE, 3G, 5G or other public cellular network; based on a WiFi, Bluetooth, Zigbee, Z-wave, Long Range (LoRa), Sigfox, Narrowband-IoT (NB-IoT), LTE for Machines (LTE-M), IPv6 Thread, or other short-range wireless network; based on a local wired or fiber-optic network; etc. The edge compute unit 300 can receive different types of data from different ones of the edge assets/sensors collocated at the same edge location (or otherwise associated with and communicatively coupled with the containerized edge compute unit 300) and can transmit different types of configurations/controls to different ones of the edge assets/sensors. For instance, the edge compute unit 300 can receive onboard camera feed and other sensor information (including SLAM sensor information) from one or more autonomous robots, drones, etc., and can transmit in response routing instructions to the autonomous robots or drones etc. in response. The routing instructions can be generated or otherwise determined based on processing the onboard camera feed data from the autonomous robots using an appropriate one (or more) trained AI/ML models deployed on or to the containerized edge compute unit 300 (e.g., deployed on or to the compute module 340).

In some embodiments, the compute module 340 of the containerized edge data center unit 300 can be configured as a combined compute and networking module or unit. The compute module/networking unit 340 of the containerized edge data center unit 300 can include computing hardware for providing edge computing and/or data services at the containerized edge data center unit 300. In one illustrative example, the compute/networking unit 340 (referred to interchangeably as a "compute unit" or a "networking unit" herein) can include a plurality of servers and/or server racks. As depicted in FIGS. 3A-B, the compute unit 340 can include a first server rack 345-1, a second server rack 345-2, . . . , and an $n^{th}$ server rack **345-*n***. The server racks can each include same or similar hardware. In some embodiments, different server racks of the plurality of server racks can each be associated with different hardware configurations.

In some embodiments, the server racks 345-1, . . . , **345-*n* can be implemented as conventional vertical server racks in which individual servers are vertically stacked atop one another. In other examples, the server racks 345-1, . . . , 345-*n* can be provided in a more horizontally distributed manner, either without maximizing the total available vertical space within the containerized housing of the edge compute unit 300 or with minimal vertical stacking of servers (or even no vertical stacking of servers). For instance, the server racks 345-1, . . . , 345-*n* may, in some aspects or implementations, comprise flattened implementations of standard vertical server racks, with a plurality of servers and/or motherboards spatially distributed across the horizontal surface area of the floor of the containerized housing of the edge compute unit 300. In some embodiments, each respective one of the server racks 345-1, . . . , 345-*n* (and/or some or all of the constituent servers or motherboards of each server rack, etc.) can be associated with or otherwise coupled to a corresponding one or more heatsinks and/or cooling means (e.g., included in the cooling/HVAC module(s) 320, etc.) for efficiently dissipating waste heat and maintaining high-performance computation. In some aspects, the server racks 345-1, . . . , 345-*n* may be implemented using horizontally distributed motherboards spread out along the bottom surface of the containerized housing of the containerized edge data center unit 300** and coupled to corresponding heatsinks on the bottom surface of the containerized housing.

Further details of example server rack 345-1, . . . , **345-*n* configurations within the containerized housing of the containerized edge data center unit 300 will be described below with respect to the remaining figures. In one illustrative example, it is contemplated that that the compute module 340 can be configured to provide a plurality of 32U (42** rack unit) server racks at a maximum power load of 20 KW (and/or a density-managed maximum power load, as will also be described in greater depth below).

In general, it is contemplated that the compute module 340 and/or the constituent server racks 345-1, . . . , **345-*n* can be configured to include various combinations of CPUs, GPUs, NPUs, ASICs, and/or various other computing hardware associated with a particular deployment scenario of the containerized edge computing apparatus 300. In some embodiments, the compute/networking unit 340 can include one or more data storage modules, which can provide onboard and/or local database storage using HDDs, SSDs, or combinations of the two. In some aspects, one or more server racks (of the plurality of server racks 345-1, . . . , 345-*n*) can be implemented either wholly or partially as data storage racks. In some examples, each respective server rack of the plurality of server racks 345-1, . . . , 345-*n* can include at least one data storage module, with data storage functionality distributed across the plurality of server racks 345-1, . . . , 345-*n*-*n*. In some embodiments, the compute/networking unit 340** can be configured to include multiple petabytes of SSD and/or HDD data storage, although greater or lesser storage capacities can also be utilized without departing from the scope of the present disclosure.

In some aspects, commodity-grade networking switches and/or network switching hardware can be included in the containerized edge data center unit 300 and used to support multiple connectivity modes and platforms (e.g., satellite internet constellation, ethernet/trench fiber, 5G or cellular), such that the containerized edge compute unit 300 is highly flexible and adaptable to all remote site conditions, bandwidth fluctuations, etc.

For instance, one or more communications or networking modules of the containerized edge data center unit 300 can be used to perform wired and/or wireless communications over one or more communications media or modalities. For example, a communications or networking module of the containerized edge data center unit 300 can be used to implement a data downlink (DL) and a data uplink (UL), for both internet/backhaul communications and for local network communications. In one illustrative example, a communications/networking module of the containerized edge data center unit 300 can include one or more satellite transceivers (e.g., also referred to herein as satellite dishes), such as a first satellite dish/transceiver and a second satellite dish/transceiver. In some embodiments, each respective satellite transceiver of the one or more satellite transceivers can be configured for bidirectional communications (e.g., capable of receiving via data downlink and capable of transmitting via data uplink). In some aspects, a first satellite transceiver may be configured as a receiver only, with a remaining satellite transceiver configured as a transmitter only. Each of the satellite transceivers of the containerized edge data center unit 300 can communicate with one or more satellite constellations.

In some embodiments, a communications module of the containerized edge data center unit 300 can include an internal switching, tasking, and routing sub-system that is communicatively coupled to the networked communications modules and used to provide a network link thereof to the containerized edge data center unit 300. Although not illustrated, it is appreciated that the communications module and/or the internal switching, tasking, and routing sub-system(s) thereof can be configured to provide network links to one or more (or all) of the remaining components of the containerized edge data center unit 300, for example to provide control commands from a remote user or operator. In some cases, the communications module can include one or more antennas and/or transceivers for implementing communication types other than the satellite data network communications implemented via the one or more satellite transceivers and associated satellite internet constellations. For instance, the communications module(s) of the containerized edge data center unit 300 can include one or more antennas or transceivers for providing beamforming radio frequency (RF) signal connections. In some embodiments, beamforming RF connections can be utilized to provide wireless communications between a plurality of containerized edge data center units 300 that are within the same general area or otherwise within radio communications range. In some examples, a plurality of beamforming RF connections formed between respective pairs of the containerized edge data center units 300 can be used as an ad-hoc network to relay communications to a ground-based internet gateway. For example, beamforming RF radio connections can be used to relay communications from various containerized edge data center units 300 to one or more ground-based internet gateways that would otherwise be reachable via the satellite internet constellation (e.g., beamforming RF radio relay connections can be used as a backup or failover mechanism for the containerized edge data center unit 300 to reach an internet gateway when satellite communications are unavailable or otherwise not functioning correctly). In some aspects, local radio connections between the containerized edge data center units 300 can be seen to enable low latency connectivity between a plurality (e.g., a fleet) of the containerized edge data center units 300 deployed within a given geographical area or region.

In one illustrative example, various functionalities described above and herein with respect to the containerized edge data center unit 300 can be distributed over the particular units included in a given fleet. For instance, each containerized edge data center unit 300 may include an RF relay radio or various other transceivers for implementing backhaul or point-to-point links between the individual units included in the fleet. However, in some examples only a subset of the containerized edge data center units 300 included in a fleet may need to be equipped with satellite transceivers for communicating with a satellite internet constellation. For instance, a containerized edge data center unit 300 that does not include satellite transceivers may nevertheless communicate with the satellite internet constellation by remaining within RF relay range of one or more containerized edge data center units 300 that do include a satellite transceiver.

Figure 4:
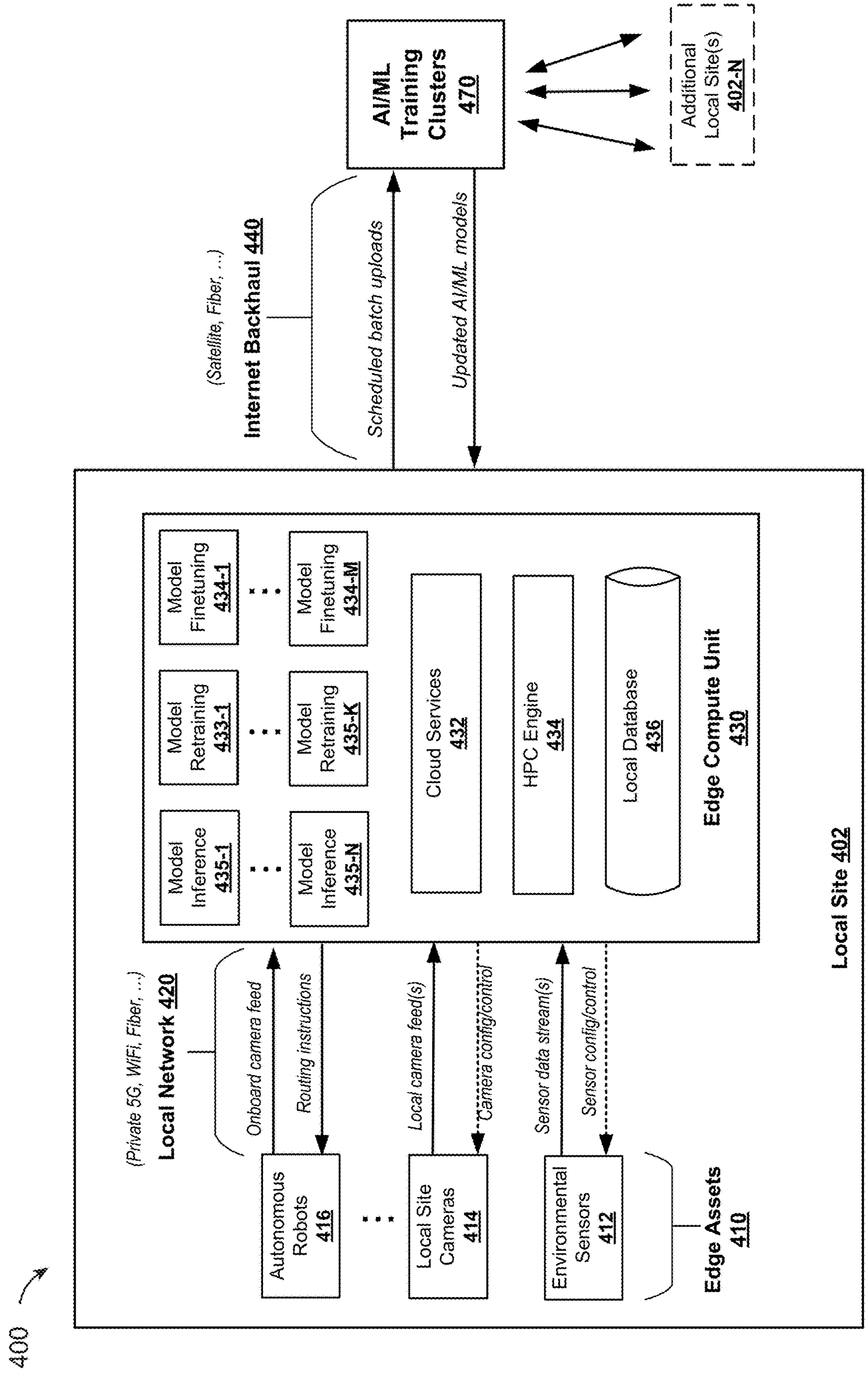
FIG. 4 is a diagram illustrating an example of an edge computing system for machine learning (ML) and/or artificial intelligence (AI) workloads, where the edge computing system includes one or more local sites each having one or more edge compute units, in accordance with some examples.

FIG. 4 is a diagram illustrating an example of an edge computing system 400 that can be used to implement or perform one or more aspects of the present disclosure. For example, the systems and techniques for real-time search and retrieval of streaming sensor data can be performed at a local edge site (e.g., edge environment) 402, using one or more edge compute units 430. In some embodiments, the edge compute unit 430 can also be referred to as an "edge device." In some aspects, edge compute unit 430 can be provided as a high-performance compute and storage (HPCS) and/or elastic-HPCS (E-HPCS) edge device.

For example, a local site 402 can be one of a plurality of edge environments/edge deployments associated with edge computing system 400. The plurality of local sites can include the local site 402 and some quantity N of additional local sites 402-N, each of which may be the same as or similar to the local site 402. The local site 402 can be a geographic location associated with an enterprise user or other user of edge computing. The local site 402 can also be an edge location in terms of data network connectivity (i.e., edge environment 402 is both a local geographic location of an enterprise user and is an edge location in the corresponding data network topography).

In the example of FIG. 4, the edge environment 402 includes one or more edge compute units 430. Each edge compute unit 430 can be configured as a containerized edge compute unit or data center for implementing sensor data generation or ingestion and inference for one or more trained ML/AI models provided on the edge compute unit 430. For instance, edge compute unit 430 can include computational hardware components configured to perform inference for one or more trained AI/ML models. As illustrated, a first portion of the edge compute unit 430 hardware resources can be associated with or used to implement inference for a first AI/ML model 435-1, . . . , and an $N^{th}$ AI/ML model 435-N. In other words, the edge compute unit 430 can be configured with compute hardware and compute capacity for implementing inference using a plurality of different AI/ML models. Inference for the plurality of AI/ML models can be performed simultaneously or in parallel for multiple ones of the N AI/ML models 435-1, . . . 435-N. In some aspects, inference can be performed for a first subset of the N AI/ML models for a first portion of time, can be performed for a second subset of the N AI/ML models for a second portion of time, etc. The first and second subsets of the AI/ML models can be disjoint or overlapping.

In some aspects, the edge compute unit 430 can be associated with performing one or more (or all) of on-premises training (or retraining) of one or more AI/ML models of the plurality of AI/ML models, performing fine-tuning of one or more AI/ML models of the plurality of AI/ML models, and/or performing instruction tuning of one or more AI/ML models of the plurality of AI/ML models. For instance, a subset of the plurality of AI/ML models that are deployed to (or are otherwise deployable to) the edge compute unit 430 may be trained or fine-tuned on-premises at the local edge site 402, without any dependence on the cloud (e.g., without dependence on the cloud-based AI/ML training clusters implemented within the cloud user environment 470). In some aspects, the edge compute unit 430 can perform the on-premises training or retraining, fine-tuning, and/or instruction tuning of the one or more AI/ML models of the plurality of AI/ML models to account for model degradation or drift over time. In some examples, the edge compute unit 430 can perform the one-premises training or retraining, fine-tuning, and/or instruction tuning of the one or more AI/ML models of the plurality of AI/ML models in order to adapt a respective AI/ML model to a new or differentiated task from which the respective model was originally trained (e.g., pre-trained).

In some cases, fine-tuning of an AI/ML model can be performed in the cloud (e.g., using the cloud-based AI/ML training clusters implemented within the cloud user environment 470), can be performed at the edge (e.g., at local edge environment 402, using edge compute unit 430 and AI/ML model finetuning 434-1, . . . , 434-M), and/or can be performed using a distributed combination over the cloud and one or more edge compute units 430. In some cases, fine-tuning of an AI/ML model can be performed in either the cloud or the edge environment 402 (or both), based on the use of significantly less compute power and data to perform finetuning and/or instruction tuning of a trained AI/ML model to a specific task, as compared to the compute power and data needed to originally train the AI/ML model to either the specific task or a broader class of tasks that includes the specific task.

In some embodiments, edge compute unit 430 can include computational hardware components that can be configured to perform training, retraining, finetuning, etc., for one or more trained AI/ML models. In some aspects, at least a portion of the computational hardware components of edge compute unit 430 used to implement the AI/ML model inference 435-1, . . . , 435-N can also be utilized to perform AI/ML model retraining 433-1, . . . , 433-K and/or to perform AI/ML model finetuning 434-1, . . . , 434-M. For example, computational hardware components (e.g., CPUs, GPUs, NPUs, hardware accelerators, etc.) included in the edge compute unit 430 may be configured to perform various combinations of model inference, model retraining, and/or model finetuning at the edge (e.g., at the local edge site 402). At least a portion of the K AI/ML models 433-1, . . . , 433-K associated with model retraining at the edge can be included in the N AI/ML models associated with model inference at the edge. Similarly, at least a portion of the M AI/ML models 434-1, . . . , 434-M associated with model finetuning at the edge can be included in the N AI/ML models associated with model inference at the edge.

In some embodiments, for a given pre-trained AI/ML model received at the edge compute unit 430 (e.g., received from the AI/ML training clusters in the cloud user environments 470), the edge compute unit 430 can be configured to perform one or more (or all) of model inference 435, model retraining 433, and/or model finetuning 434 at the edge.

As illustrated in FIG. 4, retraining for a plurality of AI/ML models can be performed simultaneously or in parallel for multiple ones of the K AI/ML models 433-1, . . . , 435-K (which as noted above can be the same as or similar to the N AI/ML models 435-1, . . . , 435-N, or may be different; and/or can be the same as or similar to the M AI/ML models 434-1, . . . , 434-M, or may be different). In some aspects, retraining can be performed for a first subset of the K AI/ML models for a first portion of time, can be performed for a second subset of the K AI/ML models for a second portion of time, etc. The first and second subsets of the K AI/ML models can be disjoint or overlapping. Additionally, or alternatively, finetuning for a plurality of AI/ML models can be performed simultaneously or in parallel for multiple ones of the M AI/ML models 434-1, . . . , 434-M (which can be the same as, similar to, or disjoint from the N AI/ML models 435 and/or the K AI/ML models 433). In some aspects, finetuning can be performed for a first subset of the M AI/ML models for a first portion of time, can be performed for a second subset of the M AI/ML models for a second portion of time, etc. The first and second subsets of the M AI/ML models can be disjoint or overlapping.

Each edge compute unit 430 of the one or more edge compute units provided at each edge environment 402 of the plurality of edge environments 402-N can additionally include cloud services 432, a high-performance compute (HPC) engine 434, and a local database 436. In some aspects, HPC engine 434 can be used to implement and/or manage inference associated with respective ones of the trained AI/ML models 435-1, . . . , 435-N provided on the edge compute unit 430.

In one illustrative example, the edge compute unit 430 can receive the trained AI/ML models 435-1, . . . , 435-N from a centralized AI/ML training cluster or engine that is provided by one or more cloud user environments 470. The AI/ML training clusters of the cloud user environment 470 can be used to perform training (e.g., pre-training) of AI/ML models that can later be deployed to the edge compute unit 430 for inference and/or other implementations at the edge environment 402. Data network connectivity between edge compute unit 430 and cloud user environments 470 can be provided using one or more internet backhaul communication links 440. For instance, the internet backhaul 440 can be implemented as a fiber communication link (e.g., wired fiber optic connectivity from the edge environment 402/edge compute unit 430 to internet infrastructure that is connectable to the cloud user environments 470; a direct or point-to-point wired fiber optic connectivity from the edge environment 402/edge compute unit 430 to the cloud user environments 470; etc.).

The internet backhaul 440 may additionally, or alternatively, be implemented using one or more satellite communication links. For instance, internet backhaul 440 can be a wireless communication link between edge compute unit 430/edge environment 402 and a satellite of a satellite internet constellation. In some aspects, it is contemplated that the edge compute unit 430 can include (or otherwise be associated with) one or more satellite transceivers for implementing satellite connectivity to and/or from the edge compute unit 430. In some aspects, the one or more satellite transceivers can be integrated in or coupled to a housing (e.g., container, in examples where edge compute unit 430 is a containerized data center) of the edge compute unit 430 and used to provide satellite connectivity capable of implementing the internet backhaul link 440. In another example, the one or more satellite transceivers can additionally, or alternatively, be provided at the edge environment 402 where edge compute unit 430 is deployed.

In some aspects, the internet backhaul link 440 between edge compute unit 430 and cloud user environments 470 can be used to provide uplink (e.g., from edge compute unit 430 to cloud user environments 470) of scheduled batch uploads of information corresponding to one or more of the AI/ML models 435-1, . . . , 435-N implemented by the edge compute unit 430, corresponding to one or more features (intermediate or output) generated by the AI/ML models implemented by edge compute unit 430, and/or corresponding to one or more sensor data streams generated by edge assets 410 provided at edge environment 402 and associated with the edge compute unit 430, etc. The internet backhaul link 440 may additionally be used to provide downlink (e.g., from cloud user environments 470 to edge compute unit 430) of updated, re-trained, fine-tuned, etc., AI/ML models. For instance, the updated, re-trained, or fine-tuned AI/ML models transmitted over internet backhaul link 440 from cloud user environments 470 to edge compute unit 430 can be updated, re-trained, or fine-tuned based on the scheduled batch upload data transmitted on the uplink from edge compute unit 430 to cloud user environments 470. In some aspects, the updated AI/ML models transmitted from cloud user environments 470 to edge compute unit 430 can be updated versions of the same AI/ML models 435-1, . . . , 435-N already implemented on the edge compute unit 430 (e.g., already stored in local database 436 for implementation on edge compute unit 430). In other examples, the updated AI/ML models transmitted from cloud user environments 470 to edge compute unit 430 can include one or more new AI/ML models that are not currently (and/or were not previously) included in the set of AI/ML models 435-1, . . . , 435-N that are either implemented on edge compute unit 430 or stored in local database 436 for potential implementation on edge compute unit 430.

In some cases, the AI/ML distributed computation platform 400 can use the one or more edge compute units 430 provided at each edge environment 402 to perform local data capture and transmission. In particular, the locally captured data can be obtained from one or more local sensors and/or other edge assets 410 provided at the edge environment 402. For instance, in the example of FIG. 4, the local edge assets/sensors 402 can include, but are not limited to, one or more autonomous robots 416, one or more local site cameras 414, one or more environmental sensors 412, etc. The local sensors and edge assets 410 can communicate with the edge compute unit 430 via a local network 420 implemented at or for edge environment 402.

In another example, the edge compute unit 430 can receive local camera feed(s) information from the local site cameras 414 and can transmit in response camera configuration and/or control information to the local site cameras 414. In some cases, the edge compute unit 430 may receive the local camera feed(s) information from the local site cameras 414 and transmit nothing in response. For instance, the camera configuration and/or control information can be used to re-position or re-configure one or more image capture parameters of the local site cameras 414—if no re-positioning or image capture parameter reconfiguration is needed, the edge compute unit 430 may not transmit any camera configuration/control information in response. In some aspects, the camera configuration and/or control information can be generated or otherwise determined based on processing the local camera feed data from the local site cameras 414 using an appropriate one (or more) of the trained AI/ML models 435-1, . . . , 435-N implemented on the edge compute unit 430 and/or using the HPC engine 434 of the edge compute unit 430.

In another example, the edge compute unit 430 can receive environmental sensor data stream(s) information from the environmental sensors 412 and can transmit in response sensor configuration/control information to the environmental sensors 412. In some cases, the edge compute unit 430 may receive the sensor data streams information from the environmental sensors 412 and transmit nothing in response. For instance, the sensor configuration and/or control information can be used to adjust or re-configure one or more sensor data ingestion parameters of the environmental sensors 412—if no adjustment or re-configuration of the environmental sensors 412 is needed, the edge compute unit 430 may not transmit any sensor configuration/control information in response. In some aspects, the sensor configuration and/or control information can be generated or otherwise determined based on processing the local environmental sensor data streams from the environmental sensors 412 using an appropriate one (or more) of the trained AI/ML models 435-1, . . . , 435-N implemented on the edge compute unit 430 and/or using the HPC engine 434 of the edge compute unit 430.

In some examples, the systems and techniques described herein can be used to drive local storage, inference, prediction, and/or response, performed by an edge compute unit (e.g., edge compute unit 430) with minimal or no reliance on cloud communications or cloud offloading of the computational workload (e.g., to cloud user environments 470). The edge compute unit 430 can additionally be used to locally perform tasks such as background/batch data cleaning, ETL, feature extraction, etc. The local edge compute unit 430 may perform inference and generate prediction or inference results locally, for instance using one or more of the trained (e.g., pre-trained) AI/ML models 435-1, . . . , 435-N received by edge compute unit 430 from cloud user environments 470. The local edge compute unit 430 may perform further finetuning or instruction tuning of the pre-trained model to a specified task (e.g., corresponding one or more of the AI/ML model finetuning instances 433-1, . . . , 4333-M, as described previously above).

The prediction or inference results (and/or intermediate features, associated data, etc.) can be compressed and periodically uploaded by edge compute unit 430 to the cloud or other centralized location (e.g., such as cloud user environments 470 etc.). In one illustrative example, the compressed prediction or inference results can be uploaded to the cloud via a satellite communication link, such as a communication link to a satellite internet constellation configured to provide wireless satellite connectivity between the edge compute unit and existing terrestrial internet infrastructure. For instance, the compressed prediction or inference results can be included in the scheduled batch uploads transmitted over internet backhaul link 440 from edge compute unit 430 to cloud user environments 470. In some cases, the prediction or inference results can be utilized immediately at the edge compute unit 430, and may later be transmitted (in compressed form) to the cloud or centralized location (e.g., cloud user environments 470). In some aspects, satellite connectivity can be used to provide periodic transmission or upload of compressed prediction or inference results, such as periodic transmission during high-bandwidth or low-cost availability hours of the satellite internet constellation. In some cases, some (or all) of the compressed prediction or inference results can be transmitted and/or re-transmitted using wired or wireless backhaul means where available, including fiber-optic connectivity for internet backhaul, etc.

Notably, the systems and techniques can implement the tasks and operations described above locally onboard one or more edge compute units 430, while offloading more computationally intensive and/or less time-sensitive tasks from the edge compute unit to AI/ML training clusters in the cloud user environments 470. For instance, the AI/ML training clusters can be used to provide on-demand AI/ML model training and fine tuning, corresponding to the updated AI/ML models shown in FIG. 4 as being transmitted from cloud user environments 470 to edge compute unit 430 via internet backhaul 440. In some aspects, the AI/ML training clusters can implement thousands of GPUs or other high-performance compute hardware, capable of training or finetuning an AI/ML model using thousands of GPUs for extended periods of time (e.g., days, weeks, or longer, etc.). In some aspects, AI/ML training clusters can additionally, or alternatively, be used to perform on-cloud model compression and optimization prior to transmitting data indicative of the trained AI/ML models 435-1, . . . , 435-N to the edge compute unit 430 for local implementation using the sensor data generated by the associated edge assets 410. In some embodiments, the edge compute unit 430 can be configured to perform a scheduled or periodic download of fresh (e.g., updated or new) AI/ML models from AI/ML training clusters 470 via the internet backhaul link 440 (e.g., the updated or new AI/ML models can be distributed from AI/ML training clusters in the cloud user environments 470 to edge compute unit 430 in a pull fashion). In other examples, the updated or new AI/ML models can be distributed from AI/ML training clusters in the cloud user environments 470 to edge compute unit 430 in a push fashion, wherein the AI/ML training clusters 470 transmit the updated or new models to the edge compute unit 430 via internet backhaul link 440 as soon as the updated or new AI/ML model becomes available at the AI/ML training clusters.

Training the AI/ML models 435-1, . . . , 435-N may require massive amounts of data and processing power, which can be more efficiently implemented at the cloud user environments 470 (and shared across the plurality of edge environment 402-N edge compute units 430) rather than implementing individually at each of the edge environments 402-N and corresponding edge compute unit(s) 430. In some aspects, the quality of an AI/ML model can be directly correlated with the size of the training and testing (e.g., validation) data used to perform the training and subsequent finetuning. Furthermore, in many cases, training large AI/ML models requires running thousands of GPUs, ingesting hundreds of terabytes of data, and performing these processes over the course of several weeks. Accordingly, in many cases, large-scale ML/AI model training is suited best for cloud or on-premises infrastructure and sophisticated MLOPs. For instance, the training dataset associated with training a large-scale AI/ML model can be on the order of hundreds of TB-tens of petabytes (PB), or even larger. Thousands of GPUs and hours to weeks of training time can be needed, with the resulting size of the uncompressed, trained model exceeding hundreds or thousands of GB.

ML or AI inference (e.g., inference using a trained ML or AI model), on the other hand, can be implemented using far fewer resources than training, and may performed efficiently at the edge (e.g., by edge compute unit(s) 430 associated with the local site(s) 402 or 402-N). Indeed, in many cases, edge inferencing will provide better latency than cloud inferencing, as input sensor data generated at the edge (e.g., using edge assets 410) does not need to transit over an internet backhaul link 440 to the cloud region (e.g., cloud user environments 470 associated with the AI/ML training clusters) before inference can begin. Accordingly, it is contemplated herein that the trained AI/ML models 435-1, . . . , 435-N can be created and trained in the cloud (e.g., at AI/ML training clusters implemented within the cloud user environment 470), and additionally can be optimized and compressed significantly, enabling the systems and techniques described herein to distribute the optimized, compressed, and trained AI/ML models 435-1, . . . , 435-N to the edge locations associated with local sites 402 and corresponding edge compute unit(s) 430 where the optimized, compressed, and trained AI/ML models will be implemented for inferencing at the edge using local sensor data from edge assets 410. As noted previously above, in some aspects, one or more of the trained models (e.g., one or more of the trained AI/ML models 435-1, . . . , 435-N deployed to the edge compute unit 430 for local edge inference) can be fine-tuned or instruction tuned to specific tasks, a technique which requires significantly less data and compute than their training. For instance, a trained (e.g., pre-trained) AI/ML model can be fine-tuned or instruction tuned to specific tasks including new and/or differentiated tasks relative to the task(s) originally or previously corresponding to the trained model. In some examples, a trained (e.g., pre-trained) AI/ML model can be fine-tuned or instruction tuned to specific tasks using one or more of the model retraining instances 433-1, . . . , 433-K and/or using one or more of the model finetuning instances 434-1, . . . , 434-M implemented locally by the edge compute unit 430, as also described previously above.

For instance, the edge compute unit 430 can use one or more of the trained AI/ML models 435-1, . . . , 435-N to perform edge inferencing based on input data comprising the locally/edge-generated sensor data streams obtained from the edge assets 410 provided at the same edge environment 402 as the edge compute unit 430. In some aspects, the input data set for edge inferencing performed by edge compute unit 430 can comprise the real-time data feed from edge assets/sensors 410, which can be between tens of Mbps to 10s of Gbps (or greater). The edge compute unit 430 can, in at least some embodiments, include 10s of GPUs for performing local inferencing using the trained AI/ML models 435-1, . . . , 435-N. By performing local inferencing at edge compute unit 430, an inference response time or latency on the order of milliseconds (ms) can be achieved, significantly outperforming the inference response time or latency achievable using cloud-based or on-premises remote inferencing solutions.

In some aspects, the systems and techniques can be configured to implement a continuous feedback loop between edge compute unit(s) 430 and AI/ML training clusters in the cloud user environments 470. For instance, the continuous feedback loop can be implemented based on using the edge compute unit(s) and associated edge assets/sensors 410 to capture data locally, perform inference locally, and respond (e.g., based on the inference) locally. The edge compute unit(s) 430 can be additionally used to compress and transmit features generated during inference from the source data and/or to compress and transmit inference results efficiently to the AI/ML training clusters in the cloud user environments 470 (among other cloud or on-premises locations). In the continuous feedback loop, training and fine-tuning can subsequently be performed in the cloud, for instance by AI/ML training clusters and using the batch uploaded sensor data and/or features uploaded by the edge compute unit(s) 430 to AI/ML training clusters. Based on the training and fine-tuning performed in the cloud by the AI/ML training clusters, new or updated AI/ML models are distributed from the AI/ML training clusters back to the edge (e.g., to the edge compute unit(s) 430 and local site(s) 402). This continuous feedback loop for training and fine-tuning of AI/ML models can be seen to optimize the usage of cloud, edge, and bandwidth resources. The same AI/ML model may be finetuned across multiple edge nodes to optimize the usage of available compute at the nodes and the cloud. For instance, an AI/ML model can be finetuned across a set of edge nodes comprising at least the edge compute unit 430 and one or more edge compute units included in the additional local edge sites 402-N. In some cases, the distributed finetuning of an AI/ML model across multiple edge nodes can be mediated, supervised, and/or controlled, etc., by the AI/ML training clusters implemented within the cloud user environment 470 (e.g., or various other cloud entities). In some examples, the distributed finetuning of an AI/ML model across multiple edge nodes can be supervised and/or controlled, etc., by a selected one or more edge nodes of the set of edge nodes associated with the distributed finetuning of the model. In one illustrative example, distributed finetuning or retraining of an AI/ML model across multiple edge nodes can be orchestrated by a respective fleet management client that is implemented at or by each of the multiple edge nodes.

Figure 5:
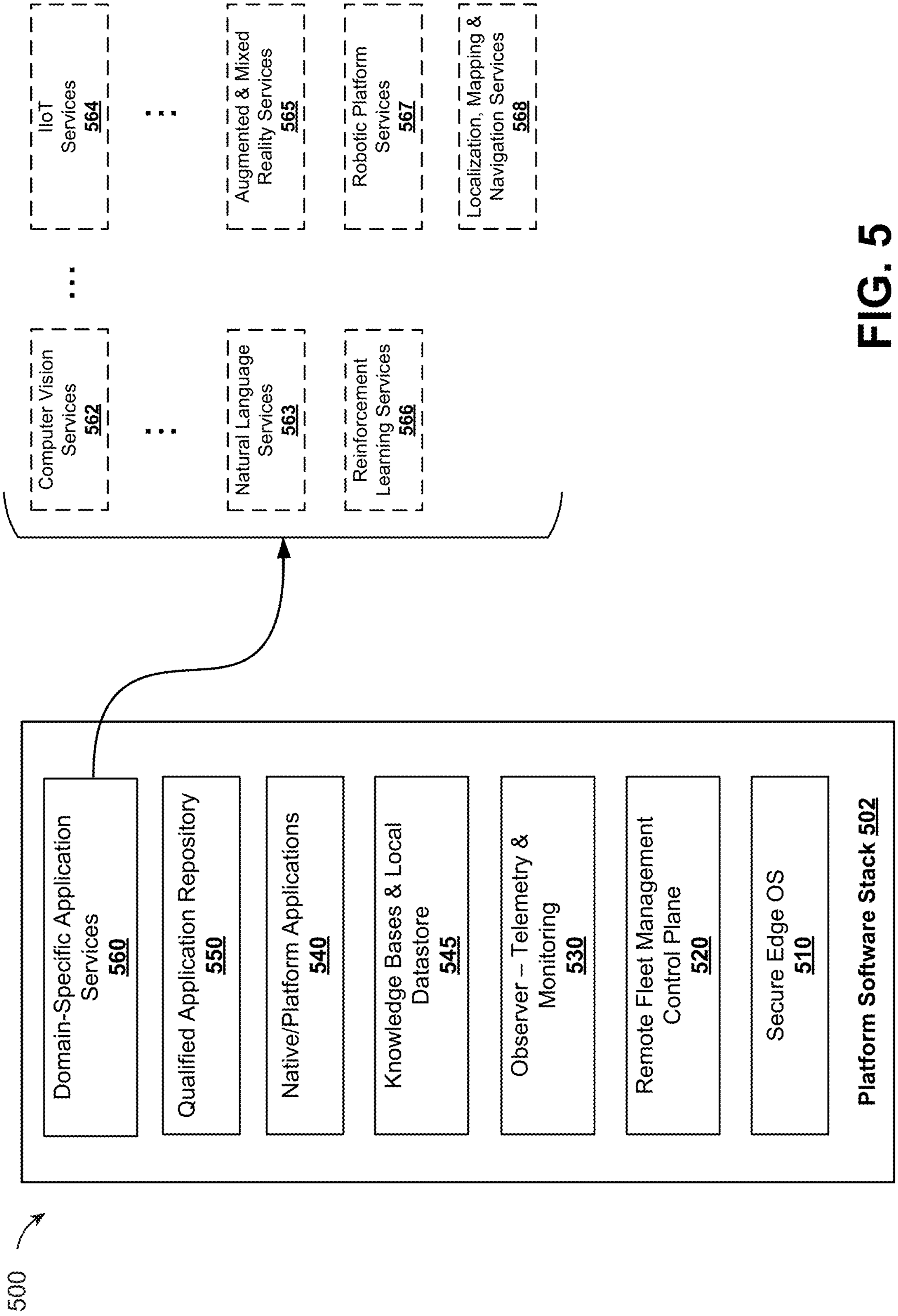
FIG. 5 is a diagram illustrating an example software stack associated with implementing an edge computing system for ML and/or AI workloads, in accordance with some examples.

FIG. 5 is a diagram illustrating an example software stack 500 associated with implementing an edge computing system for ML and/or AI workloads, in accordance with some examples. In particular, FIG. 5 depicts an example platform software stack 502 that can be used to provide single pane management of a fleet of deployed edge compute units, connected sensors and assets associated with an edge compute unit, and/or one or more AI/ML models that are pre-trained and deployed on an edge compute unit to process or otherwise analyze raw sensor data generated by the connected sensors and assets associated with the edge compute unit. As illustrated, the example platform software stack 502 can include domain-specific application services 560, such as the example computer vision services 562, the natural language services 563, the industrial internet of things (IIoT) services 564, the augmented and mixed reality services 565, the reinforcement learning services 566, the robotic platform services 567, and/or the localization, mapping, and navigation services 568, etc., that are depicted as specific examples of domain-specific application services. The example platform software stack 502 can additionally include a qualified application repository 550, which can be implemented as a repository of pre-trained and/or pre-configured AI and/or ML applications capable of running on the edge compute unit to perform specific tasks or computations using specific types of sensors and/or sensor data streams available to or otherwise associated with the edge computing device. In some aspects, the qualified application repository 550 can be implemented as an application marketplace for third-party AI and/or ML applications that can be deployed to the edge compute unit for providing particular or desired computational capabilities and workflows. In comparison to the domain-specific application services 560, it is contemplated that in at least some embodiments, the domain-specific application services 560 can be provided as first-party or platform-level AI and/or ML applications and associated services, while the qualified application repository 550 can be used to provide third-party or developer-level AI and/or ML applications and associated services for implementation on the edge compute unit.

In some aspects, the platform software stack 502 can further include native or platform applications 540. In some embodiments, the application repository 550 can be a cloud-based repository of qualified AI/ML applications for deployment on one or more edge compute units 430. For instance, the application repository 550 can be a cloud-based marketplace for the management of customer and platform ML/AI applications. In some cases, customer applications can be third-party/developer applications, and the platform applications may be the same as or similar to the native/platform applications 540 and/or the domain-specific application services 560.

The native/platform applications 540 can be differentiated from the domain-specific application services 560 on the basis that the native/platform applications 540 are provided in a manner the same as or similar to the third-party or developer level AI/ML applications 550, in that both the native/platform applications 540 and third-party AI/ML applications 550 can be configured to perform a specific sensor data processing or analysis task that may make use of or call one or more of the domain-specific application services 560. In other words, the domain-specific application services 560 can be implemented as modules, engines, APIs, etc., that are configured to perform specific tasks in a generic manner that is independent of the specific implementation or intended use case of one of the native/platform applications 540 or third-party/developer applications 560. For instance, FIG. 5 depicts the example domain-specific application services 560 in the form of computer vision services 562 and IIoT services 564. Various additional domain-specific application services 560 can be implemented or provided without departing from the scope of the present disclosure.

A similar structure can be utilized for implementing the third-party/developer applications 550 to make use of the various domain-specific application services 560. In some aspects, a same or similar functionality can be provided by the third-party/developer applications 550 and the native/platform applications 540. In other examples, one or more functionalities and/or domain-specific application services 560 may be configured for use exclusively by one or more of the native/platform applications 540 (e.g., without the possibility of overlapping, same, or similar functionality by one of the third-party/developer applications 550). In some cases, the native/platform applications 540 can be implemented as Docker or Kubernetes Container environments that are deployable on or to the edge compute units. In some aspects, native/platform applications 540 may be made available and/or distributed using the same marketplace mechanism associated with distributing the third-party/developer applications (e.g., the qualified application repository 550 may, in some embodiments, include both first-party platform/native applications 540 and third-party/developer applications). In other examples, native/platform applications 540 may be pre-loaded or pre-configured on the edge compute unit(s) at the time of deployment, with only the third-party/developer applications 550 being configurable or loadable to the edge compute unit at a later time (e.g., via selection in the qualified application repository 550).

In some embodiments, the platform software stack 502 can additionally include one or more knowledge bases and/or local data storages 545, which may be associated with and utilized by one or more of the third-party AI/ML applications 550 and/or one or more of the native platform applications 540. For instance, some applications may require knowledge bases and databases 545 to be hosted locally for use by the applications. The knowledge bases and databases 545 can be used to store information corresponding to a particular task or analytical/data processing operation implemented by an application that uses the knowledge bases and databases 545. In some cases, the knowledge bases and databases 545 can be logically delineated or separated on the basis of the corresponding application(s) that make use of each of the knowledge bases and databases 545. In some cases, the knowledge bases and databases 545 can be combined for different applications. In some embodiments, the knowledge bases and databases 545 can be included in and/or otherwise associated with the local database 436 of FIG. 4. In some aspects, one or more of the knowledge bases and databases 545 can be implemented locally at the edge (e.g., at local edge site 402 of FIG. 4), can be implemented in the cloud (e.g., a cloud associated with AI/ML training clusters 470 of FIG. 4), and/or can be implemented as a combination of edge and cloud resources.

The knowledge bases and databases 545 may also be referred to herein as a "local datastore/knowledge base" and/or a "local datastore and knowledge base." In some aspects, the local datastore and knowledge base can include content and information obtained over a data network such as the internet. For instance, local datastore and knowledge base content and information can be populated, updated, delivered, etc., via the internet backhaul link 440 shown in FIG. 4 between the local edge site 402 and the cloud cluster(s) 470. In some embodiments, local datastore and knowledge base 545 can be served over a satellite internet constellation-based CDN. In some embodiments, local datastore and knowledge base(s) 545 can be implemented at the edge compute unit 430 of FIG. 4, as noted above. It is further noted that the local datastore and knowledge base(s) 545 can be implemented based on or corresponding to a respective edge compute unit service (e.g., a corresponding edge service for local datastore and knowledge base(s) 545 can be included in the edge compute unit services 605 of FIG. 6, described subsequently below).

In one illustrative example, the local datastore and knowledge base(s) 545 can include publicly available data network content (e.g., web content). Notably, the local datastore and knowledge base(s) 545 can further include domain or niche knowledge of processes, devices, assets, personnel, tasks, tools, activities, etc., that are pertinent to the local and global operations of a user (e.g., enterprise user) of the edge compute unit and associated platform system(s) of the present disclosure. In some aspects, this domain or niche knowledge represented within the local datastore and knowledge base(s) 545 can be broadly referred to as domain-specific information, task-specific information, operations-specific information, private, proprietary, or non-public information, etc. For instance, the local datastore and knowledge base(s) 545 can include domain or operations-specific data generated at the edge and ingested to one or more edge compute units 430 within the fleet of edge compute units of an enterprise user. This local domain or operation-specific edge-generated information may include, but is not limited to, information such as maintenance records, user reports, machine reports and logs, work summaries, activity reports, device/asset manuals, sensor specifications, etc.-some (or all) of which may be consumed at the edge by one or more AI/ML models. For instance, information and data from local datastore and knowledge base(s) 545 can be consumed at the edge during inference using one or more trained AI/ML models, during retraining of one or more pre-trained AI/ML models, and/or during finetuning of one or more pre-trained AI/ML models.

In some aspects, the platform software stack 502 can further include a telemetry and monitoring engine 530 (also referred to herein as the "observer" or "observer engine"), a remote fleet management control plane 520, and a secure edge operating system (OS) 510. In some examples, one or more of the components of platform software stack 502 can be implemented in the cloud (e.g., remote from the edge, such as remote from the local site 402 and/or edge compute unit 430 of FIG. 4). Components of platform software stack 502 that are implemented in the cloud may be implemented with and/or collocated with the AI/ML training clusters 470 of FIG. 4, or may be separate from the AI/ML training clusters 470 of FIG. 4. In some cases, one or more of the components of platform software stack 502 can be implemented at the edge, for instance at local site 402 and/or on edge compute unit 430 of FIG. 4.

In one illustrative example, the domain-specific application services 560 can be implemented in the cloud, can be implemented at the edge, or can be implemented using a combination of cloud and edge deployments. For instance, domain-specific application services 560 may be provided locally on edge compute unit 430 of FIG. 4, particularly for instances where a given domain-specific application service 560 is used often by the edge compute unit 430 (e.g., is called or used by an application or AI/ML model running on the edge compute unit 430 of FIG. 4, such as a third-party/developer application from repository 550 and/or a native/platform application 540). In some examples, domain-specific application services 560 may be provided as cloud services that are reached from edge compute unit 430 via internet backhaul link 440. For instance, domain-specific application services 560 that are rarely or not yet used by edge compute unit 430 can remain as cloud services until a greater need emerges at some point in the future for the domain-specific application service 560 to be implemented locally at edge compute unit 430.

In some embodiments, the qualified application repository 550 (e.g., implemented as a marketplace of third-party AI/ML applications for edge compute unit 430) can reside in the cloud, with individual ones of the available AI/ML applications installed to edge compute units 430 based on an enterprise user selection of the AI/ML applications from the cloud-hosted qualified application repository 550. Similarly, native/platform applications 540 may reside in the cloud prior to installation on the edge compute unit 430. In some embodiments, some (or all) of the native/platform applications 540 can be pre-installed or pre-configured locally on the edge compute units, and may optionally be made also available in the cloud.

The observer engine 530 (e.g., telemetry and monitoring engine 530) can be implemented at the edge (e.g., on edge compute units 430) and/or can be implemented in the cloud. For instance, each edge compute unit 430 can run an instance of the observer engine 530 (or a portion thereof) locally, to capture telemetry and other critical environmental monitoring and observation data at the edge compute unit 430 and/or local site 402 associated with the edge compute unit 430. The telemetry and monitoring data from the local instance of observer engine 530 at each edge compute unit 430 can be transmitted to a corresponding observer engine instance 530 running in the cloud.

For example, the local observer engine 530 instance at edge compute unit 430 can upload host and satellite constellation level metrics to a global observer engine instance that is associated with the cloud-based remote fleet management control plane 520. The cloud-based remote fleet management control plane 520 can be used to provide a single pane of glass interface to the fleet of edge compute units 420 and local sites 402 (e.g., 402, . . . , 402-N), and can display the observer engine telemetry and monitoring data from various edge compute units 430 using a global management console (also referred to herein as a global management portal). For instance, the remote fleet management control plane 520 can include or provide one or more graphical user interfaces (GUIs) indicative of various telemetry and monitoring data obtained from the deployed edge compute units 430 and local sites 402.

The secure edge OS 510 can be installed on the edge compute units 430, and may be used to provide operating system functionality for implementing computation operations and other functionalities at the edge compute unit 430 itself. The secure edge OS 510 can additionally be used to provide an interface and communications between the edge compute unit 430 and the remaining portions of the platform software stack 502. For instance, the secure edge OS 510 can be configured to communicate with the cloud-based components of the platform software stack 502, including observer engine 530, remote fleet management control plane 520, domain-specific application services 560, qualified application repository 550, and/or platform applications 540.

Figure 6:
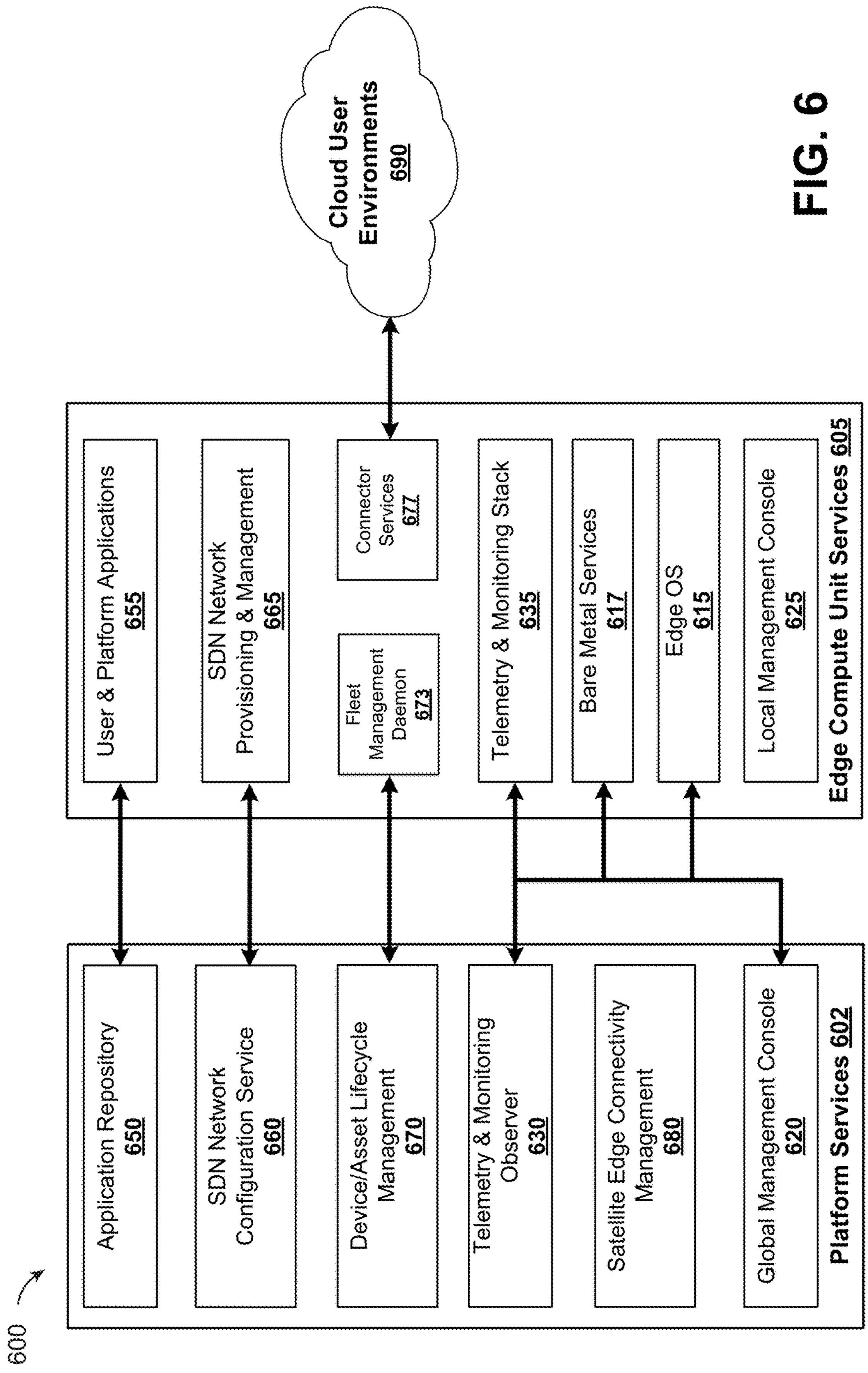
FIG. 6 is a diagram illustrating an example architecture for implementing global services and edge compute services of an edge computing system for ML and/or AI workloads, in accordance with some examples.

FIG. 6 is a diagram illustrating an example architecture 600 for implementing platform (e.g., global) services 602 and edge compute services 605 of an edge computing system for ML and/or AI workloads, in accordance with some examples. In some embodiments, the platform services 602 of FIG. 6 can be the same as or similar to the platform software stack 502 of FIG. 5. With respect to the edge compute unit services 605 of FIG. 6, as illustrated the edge compute unit services 605 can include user and platform applications 655, SDN network provisioning and management engine 665, a fleet management daemon 673, cloud connector services 677, a telemetry and monitoring stack 635, bare metal services 617, an edge OS 615, and a local management console 625. In some aspects, the user and platform applications 655 can be the same as or similar to (and/or can include) the trained AI/ML model inference instances 435-1, . . . , 435-N depicted in and described above with respect to the edge compute unit 430 of FIG. 4.

In some embodiments, the edge compute unit services 605 can include one or more edge services associated with implementing, maintaining, updating, using, etc., local datastore and knowledge base information at and for an edge compute unit. For instance, the edge compute unit services 605 can include one or more edge services associated with implementing, maintaining, updating, using, etc., the local datastore and knowledge base(s) 545 depicted in FIG. 5 and described previously above. In some embodiments, one or more of the edge connector services 677 can be associated with implementing the local datastore and knowledge base(s) 545 of FIG. 5. In some aspects, one or more dedicated edge connector services (not shown) within the edge compute unit services 605 can be associated with implementing the local datastore and knowledge base(s) 545 of FIG. 5.

In one illustrative example, the global management console 620 can provide users with single pane of glass access, insight, and/or management corresponding to each of the remaining modules of the platform services 602 and/or of the edge compute unit services 605. For instance, the global management console 620 can provide one or more GUIs corresponding to each of the platform services 602. For instance, the global management console 620 can be a cloud-hosted global management console configured to implement a comprehensive asset management portal.

As contemplated herein, the global management console 620 can provide a comprehensive and unified software solution designed to simplify and streamline the management of an enterprise customer's fleet of edge-deployed assets, including edge compute units 430 and/or other connected sensors and edge assets 410 deployed at a local edge site 402 in conjunction with one or more edge compute units 430. In one illustrative example, global management console 620 can be configured to provide a single intuitive interface with one or more GUIs corresponding to each of the platform services 602 and/or corresponding to one or more of the edge compute unit services 605. Using the global management console 620 and its corresponding GUIs, the systems and techniques described herein can be used to implement complete and superior remote visibility and control over all aspects of edge asset and edge compute device 430 operations.

For instance, the global management console 620 can be used to provide physical asset management with full oversight of the location, power, storage, data, and connectivity associated with a fleet of edge compute devices 430 and connected edge assets 410 of a local edge site 402. The physical asset management provided by global management console 620 can be used to achieve optimal resource allocation and performance at the edge. The platform services 602 can be used to monitor real-time energy consumption, data usage, utilized storage, and/or network connectivity (among various other parameters and data streams) to minimize downtime and maximize efficiency at the edge.

In some aspects, the global management console 620 can provide physical asset management that includes visibility and insight into "App Metrics". The "App Metrics" can correspond to monitoring information for AI/ML workloads implemented at the edge, such as on an edge compute device 430. For instance, the "App Metrics" may correspond to one or more (or all) of the AI/ML inference workloads 435-1, . . . , 435-N depicted running on the edge compute unit 430 of FIG. 4. In some aspects, the global management console 620 can be used to provide application management for deployed AI/ML applications running on the edge compute unit 430. For instance, global management console 620 can provide application management for the deployed user and platform AI/ML applications 655 included in the edge compute unit services 605 running on edge compute unit 430. In some aspects, global management console 620 can provide application management for deployed AI/ML applications to simplify the deployment and management of the AI/ML applications with asset-aware resource provisioning. In such examples, enterprise users of the global management console 620 can easily deploy, update, and remove AI/ML applications on multiple assets (e.g., multiple edge compute units 430) at once. In some embodiments, application management via global management console 620 can be combined with or implemented in conjunction with the cloud-based application repository 650 that is used to install and manage some (or all) of the user and platform AI/ML applications 655 on the edge compute unit 430.

In some embodiments, the global management console 620 can be used to provide workload management for the deployed AI/ML applications running on the edge compute unit 430. For instance, global management console 620 can provide workload management for some (or all) of the deployed user and platform AI/ML applications 655 of FIG. 6, for some (or all) of the deployed AI/ML model inference instances 435-1, . . . , 435-N running on the edge compute unit 430 of FIG. 4, etc. In some cases, workload management can be implemented based on using the global management console 620 to manage AI/ML workloads deployed to one or more edge assets of an enterprise user (e.g., deployed to one or more edge compute units 430/local sites 402 of the enterprise user).

Workload management for AI/ML workloads can include, but is not limited to, automatic resource provisioning, sensor suite selection, job assignment, job cancellation features, etc. In some aspects, enterprise users of the global management console 620/platform services 602 can see which assets (e.g., edge compute units 430, or assets/compute components thereof) are currently available and capable of performing an AI/ML workload either now or at a scheduled time in the future. In some embodiments, workload management for AI/ML workloads on an edge compute device 430 can include scheduling the AI/ML workload for a future time when bandwidth, data, computation, and/or energy is projected or estimated to be more available, is projected or estimated to be cheaper, etc.

As illustrated in FIG. 6, the application repository 650 of platform services 602 can correspond to the user and platform applications 655 of the edge compute unit services 605. For instance, the user and platform applications 655 can comprise a selection or a subset of the complete listing of applications available in application repository 650, where the selection or subset of the AI/ML applications represents those AI/ML applications that an enterprise user has selected for installation or deployment on the edge compute unit 430. Installing or deploying an AI/ML application on the edge compute unit 430 can be based on including the AI/ML application in the user and platform applications 655 of the edge compute unit services 605. Installing or deploying an AI/ML application on the edge compute unit 430 may additionally include configuring or providing on the edge compute unit 430 (or at local edge site 402) one or more corresponding sensors, devices, and/or robotic assets, etc., associated with, used by, or required for the particular AI/ML application.

In some aspects, the edge compute unit services 605 can be connected to various sensors, external devices (e.g., displays, handhelds, personal devices, etc.), robotic assets, etc., that are provided or deployed at the edge (e.g., deployed in association with one or more edge compute units 430). For example, one or more edge services of the edge compute unit services 605 can be used to configure and manage connectivity to the sensors, external devices, robotic assets, etc., at the edge. In some examples, one or more edge services of the edge compute unit services 605 can be used to configure and manage the local network 420 connectivity shown in FIG. 4 between the edge compute unit 430 and the autonomous robotic assets 416, local site cameras 414, environmental sensors 412, etc. More generally, in some examples, the one or more edge services of the edge compute unit services 605 can be used to configure and manage connectivity to the edge assets 410 across one or more local edge sites 402 (e.g., including additional local site(s) 402-N) and/or across one or more edge compute units 430.

In one illustrative example, the platform applications represented in the software stack (e.g., included in the user and platform applications 655 deployed at the edge, included in the application repository 650 in the cloud, etc.) can be used to enable enterprise user's AI/ML workloads to be run on the edge compute units 430. For instance, the platform AI/ML applications can be based on a core orchestration layer of platform services 602/edge compute unit services 605 to account for redundancy and resiliency. In some embodiments, the platform AI/ML applications can utilize or be based on open-source distributed computing platforms for data processing, storage, and movement (e.g., Spark, MinIO, Kafka, etc.). In some aspects, the platform AI/ML applications can be fully managed applications, for instance in terms of tuning, updates, addressing of critical vulnerabilities, etc.

In some embodiments, the application repository 650 can include first-party/platform AI/ML applications and can include third-party/developer AI/ML applications. In some examples, first-party/platform AI/ML applications can be configured as a core suite of AI and ML applications, models, networks, etc., that are trained and selected to solve or otherwise address various unsolved and/or underserved enterprise user use cases in the edge computing space. In one illustrative example, the first-party/platform AI/ML applications can be deployed and managed through a cloud-based application marketplace (e.g., application repository 650). The first-party/platform AI/ML applications can be tuned and right-sized (e.g., scaled up or down, compressed, optimized, etc.) for the various hardware configurations available for the edge compute units 430, and can be designed or purpose-built to maximize resource utilize at the edge and when deployed on the edge compute units 430. For instance, the edge compute unit 430 can be associated with a plurality of pre-configured compute hardware options. Some (or all) of the first-party/platform AI/ML applications can be provided to the cloud-based application repository in a form or version optimally corresponding to various ones of the plurality of pre-configured compute hardware options available for implementing the edge compute unit. For instance, a first compute hardware configuration of the edge compute unit 430 may be more powerful (e.g., more GPUs, more powerful GPUs, more RAM, etc.) than a second compute hardware configuration of the edge compute unit 430 (e.g., fewer GPUs, less powerful GPUs, fewer available GPU cores, lower GPU data transfer speed, less RAM, etc.). Some (or all) of the pre-trained and pre-tuned first-party/platform AI/ML applications can have at least a first version optimized to run on the first compute hardware configuration of the edge compute unit 430 and a second (smaller and more lightweight) version optimized to run on the second compute hardware configuration of the edge compute unit 430, etc.

In some cases, application repository 650 can be implemented as a cloud-based marketplace for the management of customer and platform AI/ML applications (e.g., including the deployed user and platform applications 655 provided in the edge compute unit services 605). For instance, the application repository 650 (e.g., AI/ML application marketplace) can be used to provide fully managed applications that are subjected to a qualification and certification process prior to being on-boarded to the cloud-based application repository/marketplace 650 for deployment to various enterprise user local edge sites 402 and corresponding edge compute units 430. In some cases, the qualification and certification process for onboarding a third-party/developer ML/AI application to the marketplace can be performed to determine runtime fidelity and viability of the third-party ML/AI application for deployment on the edge compute units 430. In some embodiments, the application repository/marketplace 650 can be configured to provide one-click deployment and observability for the application lifecycle (e.g., from the cloud to the edge compute unit 430, and vice versa), obviating or reducing the need for cost and time intensive application and platform management as would conventionally be required.

In one illustrative example, application repository 650 can be used to deploy workloads into HCI through the global management console 620 (e.g., a corresponding GUI of the global management console 620 for the application repository/marketplace 650). For instance, one or more AI/ML applications can be selected from the application repository 650 (e.g., selected from a plurality of ML or AI applications included in the application repository 650) for installation or deployment onto one or more edge compute units 430, where the selection is made using global management console 620 and/or a GUI thereof. For instance, one or more AI/ML applications can be obtained from the application repository 650 and deployed to one or more edge compute units based on receiving a request indicative of the AI/ML applications that are to be deployed. The request can be received using global management console 620 and/or a GUI thereof. The request can be indicative of a selection of one or more ML applications qualified for deployment on a particular edge compute unit(s) (e.g., one or more ML applications having minimum requirements that are met or exceeded by the particular edge compute unit corresponding to the request).

In some aspects, the platform services 602 can further include an application orchestration engine (not shown) that can be used for the deployment of Kubernetes on the edge compute units 430. For instance, in some embodiments, the application orchestration engine can be used to provide standalone Kubernetes clusters and Tanzu Kubernetes clusters on HCI. In some aspects, the application orchestration engine can be used to provide automated Kubernetes cluster lifecycle management using helm and ArgoCD.

The platform services 602 are depicted in FIG. 6 as further including a device/asset lifecycle management (DLM) engine 670. The DLM engine 670 can be used to perform tasks and operations such as provisioning, adding/removing, and managing connected assets associated with the platform services 602. For instance, the DLM engine 670 can be used to perform asset management relating to the one or more edge compute units 430 provided at the plurality of local sites 402, . . . , 402-N of FIG. 4. Connected assets managed by the DLM engine 670 can additionally include various sensors and other assets, computing devices, etc., provided at the edge and/or otherwise associated with an edge compute unit 430. For instance, the DLM engine 670 can be used to perform asset management relating to the plurality of sensors or sensor packages that are provided at a local site 402 and/or associated with generating input sensor data used by an edge compute unit 430. For instance, the edge assets 410 of FIG. 4 (e.g., autonomous robots 416, local site cameras 414, environmental sensors 412, etc.) can each be managed by the DLM engine 670 of FIG. 6. In some examples, the DLM engine 670 can be a cloud-based component or module of the platform services 602

In some cases, the DLM engine 670 GUI can display a listing or visual depiction of the various assets that have been deployed, registered, provisioned, etc., for the enterprise user of platform services 602. For instance, the assets managed by DLM engine 670 can be separated, filtered, stored, etc., based on factors such as asset type, asset location, asset age, asset status, asset task or usage, etc. In some embodiments, the functionality of DLM engine 670 can be provided by a DLM asset service and a DLM provisioning service that are both included in DLM engine 670. For instance, the DLM asset service and the DLM provisioning service can be sub-services implemented by DLM engine 670 in the platform services 602. The DLM asset service and DLM provisioning service can both be cloud-based services. In some examples, the DLM asset service is a cloud-based service used to manage the assets (e.g., edge compute units 430, connected sensors, and/or other edge assets 410 provided at a local site 402 edge location, etc.) belonging to an organization. In some examples, the DLM asset service can be a cloud-based service configured to add assets to an organization, remove assets from an organization, list assets, manage additional properties like endpoints, etc.

The DLM provisioning service can be a separate cloud-based service that is used to recognize assets belonging to an organization and register them as such. For instance, when a new edge asset, connected sensor, or edge compute unit, etc. is provided at a local site 402, the new edge asset, connected sensor, or edge compute unit can initially connect to and communicate with the DLM provisioning service of the DLM engine 670 (e.g., via the internet backhaul communication link 440 of FIG. 4). Based on the initial connection between the new edge device and the DLM provisioning service of the DLM engine 670, provisioning can be performed such that the new edge device can be registered to and associated with the enterprise user or organization that operates the local site 402. In some embodiments, the DLM provisioning service can register or provision assets as belonging to an organization based on hardcoding HCI assets as belonging to the particular organization. In some embodiments, the DLM provisioning service can provision assets using certificates (CA), if turned on or enabled at the local customer/enterprise site (e.g., local site 402 of FIG. 4). In some cases, the DLM provisioning service can hardcode satellite internet constellation assets as belonging to the organization. For instance, a satellite internet constellation transceiver coupled to or otherwise in communication with the edge compute unit 430 (e.g., a satellite internet constellation transceiver provided at or near the local site 402) can be hardcoded as belonging to the organization using the DLM provisioning service of the DLM engine 670.

In some embodiments, the DLM engine 670 can further include a DLM cloud control plane service (not shown). The DLM cloud control plane service can be used to implement a cloud component for the control plane responsible for device management. For instance, the DLM cloud control plane service can be used to deploy workloads, grab (e.g., retrieve or obtain) the live state of various HCI hosts (e.g., edge compute units 430 or compute hardware/HCI hosts running thereon). In some embodiments, the DLM cloud control plane service can be used to send curated commands and control indications to an edge compute unit 430, where the commands may be user-initiated, automatically or system initiated, or a combination of the two. For instance, a user input or configuration action provided to a GUI of the global management console 620 corresponding to the DLM engine 670 (or other component of platform services 602) can be automatically translated into control plane signaling by the DLM cloud control plane service, and can be pushed to the appropriate services of the edge compute unit 430 (e.g., translated and pushed from the cloud-based DLM cloud control plane service within platform services 602, to the appropriate or corresponding one(s) of the edge compute unit services 605 running on the edge compute unit 430). In some aspects, the DLM cloud control plane service can be implemented based on a scalable design for control plane and additional management APIs.

In some examples, DLM engine 670 can further include or otherwise be associated with an edge compute unit cloud control plane service (not shown). The edge compute unit cloud control plane service can be implemented at the edge compute unit 430 (e.g., can be included in the edge compute unit services 605) and may provide a resident control plane that provides an interface into a given edge compute unit 430 from the cloud. For instance, the edge compute unit cloud control plane service can provide an interface from the global management console 620 (and/or other platform services 602) into a given edge compute unit 430. The interface into a given edge compute unit 430 can be mediated by the DLM cloud control plane service (on the cloud side) and the edge compute unit cloud control plane service (on the edge side). In some aspects, the edge compute unit cloud control plane service can be used to implement REST endpoints for deploying applications (e.g., the user and platform applications 655, deployed to the edge from the cloud-based application repository 650), servicing curated commands, etc.

In some aspects, the DLM engine 670 of platform services 602 can correspond to or otherwise be associated with an edge-based fleet management daemon 673 that is included in the edge compute unit services 605 and/or deployed on the edge compute unit(s) 430. For instance, the edge-based fleet management daemon 673 can be configured to provide node-level data and metrics (where the node-level corresponds to the level of individual edge compute units 430). More generally, the edge-based fleet management daemon 673 can be configured to perform collection of vital statistics and data related to nodes/edge compute units 430 registered with the platform services 602 and needed for display, management, monitoring, or other interaction through the global management console 620. In some cases, the edge-based fleet management daemon 673 can additionally, or alternatively, be used to implement a coredump collector that is in communication with the cloud-based DLM engine 670.

The platform services 602 can further include the telemetry and monitoring observer engine 630, which can correspond to the telemetry and monitoring stack 635 implemented on the edge compute unit 430 among the edge compute unit services 605. In some aspects, the observer can be used to provide hardware and critical environment observability designed to be part of a comprehensive and unified software solution to simplify and streamline the management of a customer' fleet of edge compute units 430 and associated edge assets 410. For instance, the telemetry and monitoring observer engine 630 and/or the telemetry and monitoring stack 635 can enable system-wide visibility, command, and control of the fleet's hardware systems (e.g., the hardware systems of the edge compute units 430 and/or the hardware systems of the connected edge assets 410). The fleet's hardware systems that may be associated with, viewed, commanded, controlled, etc., by telemetry and monitoring observer engine 630 and/or telemetry and monitoring stack 635 can include, but are not limited to: power distribution systems or sub-systems, thermal management functionality, internal environmental control systems and functionalities, data connectivity (e.g., both backhaul and device), physical security systems (e.g., at local site 402, associated with edge compute unit 430, associated with connected edge assets 410, etc.).

In some aspects, the telemetry and monitoring stack 635 implemented on the edge compute unit 430 (e.g., included in the edge compute unit services 605) can include one or more cloud-based services or sub-services. In some aspects, the telemetry and monitoring stack 635 can comprise a plurality of sub-services each running from the cloud, with telemetry and monitoring stack 635 itself running from edge compute unit 430. In some embodiments, telemetry and monitoring stack 635 can run at the edge and can include cloud-based services or sub-services configured to upload host-level and satellite internet constellation metrics for an observation view of telemetry and monitoring info from cloud-based global management console 620.

For instance, the telemetry and monitoring stack 635 can include a network telemetry and monitoring service that runs in the cloud (e.g., is a cloud-based service) and is configured to provide network usage statistics corresponding to one or more of a local network 420 associated with the edge compute unit 430, SDN networking associated with the edge compute unit 430 (e.g., SDN networking implemented based on the SDN network configuration service 660 and SDN network provisioning and management engine 665), and/or internet backhaul 440 associated with the edge compute unit 430 and cloud user environments 690. In some cases, the cloud-based network telemetry and monitoring service can be included in, associated with, etc., one or more of the cloud-based SDN network configuration service 660 included in the platform services 602 and/or the edge-based SDN network provisioning and management engine 665 included in the edge compute unit services 605 deployed on the edge compute unit 430.

In some embodiments, the telemetry and monitoring stack 635 can include a satellite internet constellation telemetry and monitoring service that runs in the cloud (e.g., is a cloud-based service) and is configured to provide network usage statistics and satellite internet constellation metrics corresponding to connectivity between the local site 402/edge compute unit 430 and one or more bird (e.g., satellites) of the satellite internet constellation. In some aspects, the cloud-based satellite internet constellation telemetry and monitoring service can be included in, associated with, etc., the satellite edge connectivity management engine 680 included in the platform services 602.

In some cases, the telemetry and monitoring stack 635 can further include a critical environment telemetry and monitoring service running locally at the edge (e.g., on the edge compute unit 430/included in the edge compute unit services 605). The critical environment telemetry and monitoring service can display data from one or more APIs associated with or provided with the containerized data center used to implement the edge compute unit 430, and corresponding to telemetry and monitoring information for components within the edge compute unit 430 (e.g., including ambient environmental parameters such as temperature or humidity, power consumption, etc.; including monitoring parameters for various compute hardware included in the HPC engine 434 of edge compute unit 430; etc.). In some aspects, the critical environment telemetry and monitoring service can upload HCI/satellite internet constellation metrics to the cloud (e.g., platform services 602 and/or cloud user environments 690) for display in the global management console 620. In some embodiments, the telemetry and monitoring stack 635 can further include a host level telemetry and monitoring (compute and storage) service running locally at the edge (e.g., on the edge compute unit 430/included in the edge compute unit services 605). The host-level telemetry and monitoring (compute and storage) service can be used to collect and/or display data from local edge hosts (e.g., edge compute units 430) and/or Kubernetes clusters associated with the local edge compute host units 430. The host-level telemetry and monitoring (compute and storage) service can upload HCI level host, virtual machine (VM), and/or Kubernetes data and metrics to the cloud (e.g., platform services 602 and/or cloud user environments 690) for display in the global management console 620.

In some aspects, the telemetry and monitoring stack 635 can further include a network telemetry and monitoring service running locally at the edge (e.g., on the edge compute unit 430/included in the edge compute unit services 605) and configured to provide combined network and satellite internet constellation connectivity metrics, network usage statistics, etc. The network telemetry and monitoring service can upload satellite internet constellation metrics, HCI network utilization metrics, etc., to the cloud (e.g., platform services 602 and/or cloud user environments 690) for display in the global management console 620.

Figure 7:
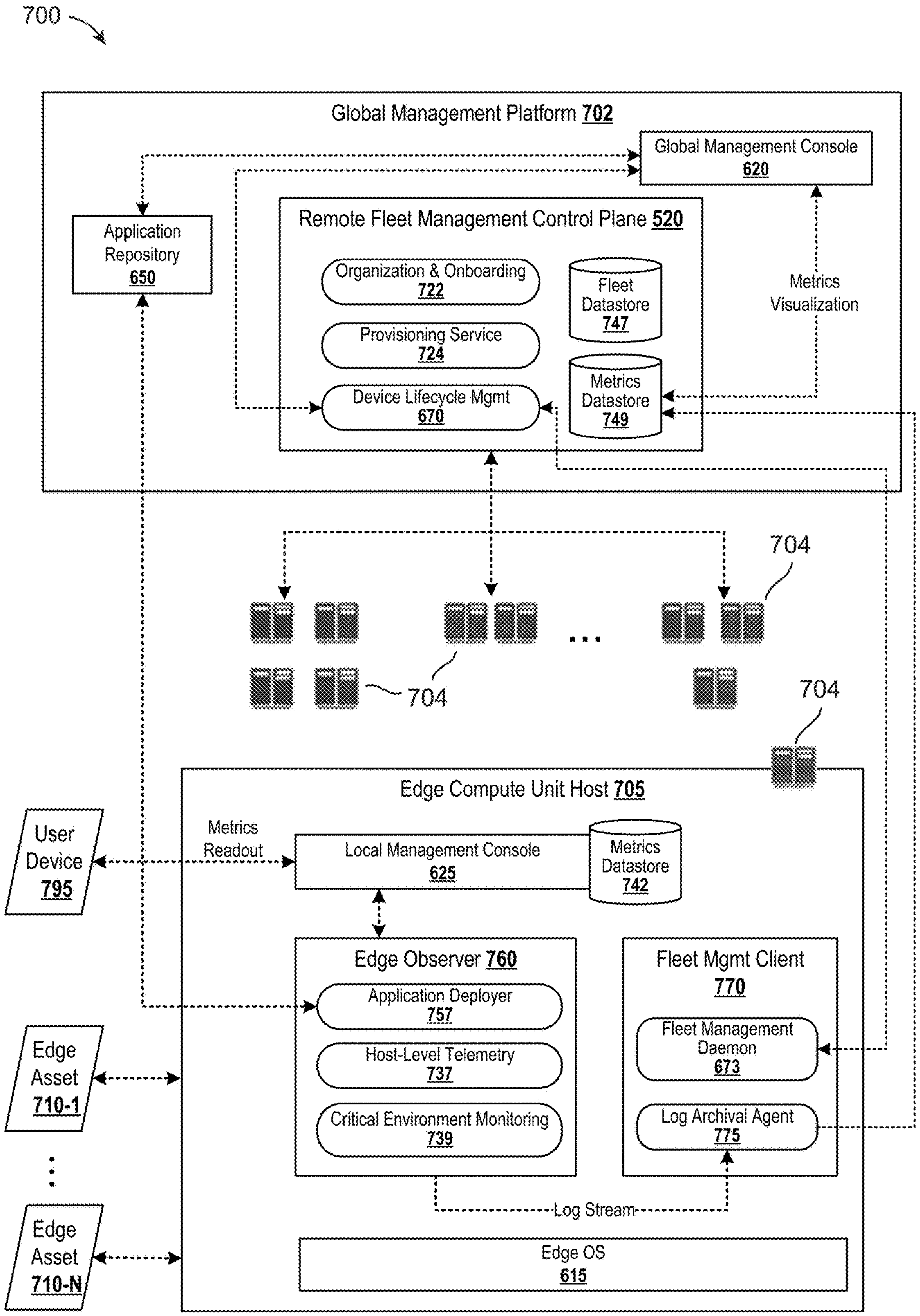
FIG. 7 is a diagram illustrating an example infrastructure and architecture for implementing an edge compute unit of an edge computing system for ML and/or AI workloads, in accordance with some examples.

FIG. 7 is a diagram illustrating an example infrastructure and architecture 700 for implementing an edge computing system for ML and/or AI workloads, according to aspects of the present disclosure. For instance, FIG. 7 includes a global management platform 702 that can be a cloud-based platform that can include one or more components that are the same as or similar to corresponding components within the platform services 602 of FIG. 6 and/or within the platform software stack 502 of FIG. 5. FIG. 7 additionally includes a plurality of edge compute units 704 (e.g., a fleet of edge compute units 704), each of which may be the same as or similar to the edge compute unit 430 of FIG. 4 and/or can include one or more components that are the same as or similar to corresponding components within the edge compute unit services 605 of FIG. 6. In particular, each edge compute unit 704 of the plurality of edge compute units can implement, include, or comprise an edge compute unit host 705, which can be the same as or similar to the edge compute unit services 605 of FIG. 6.

For instance, a global management platform 702 can include the application repository 650 and global management console 620 of FIG. 6, in addition to the remote fleet management control plane 520 of FIG. 5. The global management platform 702 can be a cloud-hosted and/or on-premises computing system that is remote from the respective local edge sites associated with various edge compute units 704 of the fleet (e.g., plurality) of edge compute units 704. For instance, global management platform 702 of FIG. 7 can be associated with one or more of cloud-based AI/ML training clusters 470 of FIG. 4, the cloud user environments 690 of FIG. 6, etc.

The remote fleet management control plane 520 can include an organization and onboarding service 722 that can be used to perform organization-specific tasks corresponding to an enterprise organization (e.g., enterprise user) of the global management platform 702 and/or the infrastructure and architecture 700 for edge computing of ML and AI workloads. For example, the onboarding service 722 can be used to onboard users for the enterprise organization, based on creating one or more user accounts for the global management console 602 and/or the local management console 625 of FIG. 7. The remote fleet management control plane 520 can additionally include a provisioning service 724 that can be used to provision various edge assets associated with (e.g., deployed by) the enterprise user. For instance, the provisioning service 724 can be associated with provisioning satellite internet constellation transceivers or connectivity units for the edge compute units 704, can be associated with provisioning the edge compute units 704, can be associated with provisioning one or more user devices (e.g., such as the user device 795), can be associated with provisioning one or more connected edge assets 710-1, . . . , 710-N (e.g., which can be the same as or similar to the connected edge assets 410 of FIG. 4), etc.

The remote fleet management control plane can include and/or can be associated with one or more databases, such as a fleet datastore 747 and a metrics datastore 749. In some aspects, the fleet datastore 747 can store data or information associated with the fleet of deployed edge compute units 704. For instance, fleet datastore 747 can communicate with one or more (or all) of the organization and onboarding service 722, the provisioning service 724, the device lifecycle management service 670, etc. In some aspects, the fleet datastore 747 and/or the metrics datastore 749 can communicate with and be accessed by the global management console 620. For instance, global management console 620 can access and communicate with the metrics datastore 749 for metrics visualization corresponding to one or more of the deployed edge compute units 704 of the fleet (e.g., plurality) of deployed edge compute units 704. In some embodiments, the fleet datastore 747 can include the local knowledge base/datastore 545 of FIG. 5, described previously above.

As mentioned previously, the global management platform 702 can be associated with and used to manage the deployment of a fleet of edge compute units 704. The various edge compute units 704 can be deployed to different edge locations. For instance, one or more edge compute units 704 can be deployed to each respective edge location that is associated with (e.g., is managed by and communicates with) the global management platform 702. As illustrated in the example of FIG. 7, a first edge location may have four edge compute units deployed (e.g., left-most deployment shown in FIG. 7), a second edge location may have two edge compute units deployed (e.g., center deployment shown in FIG. 7), a third edge location may have three edge compute units deployed (e.g., right-most deployment shown in FIG. 7), etc. A greater or lesser number of edge site locations can be utilized, each with a greater or lesser number of edge compute units 704, without departing from the scope of the present disclosure.

Each edge compute unit can be associated with an edge compute unit host 705, which is shown in the illustrative example of FIG. 7 as corresponding to a single one of the plurality of edge compute units 704. In particular, each edge compute unit 704 of the plurality of edge compute units can implement, include, or comprise an edge compute unit host 705, which can be the same as or similar to the edge compute unit services 605 of FIG. 6, and/or can include or implement one or more of the components of edge compute unit 430 of FIG. 4, etc. The edge compute unit host 705 can include the local management console 625 of FIG. 6, which may be associated with a metrics datastore 742. The metrics datastore 742 can be used to collect and store local telemetry and other metrics information generated and/or received at the edge compute unit host 705 and/or corresponding local edge site of the edge compute unit host 705. In some aspects, information included in the local metrics datastore 742 can be the same as or similar to at least a portion of the information included in the global management platform 702 metrics datastore 749. In some cases, information included in the local metrics datastore 742 can be separate or disjoint from at least a portion of the information included in the global management platform 702 metrics datastore 749.

In some examples, the local management console 625 can be communicatively coupled with the local metrics datastore 742, and can be configured to provide metrics readout information and/or visualization to one or more user devices 795 that are local to the same edge location as the edge compute unit host 705 and that are authorized to access and interface with the local management console 625 (e.g., access control and authorization may be implemented based on the organization and onboarding service 722 of the global management platform 702). The user devices 795 can include various computing devices, including but not limited to, desktop computers, laptop computers, tablet computers, smartphones, wearable computing devices, output devices or equipment, display devices or equipment, personal computing devices, mobile computing devices, portable hand units or terminals, display monitors, etc.) that may be present within or otherwise associated with the local edge site of the edge compute unit host 705.

The local management console 625 can additionally communicate with an edge observer engine 760, which can correspond to the telemetry and monitoring stack 635 of the edge compute unit services 605 of FIG. 6. In some embodiments, the edge observer engine 760 can be the same as or similar to the telemetry and monitoring stack 635 of FIG. 6. The edge observer engine 760 can include a host-level telemetry service 737 and a critical environment monitoring service 739 (one or more, or both, of which can be included in the telemetry and monitoring stack 635 of FIG. 6). The critical environment monitoring service 739 can be used to monitor environmental parameters of the edge compute unit 704/edge compute unit host 705, such as temperature, humidity, airflow, vibrations, energy consumption, etc. The critical environment monitoring service 739 can ingest, obtain, or otherwise access corresponding sensor data or sensor data streams from environmental monitoring sensors, which can include one or more (or all) of the environmental sensors 412 of FIG. 4. In some aspects, the edge observer engine 760 can additionally include an application deployer 757, which can communicate with the cloud-based application repository 650 of the global management platform 702 (e.g., the cloud-based application repository 650 of FIG. 6). In some embodiments, log data from the edge observer engine 760 can be transmitted (e.g., as a log stream) from the edge observer engine 760 to a log archival agent 775 of a fleet management client 770 included in the edge compute unit host 705. The log archival agent 775 can, in some aspects, parse and/or archive (e.g., store or transmit for storage) some or all of the log stream data received from and/or generated by the edge observer engine 760. For instance, the log archival agent 775 of the fleet management client 770 can transmit the log stream data received from and/or generated by edge observer engine 760 to the cloud-based metrics datastore 749 of the global management platform 702, where the transmitted log stream data from the cloud-based metrics datastore 749 can be used for metrics visualization at or using the global management console 620 (also of the global management platform 702).

In some aspects, the fleet management client 770 included in or deployed on the edge compute unit host 705 can be associated with the fleet of deployed edge compute units 704. For instance, the fleet management client 770 can associate the particular edge compute unit host 705 with the corresponding additional edge compute unit hosts 705 that are also included in the same fleet. In some aspects, the fleet management client 770 can be used to coordinate and implement distributed operations (e.g., computational operations, such as finetuning, retraining, etc., of one or more AI/ML models) across multiple edge compute units 704 of the fleet. For instance, in one illustrative example, distributed finetuning or retraining of an AI/ML model across multiple edge compute units 704 be orchestrated by a respective fleet management client 770 that is implemented at or by each of the multiple edge compute units 704. As illustrated, the fleet management client 770 can include the fleet management daemon 673 described above with respect to FIG. 6. The fleet management daemon 673 of the fleet management client 770 provided on each edge compute unit host 705 can communicate with the device lifecycle management service 670 of the remote fleet management control plane 520 implemented in the global management platform 702. In some aspects, the fleet management daemon 673 of the fleet management client 770 provided on each edge compute unit host 705 can communicate with the remote fleet management control plane 520, the global management console 620, and/or various other component and services within the global management platform 702 of FIG. 7.

In some aspects, the edge compute unit host 705 can communicate with a plurality of connected edge assets 710-1, . . . , 710-N. As noted previously, the connected edge assets 710-1, . . . , 710-N can be the same as or similar to the connected edge assets 410 of FIG. 4, and can include various sensors, computing devices, etc., that are associated with an edge deployment location of the edge compute unit host 705. For instance, the connected edge assets 710-1, . . . , 710-N in communication with the edge compute unit host 705 can include, but are not limited to, one or more of sensors such as cameras, thermal imagers, lidars, radars, gyroscopes, accelerometers, vibrometers, acoustic sensors or acoustic sensor arrays, sonar sensors or sonar sensor arrays, pressure sensors, temperature sensors, X-ray units, magnetic resonance imaging (MRI) units, electroencephalogram (EEG) units, electrocardiogram (ECG) units, inertial navigation system (INS) units, inertial measurement units (IMUs), GPS modules, positioning system modules, compass sensors, directional sensors, magnetic field sensors, robotic platforms, robotic units, robotic devices, etc., among various others. In some aspects, the connected edge assets 710-1, . . . , 710-N associated with the edge compute unit host 705 can include all devices connected to edge compute units that have local ingress and egress of data.

Resiliency and Redundancy: Software Stack and Hardware Provisioning

As noted previously, systems and techniques are described herein that can be used to implement resiliency and redundancy to hardware and/or software faults, such as rack-level or node-level failures of compute hardware within a containerized edge data center apparatus (e.g., such as the edge compute unit 300*a* of FIG. 3A, 300*b* of FIG. 3B, 430 of FIG. 4, 704 of FIG. 7, etc.). In one illustrative example, resiliency and redundancy can be implemented based on striping the control plane of a management cluster of the edge compute unit across multiple redundant nodes that are provided on different racks within the edge compute unit and/or based on striping the control plane of a workload cluster of the edge compute unit across multiple redundant nodes that are provided on different racks within the edge compute unit. In some embodiments, the management cluster (MC) and/or the workload cluster (WC) can be implemented based on Kubernetes or Kubernetes clusters. In some aspects, the Kubernetes-based MC and/or WC clusters can be configured with rack-awareness corresponding to the physical rack locations and/or physical rack configurations of the nodes of the edge compute unit, as will be described in greater depth below.

Figure 8:
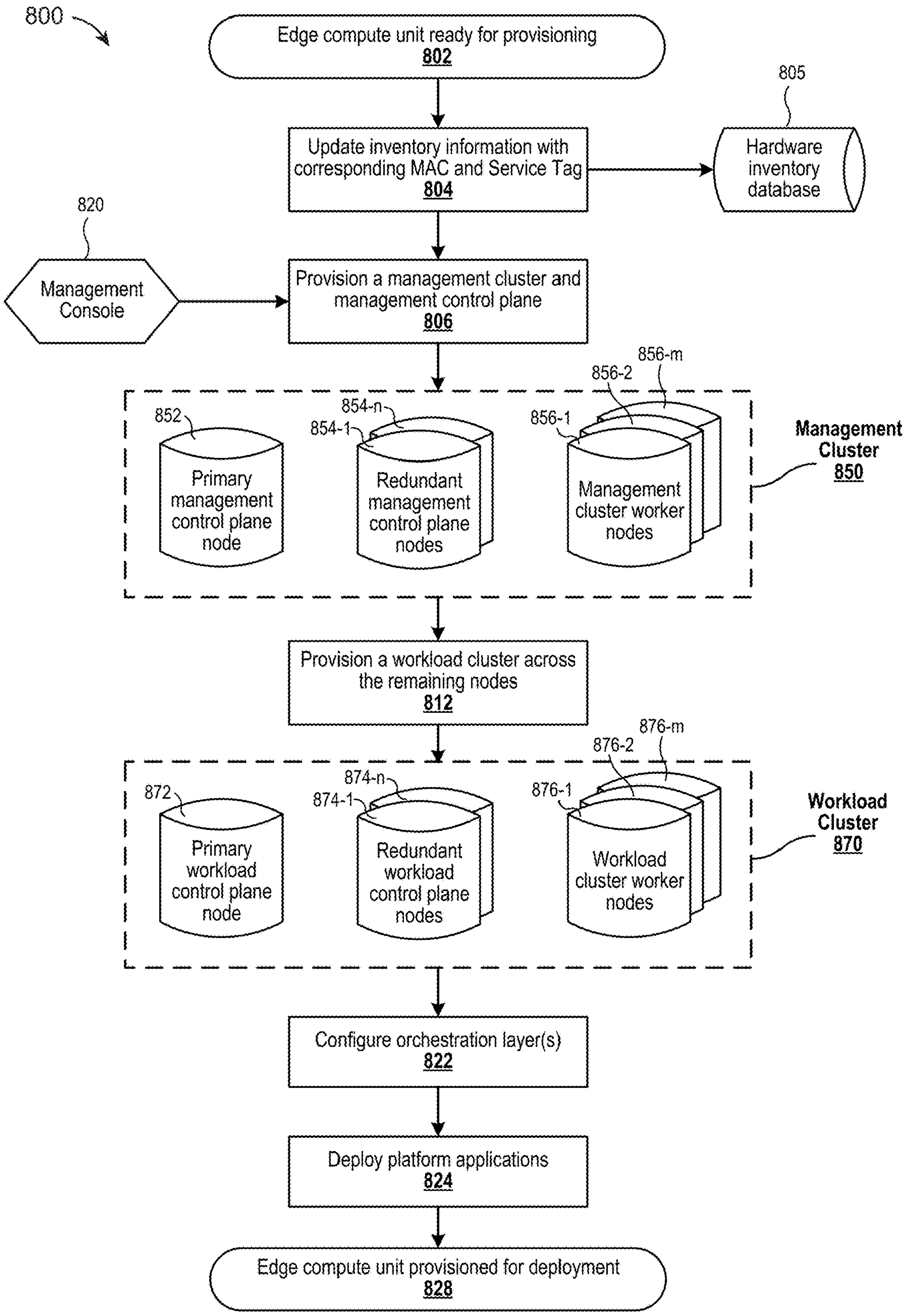
FIG. 8 is a diagram illustrating an example of a hardware provisioning process for control plane and software stack resiliency for an edge compute unit, in accordance with some examples.

FIG. 8 is a diagram illustrating an example of a hardware provisioning process 800 for control plane and software stack resiliency for an edge compute unit, in accordance with some examples. For example, the hardware provisioning process 800 can be implemented on, by, for, etc., an edge compute unit that is the same as or similar to one or more of the containerized edge data center apparatus/unit 300*a* of FIG. 3A or 300B of FIG. 3B, the edge compute unit 430 of FIG. 4, the edge compute unit 704 of FIG. 7, etc.

As contemplated herein, each edge compute unit can include a plurality of different racks of compute hardware (e.g., computational hardware and/or components that are deployed or otherwise implemented using a rack-based form factor or chassis, etc.). For instance, the example cutaway view of the containerized edge data center unit 300*b* (e.g., an edge compute unit) of FIG. 3B depicts various internal server racks that are included within the interior or containerized volume of the containerized edge data center unit 300*b* and may be used to deploy various computational hardware and components, etc. For example, a first server rack 345-1 can implement a first plurality of compute nodes, a second server rack 345-2 can implement a second plurality of compute nodes, . . . , and an $n^{th}$ server rack **345-*n*** can implement an $n^{th}$ plurality of compute nodes, etc. In various examples, an edge compute unit can include different quantities n of racks. In some embodiments, an edge compute unit can be configured and/or provisioned to provide resiliency and redundancy to hardware and/or software faults and failures based on the edge compute unit including at least n≥3 server racks each with respective computational hardware and/or components deployed thereupon.

In some embodiments, the provisioning process 800 of FIG. 8 can be used to provide resiliency and redundancy for an edge compute unit at both an initial provisioning stage performed at or prior to the time of deployment of the edge compute unit to an edge site location, and on an ongoing basis (e.g., maintenance or monitoring stage, etc.) during the deployment or lifecycle of the edge compute unit. In other words, with reference to the provisioning process 800 depicted in FIG. 8, the block 802 determination of an edge compute unit ready for provisioning can correspond to an edge compute unit that is being provisioned for the first time and/or can correspond to an edge compute unit that is being re-provisioned or otherwise provisioned in an ongoing manner.

The provisioning process 800 may also be referred to herein as a configuration process and/or as a re-configuration process. At block 804, the process 800 can include updating inventory information stored in a hardware inventory database 805 with corresponding media access control (MAC) information and/or Service Tag information corresponding to the physical hardware components included in the compute module of an edge compute unit (e.g., the edge compute unit identified or selected as being ready for provisioning at the previous block 802). In some aspects, the MAC and Service Tag information can be determined for discrete, physical hardware components such as individual servers or blades of a rack, networking components such as switches or routers, etc. In some embodiments, the updated inventory information of block 804 may extend to additionally include various other component-level information, values, etc., some or all of which may also be stored in the hardware inventory database 805.

Figure 9:
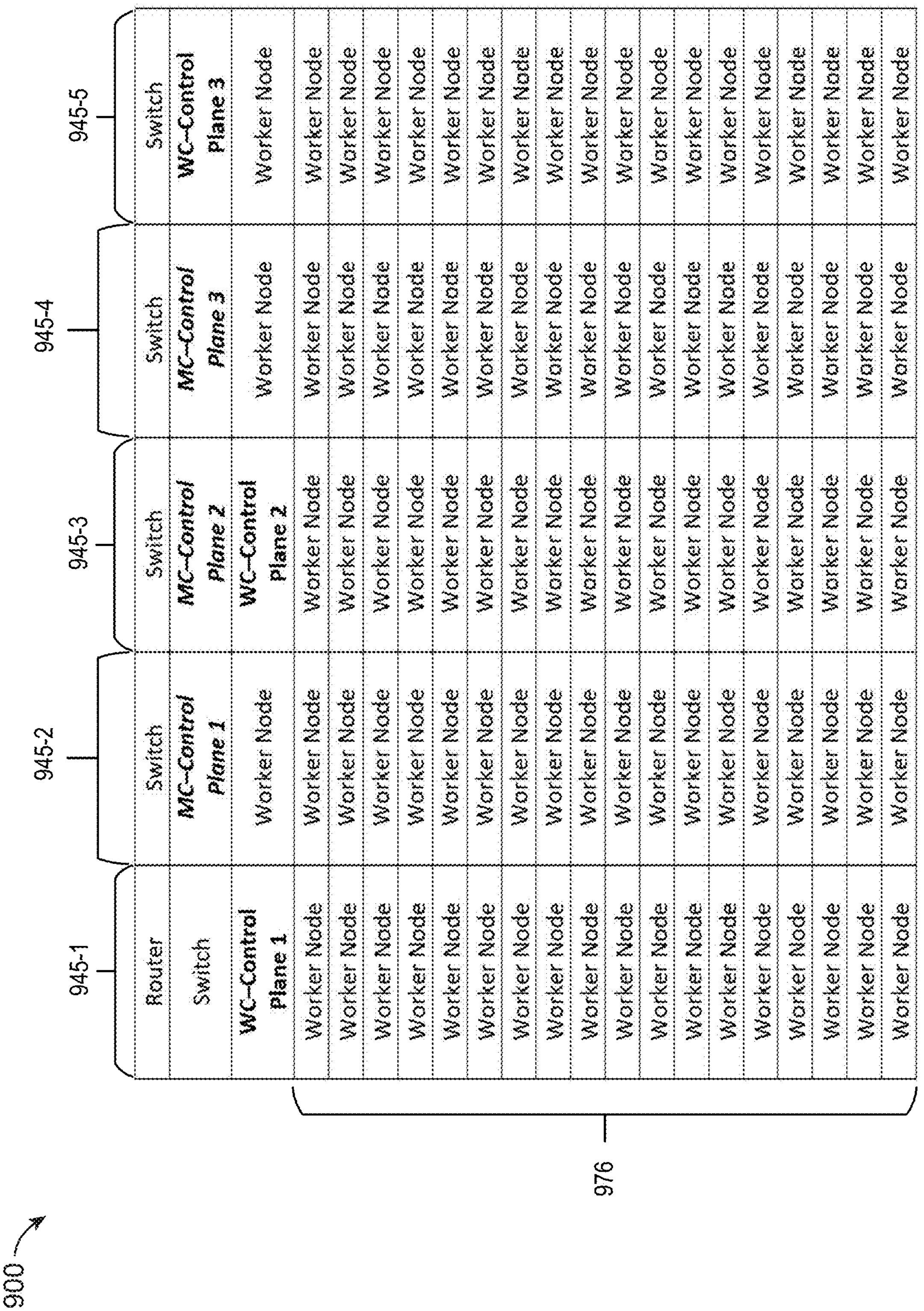
FIG. 9 is a diagram illustrating an example rack and node provisioning implementation corresponding to an edge compute unit with five server racks, in accordance with some examples.

In some embodiments, the updated inventory information of block 804 can include (or can be used to determine) a plurality of nodes that can be provided on each server rack of the edge compute unit. For instance, FIG. 9 is a diagram illustrating an example rack and node provisioning implementation 900 corresponding to an edge compute unit with five server racks, in accordance with some examples. As illustrated, each respective rack of the five server racks 945-1, 945-2, 945-3, 945-4, 945-5 can include a plurality of compute nodes or other hardware components. In some embodiments, each row of the diagram of FIG. 9 can correspond to one or more rack units of the particular server rack (or a portion of a rack unit hardware device). For instance, a 32U server rack can support up to 32 modular rack units (where each rack unit U corresponds to a predetermined rack height and corresponding space or volume within the rack).

As illustrated, the server rack 945-1 can include a router that occupies one or more rack units and a switch that occupies one or more rack units. The remaining rack units of the server rack 945-1 can include computational hardware that is used to implement a plurality of compute nodes (e.g., shown here as the WC-Control Plane node 1 and the 18 worker nodes; described in greater detail below). Similarly, the server rack 945-2 is shown to include a switch, an MC-Control Plane node 1, and 19 worker nodes. The server rack 945-3 is shown to include a switch, an MC-Control Plane node 2, a WC-Control Plane node 2, and 18 additional worker nodes. The server rack 945-4 is shown to include a switch, an MC-Control Plane node 3, and 19 additional worker nodes. The server rack 945-5 is shown o include a switch, a WC-Control Plane node 3, and 19 additional worker nodes.

In some aspects, the nodes of the racks 945-1, . . . , 945-5 can be implemented as physical nodes provided on or by different rack units of the respective server rack. In some examples, the nodes of the racks 945-1, . . . , 945-5 can be implemented as logical or virtualized nodes that are running on or across the hardware resources provided by the respective server rack.

Returning to the discussion of the provisioning process of FIG. 8, in some embodiments the updated inventory information determined at block 804 can include inventory or identification information associated with or otherwise corresponding to the plurality of nodes implemented across the plurality of racks 945-1, . . . , 945-5 of FIG. 9. For instance, determining inventory information at block 804 of the provisioning process 800 of FIG. 8 can include determining the available nodes of the respective racks of the edge compute unit, or determining the maximum quantity of nodes that can be provisioned, configured for, or otherwise implemented using the respective racks of the edge compute unit, etc.

At block 806, the process 800 can include provisioning a management cluster (MC) and management control plane for the plurality of nodes spread across the plurality of racks of the edge compute unit. In some aspects, the management cluster and management control plane provisioning of block 806 can be performed based on one or more inputs, configurations, commands, etc. that are received from a management console 820.

In one illustrative example, the management console 820 of FIG. 8 can be the same as or similar to one or more of: the remote fleet management control plane 520 of FIG. 5, the global management console 620 of FIG. 6, the local management console 625 of FIG. 6, the device/asset lifecycle management engine 670 of FIG. 6, etc. In some embodiments, the management console 820 of FIG. 8 can be the same as or similar to the global management platform 702, the global management console 620, the remote fleet management control plane 520, etc., as shown in FIG. 7. In one illustrative example, the management console 820 of FIG. 8 can correspond to or otherwise be associated with one or more of the provisioning service 724 of FIG. 7, and/or the organization and onboarding service 722 also shown in FIG. 7 as part of the remote fleet management control plane 520.

In the context of FIG. 8, the management cluster and management control plane provisioning performed at block 806 can be performed in order to support the later installation and/or deployment of platform applications (e.g., third-party and/or first-party ML/AI applications, as have been discussed previously above with respect to FIGS. 4-7) on the edge compute unit. In one illustrative example, the edge compute unit can include or otherwise implement an application orchestrator (e.g., an application orchestration layer) that enables the various applications and workloads to run on top the edge compute unit. In some embodiments, the application orchestrator can be implemented based on Kubernetes, as will be described in greater depth below.

In particular, it is contemplated that the deployment of the application orchestrator may be performed for the edge compute unit such that the control plane and the worker nodes thereof are distributed across different individual racks of the edge compute unit-distributing the control plane and worker nodes can be seen to ensure that a failure in one rack does not take down the whole control plane or application replicas, which have redundant copies available on different individual racks of the edge compute unit (e.g., racks other than the particular rack experiencing failure).

As illustrated in FIG. 8, a provisioning process 806 (e.g., also referred to as a provisioning step 806 and/or the provisioning 806, etc.) can be performed for the management cluster and management control plane, where the provisioning process 800 is configured to provision the management cluster (MC) 850 to include one or more redundant nodes for providing improved resiliency against failures. In particular, a primary management control plane node 852 can be provisioned on a first server rack of the edge compute unit, and one or more redundant management control plane nodes 854-1, . . . , 854-*n* can be provisioned on respective server racks that are different from the first server rack and different from one another. The management cluster 850 can be deployed in combination with a workload cluster 870 for the efficient management of cluster lifecycle. The management cluster 850 can be used to manage the lifecycle of a plurality of workload clusters. The workload clusters can be used to run first-party and/or third-party applications and workloads on the edge compute unit (e.g., including the various platform and third-party ML/AI applications, services, workloads, etc., described variously above with respect to FIGS. 3-7).

For instance, the primary management control plane node 852 of FIG. 8 can be the same as or similar to the MC-Control Plane node 1 provisioned on the second server rack 945-2 of FIG. 9. In an example where a total of three management control plane nodes are utilized (e.g., the one primary MC control plane node and two redundant MC control plane nodes), the redundant management control plane node 854-1 can be the same as or similar to the MC Control Plane node 2 provisioned on the third server rack 945-3 of FIG. 9; the redundant management control plane node 854-*n* can be the same as or similar to the MC Control Plane node 3 provisioned on the fourth server rack 945-4 of FIG. 9; etc.

In some embodiments, the management cluster 850 can be provisioned to include one or more management cluster worker nodes 856-1, 856-2, . . . , 856-*m*. In one illustrative example, the management cluster 850 can include an equal number of MC control nodes and MC worker nodes. For instance, the three MC control nodes 852, 854-1, 854-*n* can correspond to three MC worker nodes 856-1, 856-2, 856-*m* included in the management cluster 850. In the example of FIG. 9, the MC Control Plane node 1, 2, and 3 can each correspond to a respective MC control plane worker node. Each MC worker node may be provided on the same respective server rack (e.g., same one of 945-1, . . . , 945-5) as a corresponding one of the three MC Control Plane nodes 1, 2, or 3. In some embodiments, MC worker nodes can be provided on a same or different server rack relative to one or more of the MC Control Plane nodes 1, 2, 3, etc.

In some aspects, the management cluster 850 is utilized for managing the lifecycle of customer (e.g., user) workload clusters. For instance, the management cluster 850 can be used to manage the lifecycle of workload cluster 870 illustrated in FIG. 8. The workload cluster lifecycle management performed by the management cluster 850 can include management in terms of operating system lifecycle and individual platform application lifecycle. As noted previously above, the management cluster 850 can be a Kubernetes cluster or a Kubernetes-based cluster, in at least some embodiments. The workload cluster 870 can also be a Kubernetes or Kubernetes-based cluster. In some aspects, the Kubernetes-based management cluster 850 and/or workload cluster 870 can be configured with rack-awareness corresponding to the physical rack locations and/or physical rack configurations of the nodes of the edge compute unit. For instance, the management cluster 850 can be configured with rack-awareness such that the management cluster 850 can differentiate between various compute nodes that are located on particular ones of the five server racks 945-1, . . . , 945-5 of the example of FIG. 9. The workload cluster 870 can additionally be configured with rack-awareness such that the workload cluster 870 can differentiate between various compute nodes that are located on particular or respective ones of the five server racks 945-1, . . . , 945-5 of the example of FIG. 9.

In one illustrative example, the management cluster 850 implementation of FIG. 8 can achieve inherent redundancy based on the use of a configuration that includes at least three control plane nodes and at least three worker nodes (e.g., also referred to as a "3 Control plane-3 Worker configuration"), where the three control plane nodes corresponding to the configuration are spread across three different server racks of the edge compute unit, and the three worker nodes corresponding to the same configuration are also spread across three different server racks of the edge compute unit (e.g., as described above and as illustrated in FIG. 9). In some embodiments, server rack awareness of the Kubernetes cluster deployments used for the management cluster 850 and/or the workload cluster 870 can be implemented based on corresponding modifications made to the Kubernetes cluster deployment code to provide the server rack awareness.

At block 812, the management cluster 850 can be used to provision a workload cluster (e.g., the workload cluster 870) across the remaining nodes of the edge compute unit (e.g., the edge compute unit for which process 800 is being performed). For instance, the remaining nodes of the edge compute unit can refer to any node that has not already been provisioned for the management cluster 850 (e.g., the portion of the plurality of nodes that is not included in management cluster 850). The workload cluster 870 is used to run various third-party and/or first-party workloads, applications, jobs, etc., and can be considered the computational workhorse of the edge compute unit. In some embodiments, the workload cluster 870 can be configured to include a quantity of workload cluster (WC) control plane nodes that is less than the quantity of workload cluster worker nodes. For instance, in one illustrative example, the workload cluster 870 can include three control plane nodes and N worker nodes, where N>>3.

In some embodiments, the workload cluster (WC) 870 can be provisioned to include one or more redundant control plane nodes for providing improved resiliency against failures. For instance, the WC 870 control plane nodes can be provisioned in a manner the same as or similar to that described above for the provisioning of the MC 850 control plane nodes at block 806. In some examples, the workload cluster provisioning across the remaining nodes performed at block 812 can include provisioning a primary workload control plane node 872 and one or more redundant workload control plane nodes 874-1, 874-*n*, where each of the primary and redundant workload control plane nodes are provisioned on different respective racks of the edge compute unit.

In some aspects, the workload cluster 870 can include three control plane nodes that are the same as or similar to the first WC-Control Plane node 1 provided on the first rack 945-1 of FIG. 9; the second WC-Control Plane node 2 provided on the second rack 945-3 of FIG. 9; and the third WC-Control Plane node 3 provided on the fifth rack 945-5 of FIG. 9. As illustrated, the workload cluster 870 control plane nodes can share a rack with a management cluster 850 control plane node (e.g., such as in the example of the third server rack 945-3 of FIG. 9, which includes the second MC-Control Plane node 2 and the second WC-Control Plane node 2).

In another example, the workload cluster 870 control plane nodes can be provided on a rack with no other control plane nodes (e.g., such as WC-Control Plane node 1 on the first rack 945-1, and the WC-Control plane node 3 provided on the fifth rack 945-5). Similarly, the management cluster 850 control plane nodes can in some cases be provided on a rack with no other control plane nodes, such as the MC-Control Plane node 1 provided on the second rack 945-2, the MC-Control Plane node 3 provided on the fourth rack 945-4, etc.

In some embodiments, the workload cluster 870 can be provisioned to include a plurality of workload cluster worker nodes 876-1, 876-2, . . . , 876-*m*. As noted previously above, the quantity of workload cluster worker nodes can be larger than the quantity of workload cluster control plane nodes (e.g., m>>n for at least workload cluster 870; for the management cluster 850, m=n=3 in at least some embodiments). In some cases, the edge compute unit includes a plurality of nodes distributed across a plurality of different server racks. The workload cluster worker nodes 876-1, 876-2, . . . , 876-*m* can include the remaining portion of the plurality of nodes other than the nodes provisioned as either management control plane nodes (e.g., 852, 854-1, 854-*n*) or as workload control plane nodes (e.g., 872, 874-1, 874-*n*).

For example, the workload cluster 870 of FIG. 8 can be implemented using a 3 Control plane-M worker node configuration, as illustrated in the example implementation 900 of FIG. 9. In the example of FIG. 9, a workload cluster (e.g., workload cluster 870) can include the first WC-Control Plane node 1 provisioned on first rack 945-1, the redundant WC-Control Plane node 2 provisioned on third rack 945-3, and the redundant WC-Control Plane node 3 provisioned on fifth rack 945-5. The M worker nodes of the workload cluster implementation of FIG. 9 can correspond to the plurality of worker nodes 976 distributed across all five of the racks 945-1, . . . 945-5. As noted previously, although the example of FIG. 9 shows a plurality of workload cluster worker nodes 976 that includes an equal quantity of worker nodes for each server rack 945-1, . . . , 945-5 (e.g., 18 worker nodes for each of the five server racks 945-1, . . . , 945-5), unequal numbers of worker nodes can be provisioned for some (or all) of the various server racks 945-1, . . . , 945-5.

In some embodiments, the systems and techniques described herein provide control plane redundancy for both the management cluster 850 control plane nodes and the workload cluster 870 control plane nodes, based on provisioning at least three control plane nodes (e.g., one primary and at least two redundant) for each of the management cluster 850 and the workload cluster 870. In particular, redundancy and resiliency to rack-level failure can be achieved based on deploying at least three control plane nodes for each cluster, with placement of the three respective control plane nodes configured to ensure that the control plane nodes of a particular cluster (e.g., either management cluster 850 or workload cluster 870) are each distributed across different respective racks of the edge compute unit (e.g., different respective racks of the plurality of racks 945-1, . . . , 945-5 of FIG. 9).

In one illustrative example, the systems and techniques described herein can additionally be configured to provide redundancy in application replicas and/or storage redundancy, as will be described below. For instance, in some aspects, the process 800 can include configuring one or more orchestration layers 822 for implementing application replica redundancy and/or storage redundancy. In some aspects, separate orchestration layers 822 can be used, for instance an application orchestration layer can be configured to provide application replica redundancy and a storage orchestration layer can be configured to provide storage redundancy. In other examples, a single (e.g., combined) orchestration layer 822 can be configured and used to provide both application replica redundancy and storage redundancy.

For example, the orchestration layer(s) 822 configuration can be associated with an orchestration platform used to deploy the management cluster 850 and/or workload cluster 870. As noted previously, in at least some embodiments, the management cluster 850 and/or workload cluster 870 can be Kubernetes clusters, Kubernetes-based clusters, etc., among various other container orchestration platforms for automating the deployment, scaling, and management of containerized applications.

The orchestration cluster master node can implement the control plane for the cluster to manage the overall cluster state (e.g., the management cluster nodes 852, 854-1, 854-*n*; the workload cluster nodes 872, 874-1, 874-*n* implement their respective orchestration cluster master nodes). The orchestration cluster worker nodes are implemented as physical, logical, virtual, etc., machines where the containerized applications are run. Advantages of using the container orchestration platform-based approaches (e.g., using Kubernetes or Kubernetes-based clusters for management cluster 850 and/or workload cluster 870) can include the ability to provide automatic scaling of services based on various metrics (e.g., CPU usage, etc.); self-healing based on the automatic replacement or rescheduling of failed containers or containerized applications, etc.; management of versioning and rollbacks; load balancing based on distribution of network traffic and/or workloads across a set of pods; volume management for management of storage options; etc.

In some cases, one or more of the features described above may be enabled by the use of application replicas. For instance, application replicas within the clusters (e.g., MC 850, WC 870, etc.) can be used to improve availability, load balancing, and/or scaling, etc. In some examples, application replicas can be implemented so that if a pod or node fails, the application remains available based on the replicas being used to provide multiple running instances of the application (e.g., with multiple instances running, the failure of one instance does not result in downtime). Similarly, load balancing can be implemented based on distributing traffic to the application across the multiple corresponding application replicas. Scalability can be provided by dynamically adjusting replicas based on various metrics or events, to scale the number of application replicas up or down as needed. The use of multiple replicas also can allow the performance of rolling updates without application downtime; in some aspects, resource utilization for underlying nodes can be optimized based on placing replicas on particular nodes based on resource requirements, etc. (e.g., in instances where different or particular nodes have different resource availability or hardware configurations).

In one illustrative example, the systems and techniques described herein can configure the orchestration layer(s) 822 to provide redundancy in application replicas by distributing application replicas (e.g., replicas for a given application deployed to the edge compute unit) across different server racks, in a manner the same as or similar to that described above for distributing the MC and WC control plane nodes across different server racks of the edge compute unit. This application deployment process can ensure that the application replicas corresponding to the same application are spread across different server racks, such that a single rack failure does not take down all (or a majority, or multiple, etc.) replicas of any given application deployed to the edge compute unit at block 824 of process 800.

In some embodiments, the application replica redundancy can be implemented at the time of deployment at block 824, such that the initial deployment and replication of each application of a plurality of applications deployed to the edge compute unit is distributed across different server racks. In some aspects, the application replica redundancy implementation can be run continuously or periodically to ensure that application replicas remain distributed across different respective server racks within the edge compute unit. For instance, the orchestration layer(s) 822 can periodically check to make sure each replica for each respective application of a plurality of applications deployed to the edge compute unit are provided on a different server rack of the plurality of server racks 945-1, . . . , 945-5 of FIG. 9, etc.

In another illustrative example, the systems and techniques can be used to provide storage redundancy for a storage layer that is deployed on top of the container orchestration platform associated with MC cluster 850 and WC cluster 870 (e.g., a storage layer deployed on top of Kubernetes or a Kubernetes-based implementation).

For instance, a storage orchestration layer 822 can be configured to provide storage redundancy across the different racks of the edge compute unit (e.g., for example, using a cloud-native storage orchestrator such as Rook, etc., which can be configured to provision a ceph-based object, block, and/or file storage system on top of Kubernetes, etc.). In some aspects, the storage orchestration layer 822 provides storage redundancy at the software layer, which can be applied separate and/or independent from any hardware-level redundancy mechanisms such as RAID, etc. In some embodiments, storage redundancy is achieved for the edge compute unit in the software-layer only, and hardware-level redundancy and/or RAID is not utilized for the edge compute unit. In other examples, storage redundancy based on storage orchestration layer 822 can be combined with hardware-level redundancy and/or RAID implementations for the edge compute unit. In some embodiments, the storage orchestration layer 822 can be configured to provide rack-aware storage redundancy, in a manner the same as or similar to the rack-aware control plane provisioning redundancy described above for the MC 850 and WC 870. For instance, the storage orchestration layer 822 can be configured to spread the storage redundancy across different physical server racks of the edge compute unit (e.g., different ones of the physical server racks 945-1, . . . , 945-5 shown in FIG. 9; etc.) to ensure that copies of the same data are not written to the same physical server rack, again making the edge compute unit software stack resilient to rack-level hardware failures of the underlying compute components included in the edge compute unit.

After deploying the platform applications at block 824, subject to the application replica redundancy and storage redundancy described above, the provisioning process 800 can be completed, and at block 828 the edge compute unit is provisioned for deployment.

Self-Healing Engine and Dynamic Fault Tree

As noted previously, systems and techniques are described herein that can be used to provide self-healing features and/or capabilities for an edge compute unit, based on using an ML/AI-based self-healing engine implemented by or for an edge computing unit. In one illustrative example, the self-healing engine and dynamic fault tree can be implemented by or for an edge compute unit that is the same as or similar to one or more of the containerized edge data center apparatus 300*a* of FIG. 3A or 300*b* of FIG. 3B; the edge compute unit 430 of FIG. 4; the edge compute unit(s) 704 of FIG. 7; etc. In some aspects, the self-healing engine and dynamic fault tree described herein can be implemented for an edge compute unit in combination with the provisioning-based rack-aware resiliency and redundancy described above with respect to FIGS. 8 and 9.

In general, the self-healing can be performed to remediate at least a first subset of detected faults in a fully automated manner (e.g., automatically detecting the fault, automatically determining one or more appropriate or optimal remediation actions for resolving the automatically detected fault, and implementing the one or more remediation actions in hardware and/or software of the edge compute unit to resolve the fault). The self-healing can additionally, or alternatively, be performed to remediate at least a second subset of detected faults in a partially automated manner-such as for faults that require manual or human actions to be performed for remediation. For instance, the self-healing ML/AI engine can automatically detect and determine the remediation actions for such class of faults, and may implement at least a portion of the remediation action that is automatable, while providing an output recommendation or indication to a human user for performing the required physical action(s) or component(s) of the automatically generated remediation action(s). In another example, the self-healing ML/AI engine can detect a fault that requires fully physical (e.g., manual, physical, etc.) intervention in order to achieve remediation. In such cases, the self-healing ML/AI engine of the edge compute unit can detect and generate the recommended optimal remediation actions for the fault without human intervention, and generate an output to one or more users indicative of the required, recommended, optimal, etc., manual/physical intervention for resolving the detected fault(s).

Figure 10:
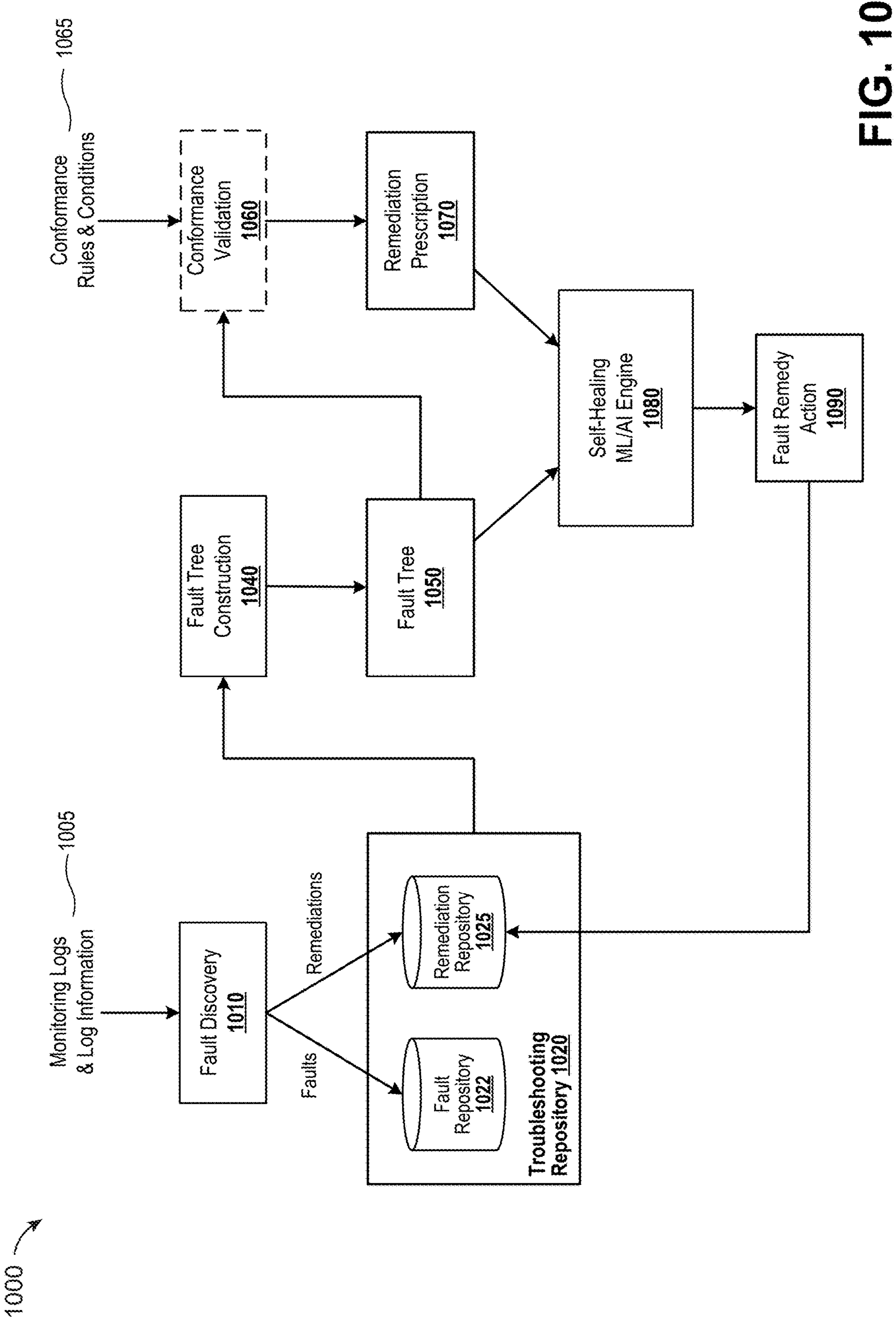
FIG. 10 is a diagram illustrating an example of a self-healing process that can be implemented to remediate or self-hear one or more faults detected in association with an edge compute unit, in accordance with some examples.

For instance, FIG. 10 is a diagram illustrating an example of a self-healing process 1000 that can be implemented to remediate and/or perform self-healing of one or more faults detected in association with an edge compute unit, in accordance with some examples. As noted above, the self-healing process 1000 can be used in combination with the resiliency and redundancy to failures based on rack-aware provisioning, as was described above with respect to FIGS. 8 and 9. For example, the self-healing process 1000 can be used to remediate and/or perform self-healing for various faults that are unable to resolved purely through the rack-aware provisioning-based resiliency and redundancy approaches described previously.

In some aspects, some types of failures can be automatically remediated or otherwise resolved based on provisioning or re-provisioning the nodes and/or server racks within the edge compute unit. This class of failures or faults can be resolved without requiring the use of the self-healing process 1000. For instance, when a failure or fault occurs for one or more nodes on the edge compute unit, or for an entire server rack of the edge compute unit, the management cluster 850 of FIG. 8 can be used to re-provision the remaining racks and nodes, to apply one or more updates for the remaining racks and nodes (or the provisioning thereof), to move or shift around different portions of the MC 850 or WC 870, etc. to resolve the failure or fault condition. For instance, if one of the MC-Control Plane nodes 1, 2, or 3 fail (or if the respective server rack 945-2, 945-3, 945-4 fails), the remaining management control plane node(s) can be configured to recover from the failure by re-provisioning (or provisioning a copy of) the failed management control plane node onto a different server rack.

For instance, if MC-Control Plane node 1 or server rack 945-2 fails, the remaining management control plane nodes MC-Control Plane node 2 and 3 can provision a new instance of MC-Control Plane node 1 on one or more of the first server rack 945-1 or the fifth server rack 945-5. In some aspects, the new instance of MC-Control Plane node 1 can be provisioned by replacing a previously provisioned workload cluster (WC) worker node on the respective server rack 945-1 or 945-2.

Similarly, in another example, if the entire third server rack 945-3 fails or experiences a fault, the management cluster 850 and control plane nodes thereof (e.g., MC-Control Plane nodes 1, 2, 3 of FIG. 9; management control plane nodes 852, 854-1, **854-*n* of FIG. 8) can be used to provision a new instance of at least the MC-Control Plane node 2 (previously deployed on the now-failed server rack 945-3) to one of the server racks 945-1 or 945-05, which do not already have a management control plane node provisioned thereon. The management cluster 850 and control plane nodes thereof can additionally provision a new instance of the WC-Control Plane node 2 (previously deployed on the now-failed server rack 945-3) to one of the server racks 945-2 or 945-4**, which do not already have a workload control plane node provisioned thereon.

Other types or classes of faults and/or failures, both software-based and/or hardware-based, may be unable to be resolved or remediated by re-provisioning alone. For instance, faults with power supply units may require replacement of the fault power supply, transitioning to a backup power supply unit, reducing power consumption of the attached load to below a reduced threshold at which the faulty power supply unit may operate normally for at least a temporary basis, etc. In another example, faults with satellite internet constellation connectivity may require replacement of the edge compute unit's satellite terminal, or a component thereof, and consequently are also representative of a class of faults that are not resolved through re-provisioning alone.

In one illustrative example, the self-healing process 1000 of FIG. 10 can be used to automatically detect and determine one or more remediation actions (e.g., referred to as a remediation plan, a remediation prescription, a remedy action, etc.) corresponding to one or more detected faults or combinations of faults. In some embodiments, the self-healing process 1000 can be implemented locally for some (or all) of the respective edge compute units included in a fleet of edge compute units (e.g., such as each edge compute unit 704 included in the fleet of edge compute units 704 shown in FIG. 7; etc.).

The self-healing process can be implemented based on a self-healing ML/AI engine 1080 that implements one or more trained ML or AI models that are configured to perform various tasks and actions, including but not limited to, fault discovery or detection (e.g., associated with and/or implemented by fault discovery engine 1010 of FIG. 10); fault or remedy definition (e.g., associated with and/or implemented by fault discovery engine 1010, the self-healing system 1000, and/or the fault tree construction engine 1040, etc.); conformation validation or analysis (e.g., based on the conformance rules 1065 implemented by the conformance validation engine 1060, both described in greater detail below); fault tree construction (e.g., associated with and/or implemented by fault tree construction engine 1040); fault tree maintenance or updating (e.g., associated with and/or implemented by fault tree construction engine 1040, etc.); and/or remediation prescription (e.g., associated with and/or implemented by the remediation prescription engine 1070 and/or the self-healing ML/AI engine 1080, etc.); etc.

In some embodiments, the self-healing ML/AI engine 1080 can be implemented as a first-party or platform application that is deployed to an edge compute unit. For instance, the self-healing ML/AI engine 1080 can be implemented as one of the ML/AI model inference instances 435-1, . . . , 435-N depicted in FIG. 4 for the edge compute unit 430. The self-healing ML/AI engine 1080 can in some cases be included in the native/platform applications 540 of FIG. 5 and/or in the qualified application repository 550 of FIG. 5. In another example, the self-healing ML/AI engine 1080 can be deployed to the user and platform ML/AI applications 655 included in the edge compute unit services 605 of FIG. 6. In some embodiments, the self-healing ML/AI engine 1080 can be implemented for the edge compute unit services 605 of FIG. 6 as a separate or standalone service that is included among the various edge services already shown in FIG. 6 for the edge compute unit services 605. In still another example, in some aspects the self-healing ML/AI engine 1080 may be implemented and/or included in one or more of the local management console 625 of the edge compute unit host 705 of FIG. 7; the edge observer 760 of the edge compute unit host 705 of FIG. 7; the fleet management client 770 of the edge compute unit host 705; and/or as a standalone service, component, engine, entity, etc., that is included within the edge compute unit host 705 of FIG. 7.

In one illustrative example, the self-healing process 1000 can be implemented based on a fault discovery engine 1010 that is configured to receive and analyze various monitoring logs and/or log information 1005 corresponding to a respective edge compute unit (and the associated edge assets connected to or otherwise associated with the respective edge compute unit), and update a troubleshooting repository 1020 with detected faults and/or fault information from the monitoring logs and log information. For instance, the fault discovery engine 1010 can detect, classify, identify, etc., one or more faults indicated in the input stream of monitoring logs and log information 1005. The detected faults can be written by fault discovery engine 1010 to a fault repository 1022 within the troubleshooting repository 1020.

In some aspects, the troubleshooting repository 1020 can additionally include a remediation repository 1025 that stores information indicative of particular remediation actions that were performed in response to a fault and also indicated in the input monitoring logs and logging information 1005 provided to the fault discovery engine 1010. In general, it is contemplated that some types of remediations may be reflected in the various monitoring logs 1005, and these such remediations that are reflected in the monitoring logs 1005 can be detected by the analysis performed using the fault discovery engine 1010 and written to the remediation repository 1025. Other types of remediation actions may not be reflected in the monitoring logs 1005 (for instance, either because the remediation action is of a type that does not generate a corresponding logged or measurable event in the current logging configuration of the edge compute unit, or because the remediation action is of a type that is new and previously unseen by the system 1000). As will be described in greater detail below, the remediation actions that are not reflected in the input monitoring logs 1005 (and/or any other remediation actions that are not detected in the fault discovery engine 1010 analysis) may be captured and written to the remediation repository 1025 at subsequent stages of the self-healing process 1000 (e.g., based on the faulty remedy action 1090 generated by the self-healing ML/AI engine 1080, as will be described below).

In one illustrative example, the self-healing process 1000 and/or self-healing ML/AI engine 1080 can be running continuously on a respective edge compute unit, or other location where the fault discovery engine 1010 is able to monitor all of the faults or logs 1005 that are coming out of different devices subject to the monitoring. For instance, the monitoring logs and log information 1005 ingested to fault discovery engine 1010 can include any monitoring logs and log information generated by or corresponding to the respective edge compute unit itself, and any connected assets or devices provided at the same edge location as the edge compute unit, provided on the local network created by the edge compute unit, or otherwise in communication with the edge compute unit.

The monitoring logs and log information 1005 can be associated with edge compute units themselves (e.g., such as rack health information, monitoring logs for rack power supply, the health of different units, servers, or blades on the racks themselves, etc.). The monitoring logs and log information 1005 can additionally be associated with the various edge devices and/or edge assets that are attached to the edge compute unit or local network created by the edge compute unit (or edge devices/assets that are otherwise streaming data into the edge compute unit, for instance over an internet backhaul link, etc.). For instance, the monitoring logs and log information 1005 can include log streams for any and all sensors that are streaming data to the edge compute device. For example, the monitoring logs and log information 1005 can correspond, at least in part, to some (or all) of the various connected edge assets 710-1, . . . , 710-N shown in FIG. 7 as being associated with and communicating with the edge compute unit host 705. In some aspects, the monitoring logs and log information 1005 of FIG. 10 can further include logging information associated with one or more user devices, such as the user device 795 of FIG. 7.

In one illustrative example, the monitoring logs and log information 1005 of FIG. 10 can be the same as or similar to (or can otherwise include) at least a portion of the various types of monitoring and logging information described previously herein with respect to FIGS. 3-9. For instance, the monitoring logs and log information 1005 of FIG. 10 can be the same as or similar to (or otherwise include) the log stream(s) depicted at the edge compute unit host 705 of FIG. 7 as being generated by the edge observer 760 (e.g., by the application deployment service 757, the host-level telemetry service 737, the critical environment monitoring service 739, or various other services or components included in the edge observer 760 of edge compute unit host 705 of FIG. 7).

The monitoring logs and log information 1005 of FIG. 10 can, in some examples, be obtained from the log archival agent 775 of FIG. 7, which is included in or implemented by the edge compute unit host 705. In some examples, logs or logging information 1005 can be included in the metrics datastore 742 implemented locally by the edge compute unit host 705 of FIG. 7. In some aspects, the logs and logging information 1005 can additionally, or alternatively, include at least a portion of the information stored in the global database of metrics datastore 749, which can be communicated directly from global metrics datastore 749 to the self-healing ML/AI engine 1080 at the edge compute unit host 705, and/or which can be transmitted to the edge compute unit host 705 for storage in the local edge log archival agent 775/metrics datastore 742, from which the self-healing ML/AI engine 1080 implemented at the edge compute unit host 705 can thereby access the information.

In some embodiments, the fault discovery engine 1010 is configured to constantly monitor the incoming monitoring logs 1005 to detect the presence of one or more faults. The fault discovery engine 1010 can create a separate log of all the faults that are being triggered for the edge compute unit (which may also include any false alarms or false faults triggered for the edge compute unit), for instance implemented as the fault repository 1022 and/or troubleshooting repository 1020.

Self-healing process 1000 can be implemented based on the detected faults, false alarms, etc., and various other information stored in the fault repository 1022 and/or troubleshooting repository 1020. In some aspects, the fault discovery engine 1010 can be used to create fault logs from the monitoring logs 1005. In some embodiments, the fault discovery engine 1010 can use one or more logging rules or default rule events to perform the fault detection for input monitoring logs 1005 and/or to determine the fault information that will be written to fault repository 1022 as the fault log.

For example, the fault discovery engine 1010 may implement fault rules corresponding to the type of fault event or fault information that is logged in response to specific occurrences within the monitoring log data 1005. In one illustrative example, a first fault rule can indicate a fault data structure that is to be logged in response to power failing to a particular server rack within the edge compute unit. In another example, a second fault rule can be defined to correspond to (e.g., trigger based on) the fault discovery engine 1010 determining that the streaming frame rate from a particular sensor device (or a particular subset of sensor devices, or sensor types, etc.) has fallen below a configured value, such as a configured bitrate threshold, a configured frame rate threshold, a configure error rate threshold, etc. In general, the fault discovery engine 1010 can be implemented using a plurality of fault rules that correspond to various fault definitions that may be present or otherwise occur within the input monitoring log data 1005 obtained for the edge deployment for which self-healing process 1000 is performed (e.g., obtained for the particular edge compute unit and associated edge devices/assets that are associated with the self-healing process 1000, which may be implemented locally at the same edge site location as the edge compute unit and connected devices/assets).

In some embodiments, the fault discovery engine 1010 can also be referred to as a fault definition engine, and can be used to automatically determine various fault rules and/or fault definitions from input monitoring log data 1005. In some aspects, the fault discovery/definition engine 1010 can be implemented using one or more ML/AI models trained to identify, classify, and/or detect faults in streaming monitoring logs and other logging information, including faults and fault types that are not seen by the ML/AI models during training (e.g., the ML/AI models can be generative of new types or classes of faults, can use a trained or configured hierarchy of known faults, and/or any combination thereof).

In one illustrative example, fault discovery can additionally, or alternatively, be implemented based on using one or more fault injection processes and/or fault modeling processes. For instance, discovered faults and/or corresponding characterizing information for one or more discovered faults can be determined using a fault injection process, a fault modeling process, etc., and can subsequently be stored or otherwise represented in the fault tree 1050 (described in greater detail below). In some aspects, the fault discovery engine 1010 can be used to implement the one or more fault injection processes and/or the one or more fault modeling processes, with the corresponding characterizing information for the faults being used to create (e.g., generate) the fault tree 1050. In some examples, the fault discovery engine 1010 can be used to implement the one or more fault injection processes and/or fault modeling processes, and can use the corresponding characterizing information for the faults to update (e.g., modify, add, remove, expand, etc.) existing fault information that is previously represented within an already generated fault tree 1050.

For instance, in some embodiments, the fault discovery engine 1010 can be used to generate and/or modify (e.g., update, add to, augment, etc.) the fault tree 1050 based on injecting various faults into various components or groups of components within the edge deployment or edge data center apparatus for which the self-healing process 1000 is performed (e.g., the particular edge compute unit and associated edge devices/assets that are communicatively coupled or connected thereto). In some aspects, hardware faults can correspond to various physical failures or issues that can occur with a hardware component. For instance, hardware faults can include (but are not limited to) one or more of physical failures, physical damage, overheating, short-circuits, grounding issues or other electrical power issues, electronic component failures, faulty wiring, radiation, etc.

In some embodiments, the fault discovery engine 1010 can perform fault injection of hardware faults, software faults, and/or any combination thereof. In some aspects, hardware faults may be more challenging to inject, due to their physical nature (e.g., a physical failure may be challenging to simulate or model the corresponding effect without causing the same underlying physical change that would normally trigger the fault). In one illustrative example, the fault discovery engine 1010 can perform fault injection that is based at least in part on injecting software faults that are representative of hardware faults. For instance, an injected software fault can be designed and deployed to accurately represent or otherwise capture the expected behavior of a particular hardware failure (including a chain or series of multiple hardware failures, groups of hardware failures both simultaneous or distributed in time, etc.). By injecting properly designed software faults that are representative of hardware faults within the edge deployment system being monitored by the self-healing process 1000 and/or by the fault discovery engine 1010, one or more fault trees (e.g., fault tree 1050) can be modeled to include the range of expected or possible hardware failures that may occur.

In some aspects, the fault discovery engine 1010 can implement one or more Fault Trees and Failure Modes and Effects Analysis (FMEA) techniques, which are systematic techniques configured for modeling and analyzing hardware failures by considering various failure modes, the respective cause(s) for each failure mode, and the corresponding effect(s) of each failure mode or cause on the system as a whole. In some examples, the corresponding hardware failure that are associated with the fault injection process(es) implemented by the fault discovery engine 1010 can be registered in confirmation validation information. The corresponding one or more mitigations that are determined by the system 1000 for the various hardware failures can be registered in a remediation prescription, such as the remediation prescription 1070 (described in further detail below).

In some approaches to modeling hardware failures, single-cycle, single flip-flop bit-flips may be utilized. For example, such an approach is widely used to study unstable or marginal circuit behaviors, soft errors, dynamic variations, and transient or intermittent hardware failures. However, such approaches may be unable to provide a fully comprehensive understanding of the impacts of hardware failures on the system as a whole. Accordingly, in one illustrative example, the systems and techniques described herein can utilize one or more probabilistic machine learning models to perform improved hardware failure modeling. For instance, the one or more probabilistic machine learning models for improved hardware failure modeling can be implemented in or by, or otherwise associated with, the fault discovery engine 1010. In some embodiments, the one or more probabilistic machine learning models for improved hardware failure modeling can be configured to perform hardware failure modeling based on one or more of: Single-Event Upsets (SEUs); Single-Event Transients (SETs); Stuck-at-Fault models; Delay Fault models; Aging and Wear-Out models; Monte Carlo simulations and/or techniques; Simultaneous Switching Noise (SSN) and Signal Integrity models; Soft Errors and Cross-Talk models; Thermal Analysis models; etc., among various others.

For example, Single Event Upsets (SEUs) may correspond to transient hardware failures caused by ionizing radiation or extreme temperatures. In some aspects, the fault discovery engine 1010 and/or fault injection processes associated with self-healing system 1000 can model various different SEUs or types of SEUs based on using corresponding Bayesian probabilistic models to estimate the likelihood of data corruption due to extreme temperatures, cosmic rays or other sources of radiation.

Single Event Transients SETs may correspond to short-lived voltage disturbances in digital circuits. In some aspects, the fault discovery engine 1010 and/or fault injection processes associated with self-healing system 1000 can model various different SETs or types of SETs by simulating the effects of high-energy particles striking semiconductor devices, for instance using a physics-based deep neural network model, etc.

Stuck-at Fault Models can be implemented based on a modeling assumption that certain nodes or wires (e.g., selected or configured according to the hardware failure(s) being modeled or simulated) are stuck at a logical '0' or '1'. In some aspects, the fault discovery engine 1010 and/or fault injection processes associated with self-healing system 1000 can use one or more Stuck-at-Fault models to test and diagnose digital circuits for manufacturing defects. For instance, the fault discovery engine 1010 and/or fault injection processes associated with self-healing system 1000 can be configured to perform fault injection for a Stuck-at-Fault model by injecting one or more software faults, where certain outputs are forced to logical '0' or '1'.

Delay Fault Models can be implemented to simulate timing-related failures, which can include (but are not limited to) transition delay faults, path delay faults, and bridging faults that can cause incorrect signal timing, etc. In some aspects, the fault discovery engine 1010 and/or fault injection processes associated with self-healing system 1000 can perform fault injection for a Delay Fault model based on using software models and/or software faults where timing delays are introduced in the computations.

Aging and Wear-Out Models can be used to predict (at various different time scales or points in the future, etc.) the potential impact(s) of hardware degradation upon the reliability of an edge compute unit being monitored by the fault discovery engine 1010 and/or self-healing system 1000 of FIG. 10. For instance, Aging and Wear-Out Models can be used to predict the potential impact(s) of hardware degradation upon the reliability of the edge compute unit shown in FIGS. 3A and 3B, the edge compute unit 430 shown in FIG. 4, the edge compute units 704 shown in FIG. 7, etc. For example, as semiconductor devices, server components, or various other hardware and/or compute components and parts within the edge compute unit continue to age (and therefore wear or degrade), one or more of their properties may change. By implementing one or more machine learning models for aging effects, in some aspects, the fault discovery engine 1010 and/or fault injection processes associated with self-healing system 1000 can be configured to predict how these age-related and wear-related component changes impact the reliability of the larger device or edge compute unit in which the component is provided or deployed.

In some embodiments, the fault discovery engine 1010 and/or fault injection processes associated with self-healing system 1000 can utilize Monte Carlo techniques to probabilistically model hardware failures. For example, by running a sufficient quantity of Monte Carlo simulations with random variations in parameters, the likelihood of specific failures occurring can be estimated from the results of the Monte Carlo simulations.

In another example, Simultaneous Switching Noise (SSN) and Signal Integrity models can be implemented by the fault discovery engine 1010 and/or fault injection processes associated with self-healing system 1000 to perform fault discovery and fault injection processes that are focused on modeling (and updating the fault tree 1050 to reflect the results of the modeling) the effects of noise, crosstalk, and electromagnetic interference in high-speed digital systems. In some aspects, the fault discovery engine 1010 and/or fault injection processes associated with self-healing system 1000 can utilize one or more Soft Errors and Cross-Talk models configured to address issues related to soft errors caused by alpha particles or noise-induced errors due to interference from neighboring signals.

In some aspects, the systems and techniques described herein can utilize one or more thermal analysis models to estimate or predict the impact of thermal effects on potential failures, failure modes, and the corresponding probabilities or likelihoods thereof. For instance, the fault discovery engine 1010 can implement thermal analysis models and/or thermal analysis modeling to characterize how temperature variations (e.g., the temperature of ambient air or the environment within/enclosed by the housing of the edge compute unit, and/or the temperature of a hardware component itself while under operation, etc.) can lead to hardware failures. Characterizing the relationship between temperature variations and hardware failures can be particularly beneficial when applied by the fault discovery engine 1010 to discover, predict, and/or characterize thermal-related hardware faults that can occur in high-performance computing systems, such as GPUs, TPUs, Field-Programmable Gate Arrays (FPGAs), Application-Specific Integrated Circuits (ASICs), Vector Processors, InfiniBand and High-Performance Interconnects, multi-core and wide-vector units, accelerators, and heterogenous general-purpose and specialized computation systems, etc., among various others.

Notably, in at least some embodiments, it is contemplated that the fault discovery engine 1010 and the self-healing system 1000 can utilize various different combinations and/or configurations of the various probabilistic ML models for improved hardware failure modeling in order to create highly detailed fault trees and fault tree information (e.g., such as fault tree 1050, or fault tree information thereof, etc.). Additionally, the configuration and selection of the probabilistic hardware failure ML models by or for the self-healing system 1000 and fault-discovery engine 1010 can further be used to enable the creation of corresponding conformation validation rules (e.g., the conformance rules 1065 implemented by the conformance validation engine 1060, both described in greater detail below) as well as to enable the creation of diagnostic-to-actions information and/or remedial actions (e.g., included within the remediation prescription 1070, the fault remedy action 1090, etc., both described in greater detail below). Over time, the systems and techniques can grow the fault discovery and fault characterization information that is stored in the troubleshooting repository 1020 and/or that is encoded within or otherwise represented by (e.g., associated with) one or more nodes within the fault tree 1050 and/or that is associated with the remediation prescription(s) 1070 and fault remedy action(s) 1090. For instance, as a plurality of edge compute units are deployed across various different edge locations, users and user bases, usage scenarios, operational demands and parameters, etc., the self-healing system 1000 can be configured to iterate over time to update the underlying hardware failure models associated with predicting and characterizing hardware failure information for the edge compute units and their edge deployments.

In some embodiments, the systems and techniques described herein can implement the self-healing system 1000 based on using accelerated lifecycle testing to check and validate the probabilistic ML models for hardware failures. Accelerated lifecycle testing is a methodology to evaluate the performance, durability, and reliability of a product or component in a shorter period than its actual expected lifecycle. For instance, accelerated lifecycle testing can be performed based on subjecting the device, component, module, product, system under test, etc., to extreme conditions, stressors, or environmental factors to simulate the effects of long-term use in a compressed timeframe. The goal of accelerated lifecycle testing is to identify design flaws, weaknesses, or potential failure modes that may arise during the normal lifespan of the product, wherein the identified information can be used to update the fault tree 1050 and/or remediation prescription 1070 accordingly.

The detected or discovered faults (and corresponding fault information thereof) are stored in a fault repository 1022, which itself may be included in the troubleshooting repository 1020. In one illustrative example, the troubleshooting repository 1020 can be created and maintained over time to be indicative of the remedial action(s) that are taken for each fault or combination of faults that have been detected. For instance, the troubleshooting repository 1020 includes the fault repository 1022 that stores detected faults, and includes the remediation repository 1025 that stores remediation actions taken in response to detected faults.

In some aspects, the fault repository 1022 can store each detected fault as a unique instance or entry. In some aspects, the fault repository 1022 can use each unique fault type (and/or each unique combination of faults, and/or each unique linked sequence of faults) as a key or pointed to the different instances of the unique fault type. Unique faults can be considered any given occurrence of a fault (e.g., fault A at time $t_1$ is different from fault B at time $t_2$), any unique combination of faults (e.g., {fault A, fault B, fault C} is different from {fault A, fault B} is different from {fault A, fault B, fault C, fault D}, etc.), any unique sequence of linked or chained faults (e.g., {fault A, fault B, fault C} is different from {fault A, fault C, fault B}, etc.).

In some aspects, the fault repository 1022 and/or the self-healing process 1000 can be implemented based on considering combinations or sequences (e.g., series or chains) of multiple faults. For instance, at least some faults do not occur in isolation, and instead trigger one fault after another. In other words, the self-healing process 1000 can, in at least some embodiments, be implemented to reflect the occurrence of cascading faults and/or to reflect the potential correlations, codependences, and various other relationships between faults and fault occurrences.

In one illustrative example, the troubleshooting repository 1020 can be used to determine a mapping between faults or combination of faults that are observed, and one or more remedial actions taken in response to remedy those faults. For instance, the remedial actions (e.g., remediations stored in remediation repository 1025) can include actions such as hot swapping of a fault hardware unit for a replacement hardware unit of the same type, replacing a failed camera or other sensor, etc. The scope of remedial actions that may be reflected by the remediation repository 1025 and/or otherwise evaluated by the self-healing process 1000 can extend to include whatever remedies have been previously taken or are currently taken in response to a certain set of faults occurring or being detected. In some embodiments, a mapping between a particular or unique fault (or combination of faults) to a remedial action (or combination of remedial actions) can be referred to as a remedial action prescription, or remediation prescription, as will be described in more detail below.

In one illustrative example, the self-healing process 1000 can use a fault tree construction engine 1040 to generate a fault tree 1050 based on the faults and remediations that are stored in the troubleshooting repository 1020. The fault tree construction engine 1040 can additionally be used to update, modify, maintain, etc. an already created fault tree 1050 based on new information made available to the self-healing process 1000.

The fault tree engine 1040 can generate the fault tree 1050 to provide a mapping between the space of possible faults (as reflected in fault repository 1022) and the space of possible (or successful) remedial actions, as reflected in remediation repository 1025. The fault tree 1050 can include a plurality of different root nodes, representing the different possible starting faults of each fault combination in the fault repository 1022. Various layers of child nodes and branching paths therebetween are used to represent the different combinations of faults/fault sequences that have been observed for the different starting faults provided at the root node level of the hierarchical fault tree. For example, the faults {A, B, C} and {A, B, D} can share the top-level root node for fault A, can share the child node of fault B, but diverge into faults C and D at the next child node layer, etc.

The constructed fault tree 1050 can represent a plurality of mappings between faults and remedial actions as unique paths of the fault tree 1050. For instance, each [fault, remediation] pair that is represented in troubleshooting repository 1020 can be represented in the fault tree 1050 as a path from a root-level node (corresponding to the first fault of the combination) to a leaf node corresponding to the remediation. In other words, different remediation actions are mapped to different faults (and combinations of faults) based on including the remediation action as a leaf node in the constructed fault tree 1050 (e.g., a leaf node being a bottom-level node that has no further child nodes).

In some embodiments, the fault tree 1050 and/or fault tree engine 1040 can be used to build a decision tree that is indicative of an optimal or suggested remedial action to be taken given an input combination or sequence comprising one or more faults. For instance, in some cases only a single remedial action is mapped to a particular fault combination-based on traversing the fault tree 1050 in the order of the input combination of faults that is being queried, the suggested remedial action will be the remedy action located at the leaf node of the particular path traversed through the fault tree 1050. In other examples, multiple possible remedial actions may be available for a particular fault or combination/sequence of faults. In such examples, the fault tree 1050 can include one or more weight values on the branches between various nodes, to allow a path cost computation or other computation to be accumulated in order to determine the optimal remediation action to be suggested based on an input/query combination or sequence of faults.

In one illustrative example, the fault tree 1050 can be analyzed or otherwise used to identify (e.g., by the self-healing ML/AI engine 1080 and/or self-healing system 1000) critical paths or combinations of events that correspond to top-level or critical failure events. For instance, the fault tree 1050 can be analyzed to identify the critical paths or combinations of events that lead to each respective top-level/critical failure of a plurality of identified top-level/critical failures known to the system 1000. In some embodiments, the critical paths can be representative of the most significant risks to system reliability (e.g., the reliability of the system, such as an edge compute unit deployment, etc.) being monitored. For the most critical paths, in some examples the systems and techniques can implement self-healing 1000 based on the development and implementation of respective mitigation measures to reduce the likelihood of each failure, including each top-level/critical failure, from occurring. In some aspects, in addition to implementing the mitigation measures within the remediation prescription 1070 and/or the fault tree 1050, mitigation measures can additionally include the use or configuration of multiple redundant components, improved monitoring, preventative maintenance, and/or various backup systems or modules. Various example of such mitigation measures are previously described above with respect to the Resiliency and Redundancy: Software Stack and Hardware Provisioning section herein, although it is noted that such example is not intended to be construed as limiting with respect to the scope of potential mitigation measures that are contemplated herein.

In some embodiments, the fault tree 1050 and/or fault decision tree is updated over time based on a learning process implemented using the self-healing ML/AI engine 1080. Based on the learning over time, the systems and techniques can improve the mapping and understanding of which remedial actions should be taken in response to which sets of faults, and the corresponding decision thereof (e.g., fault tree diagnostics) can be built, stored, and/or otherwise reflected in the fault tree 1050. For instance, the fault tree 1050 can be implemented as a dynamic data structure that is updated in substantially real-time, for instance as new or refined fault information and/or remediation actions or information become available to the self-healing system 1000 and fault tree construction engine 1040. The dynamic and real-time nature of the fault tree 1050 can be used to drive continuous improvement efforts for the reliability and resiliency of the system being monitored (e.g., the one or more edge compute unit deployments being monitored by the self-healing system 1000). For instance, a dynamic and substantially real-time fault tree 1050 can be implemented based on regularly assessing the effectiveness of some (or all) of the plurality of mitigation measures within the remediation prescription 1070. Based on the regular assessment of the mitigation measures within remediation prescription 1070, adjustments can be made as needed to enhance the hardware resiliency of the edge compute unit(s) described herein. In some examples, the fault tree 1050 can be regularly reviewed, analyzed, and updated as new fault and/or mitigation and/or remediation data and insights become known or otherwise available to the self-healing system 1000. In some aspects, one or more monitoring entities (e.g., watchdogs, etc.) can be used to continuously monitor and test the edge compute unit and server/compute hardware therein, for example to detect and automatically address potential failure modes and events in real-time. In some cases, a failure that occurs but was not previously predicted by the one or more probabilistic ML models described previously above can be triaged and root-cause analyzed to one or more underlying hardware failures within the edge compute unit and/or the edge compute unit deployment. Based on the triage and root-cause analysis of the previously unseen and unencountered fault (e.g., hardware failure), the corresponding probabilistic ML models can be automatically updated, along with their respective conformation validation rules 1065 and remedial actions within remediation prescription 1070).

In some embodiments, the self-healing ML/AI engine 1080 can be configured to implement the self-healing process of FIG. 10 based on assigning or otherwise determining respective probabilities to each failure mode represented within the fault tree 1050. For instance, individual failure mode probabilities can be implemented based on historical data, manufacture specification, and/or external engineering analysis, among various other inputs and data sources. In some cases, the determination of respective failure mode probabilities can be used to improve the quantification of the respective likelihood of specific failure scenarios occurring, based on past (historical) data and manufacturer's specifications and testing. In some aspects, the individual failure mode probability determination process can be implemented beginning by identifying the critical components in the bill of materials (BOM) of the particular edge compute unit or other apparatus or system that is to be monitored by the self-healing system 1000 and the self-healing ML/AI engine 1080 of FIG. 10. For instance, the critical components in the BOM that may be analyzed can include, but are not limited to, one or more of power supplies, hard drives, cooling systems, memory modules, etc. For each BOM component that is analyzed, a list of potential failure modes for each individual component can be determined. For example, hard drive failure modes may include (but are not limited to) one or more of mechanical failure, electronic failure, and/or data corruption. Each potential failure mode for the respective BOM components that are analyzed can be associated to a corresponding one of the plurality of probabilistic ML models implemented by the self-healing system and process 1000 of FIG. 10, and as previously described above.

In some aspects, the self-healing process 1000 can learn a plurality of different fault decision trees. In some examples, each respective fault tree 1050 may uniquely correspond to a particular edge compute unit, a particular edge deployment site, a particular user or enterprise entity associated with the edge compute unit or site, a particular combination of edge compute unit and connected edge devices/assets, etc. In some embodiments, different respective fault decision tress 1050 can be constructed for different types or classes of faults. For instance, the fault tree construction engine 1040 can be configured to generate one or more fault trees corresponding to power supply faults, one or more fault trees corresponding to networking and connectivity faults, one or more fault trees corresponding to compute rack faults, etc. In some embodiments, individual fault trees may be referenced by other fault trees. For instance, one or more master or parent fault trees 1050 can be generated by the fault tree construction engine 1040 to include references or pointers to individual or more specific fault trees, such as the sub-system fault trees in the example above, etc.

In one illustrative example, the self-healing ML/AI engine 1080 can be configured to implement one or more ML/AI models that are constructed and/or trained based on the aforementioned process of discovering and learning the available faults and remedial actions for the self-healing process 1000. In some embodiments, the self-healing ML/AI engine 1080 can implement a diagnostics-to-action model corresponding to fault remediation at the edge compute unit.

The diagnostics-to-action model implemented and learned by the self-healing ML/AI engine 1080 can include a conformance validation 1060 that is used to more uniquely adapt the diagnostics-to-action model to a particular edge compute unit, a particular user or enterprise entity, and/or a particular set of availability information for replacement parts and maintenance labor that is available for the edge compute unit being monitored in the self-healing process 1000. These factors and this information is represented in FIG. 10 as the conformance rules and conditions 1065, provided as input to a conformance validation engine 1060 coupled to the self-healing ML/AI engine 1080.

The conformance validation engine 1060 can be used to reduce or filter the available remedial action space of the fault tree 1050 to a narrower remedial action space that contains only remedial actions that are validated as conforming to the rules or conditions imposed by the conformance information 1065. For instance, each remedial action in the fault tree 1050 may not always be remedial, or might not be permitted, or might not solve the problem of fixing the faults, etc. The conformance validation engine 1060 can be configured to analyze the remedial actions (e.g., leaf nodes) of the fault tree 1050 against a set of known conformance rules and conditions 1065, to remove (e.g., prune) from the fault tree 1050 any non-conforming remedial actions.

For instance, the fault tree 1050 may include various faults related to lost or degraded satellite internet constellation connectivity-one possible remediation is to replace the entire satellite internet terminal on the edge compute unit. However, this remediation is inappropriate in at least some scenarios, such as when the fault is more minor (e.g., a minor, user-serviceable component has failed and just that component needs to be replaced rather than the entire satellite terminal; etc.) and/or when the remediation itself is non-optimal or even impossible (e.g., satellite terminal replacement should be removed as a remedial action when the current inventory of satellite terminals available at the edge site/available for the edge compute unit is zero; etc.).

In general, the conformance rules and conditions 1065 and the conformance validation engine 1060 can be used to prune the fault tree 1050 (which is representative of all possible remediation actions, without incorporating context and process-dependent information of the edge deployment) to reflect the limitations imposed by the context and process-dependent information of the particular edge deployment that is being monitored by the self-healing process 1000. For instance, the conformance rules and conditions 1065 may indicate maximum permissible down times for certain features, functionalities, components, etc., of the edge compute unit, and the fault tree 1050 can be pruned (by conformance validation engine 1060) to remove remediation actions that would require more time than the maximum permissible down time. For example, the conformance information 1065 may indicate a maximum permissible downtime of satellite internet constellation connectivity of 24 hours-based on sourcing a replacement satellite internet terminal requiring greater than 24 hours, the conformance validation engine 1060 can remove the remediation action of replacing the satellite internet terminal from some (or all) of the instances where that remediation action appears in the full fault tree 1050.

Based on building the conformance validation 1060 for the diagnostic model encoded in the fault tree 1050 and/or encoded in the behavior of the self-healing ML/AI engine 1080, the systems and techniques can generate automated fault remediation recommendations using a remediation prescription 1070 that comprises the full fault tree 1050 pruned to reflect the conformance information 1065/the conformance validation 1060 analysis.

In some aspects, the self-healing process 1000 can be implemented as a three-stage process, including a first stage of fault discovery that is used to characterize the space of possible faults and the space of possible remediations; a second stage of fault definition that maps faults and fault combinations to remediation actions and combinations thereof; and a third stage of fault prescription, which performs the conformance validation and configures the self-healing ML/AI engine to automatically recommend remediation actions from the pruned remediation prescription information/decision tree 1070.

As noted above, the conformance validation 1060 and conformation information 1065 can be tailored to be unique or specific to a particular deployment of edge compute units and associated edge assets/devices, to a specific use case, to a specific user or enterprise entity, etc. For example, conformance validation information 1065 for an oil rig deployment location may indicate that when a power source to the edge compute unit is seeing significant amounts of fluctuation in its output power, the remedy of replacing the power source is non-conformant and should be made unavailable for suggestion (e.g., based on the remoteness of the oil rig making a replacement power source shipping and/or installation impractical). The conformance validation information 1065 for the oil rig deployment may additionally indicate that various physical (e.g., human, manual, etc.) remediation actions are non-conformant and also should be made unavailable for suggestion, because they do not conform to the availability of a qualified or skilled electrician on site (e.g., on the oil rig) that is able to perform the manual intervention needed for the remedial action in question.

Continuing in the example above, the conformance validation 1060 perform for the oil rig deployment scenario may additionally modify the available remediation prescription 1070 to indicate that a second-best or second-preference remedial action should be suggested from the fault tree 1050 for the power source fluctuation fault (e.g., the second-best remedial action of switching to a backup power supply until an alarm or alert notification is transmitted for a qualified electrician to come on-site to replace or troubleshoot the main power line that is seeing the large amount of fluctuations).

In some embodiments, the self-healing ML/AI engine 1080 can be configured to generate fault remedy actions 1090 that are a combination of software remediation processes, hardware remediation processes, and one or more human (e.g., manual or physical, etc.) processes. For instance, the self-healing ML/AI engine 1080 can be configured to correct itself and generate various prescriptions or fault remedy actions 1090 to self-heal. Some of the healing or corrective remedial actions that are suggested by the self-healing ML/AI engine 1080 in a fault remedy action 1090 may require human or other physical resources to carry them out. For instance, swapping a blade of a GPU in response to a GPU overheat fault that has burned out one of the blades may be a simple remedy, but no automated system is available for blade swapping and human intervention is required to perform the physical remediation.

Accordingly, the self-healing ML/AI engine 1080 can generate suggested fault remedy actions 1090 that require human or physical intervention, but can also generate a backup remedy action that can be implemented if the human labor is unavailable to perform the physical intervention and/or if the human labor is not available within a required timeframe to perform the physical intervention. For instance, continuing in the example above of a GPU blade replacement, the backup remediation may be to switch the workload of the failed blade over to another GPU blade available on the rack. If there are no remaining GPU blades available on the rack (e.g., all blades are being used for other applications or workloads that require constant availability, for instance for monitoring camera feeds or implementing a continuous computer vision process, etc., and all GPU resources are engaged completely). In another example, the backup remediation of switching the workload of the failed blade over to another GPU blade may be implemented on the condition that the switch is performed only if the primary remediation (physical intervention to switch out for a replacement blade) cannot be performed within 4 hours from the time of detection.

In some aspects, the self-healing ML/AI engine 1080 can be used to perform a continuous refinement of one or more (or all) of the fault repository 1022 information, the remediation repository 1025 information, the fault tree 1050 information, and/or the conformation validation 1060/conformance information 1065. For instance, the self-healing ML/AI engine 1080 can receive continuous or periodic feedback information indicative of which remedial actions have been successful in resolving a combination of faults, which remedial actions have been unsuccessful or only partly successful in resolving a combination of faults, etc. Based on this feedback information, the systems and techniques can refine or otherwise update the fault tree 1050 mapping between faults and fault combinations and remediations and remediation combinations.

The self-healing ML/AI engine 1080 can additionally receive continuous or periodic feedback information indicative of inventory information of replacement components and/or physical intervention and maintenance labor skills available at the edge deployment site, etc. Based on this feedback information, the systems and techniques can refine or otherwise update the conformance validation 1060 analysis and/or the remediation prescription 1070 based on the current conditions at the edge deployment site, etc. The updated conformation validation 1060 analysis and/or the remediation prescription 1070 can drive corresponding updates and refinements to the self-healing ML/AI engine 1080 and the resultant fault remedy action recommendations 1090 generated by the self-healing ML/AI engine 1080.

In some examples, the systems and techniques described herein can be implemented or otherwise performed by a computing device, apparatus, or system. In one example, the systems and techniques described herein can be implemented or performed by a computing device or system having the computing device architecture 1100 of FIG. 11. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Processes described herein can comprise a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
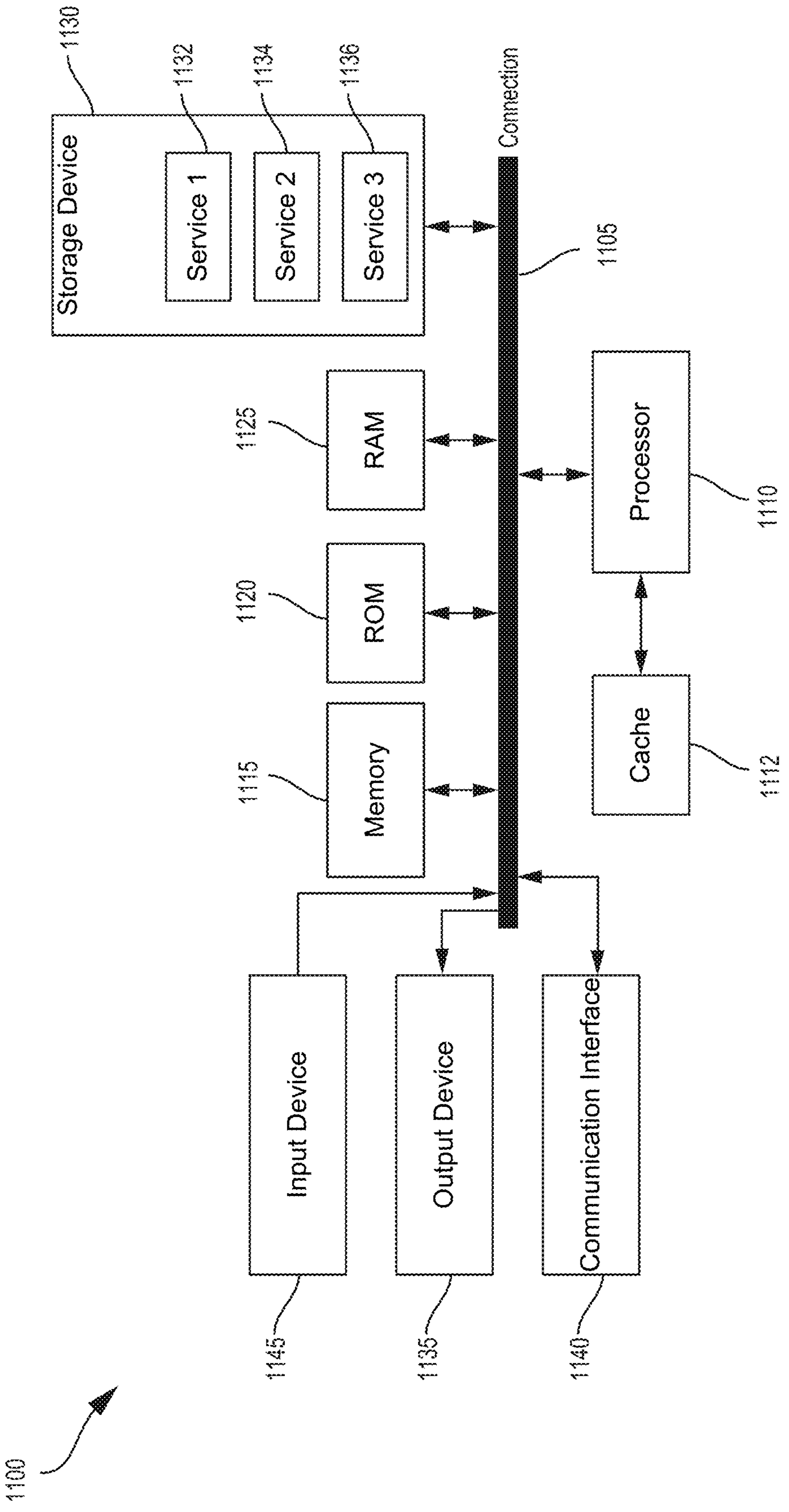
FIG. 11 is a block diagram illustrating an example of a computing system architecture that can be used to implement one or more aspects described herein, bin accordance with some examples.

FIG. 11 illustrates an example computing device architecture 1100 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 1100 are shown in electrical communication with each other using connection 1105, such as a bus. The example computing device architecture 1100 includes a processing unit (CPU or processor) 1110 and computing device connection 1105 that couples various computing device components including computing device memory 1115, such as read only memory (ROM) 1120 and random-access memory (RAM) 1125, to processor 1110.

Computing device architecture 1100 can include a cache of high-speed memory connected directly with, in close proximity to, or integrated as part of processor 1110. Computing device architecture 1100 can copy data from memory 1115 and/or the storage device 1130 to cache 1112 for quick access by processor 1110. In this way, the cache can provide a performance boost that avoids processor 1110 delays while waiting for data. These and other engines can control or be configured to control processor 1110 to perform various actions. Other computing device memory 1115 may be available for use as well. Memory 1115 can include multiple different types of memory with different performance characteristics. Processor 1110 can include any general-purpose processor and a hardware or software service, such as service 1 1132, service 2 1134, and service 3 1136 stored in storage device 1130, configured to control processor 1110 as well as a special-purpose processor where software instructions are incorporated into the processor design. Processor 1110 may be a self-contained system, containing multiple cores or processors, a bus, memory controller, cache, etc. A multi-core processor may be symmetric or asymmetric.

To enable user interaction with the computing device architecture 1100, input device 1145 can represent any number of input mechanisms, such as a microphone for speech, a touch-sensitive screen for gesture or graphical input, keyboard, mouse, motion input, speech and so forth. Output device 1135 can also be one or more of a number of output mechanisms known to those of skill in the art, such as a display, projector, television, speaker device, etc. In some instances, multimodal computing devices can enable a user to provide multiple types of input to communicate with computing device architecture 1100. Communication interface 1140 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. Storage device 1130 can include services 1132, 1134, 1136 for controlling processor 1110. Other hardware or software modules or engines are contemplated.

Storage device 1130 can be connected to the computing device connection 1105. In one aspect, a hardware module that performs a particular function can include the software component stored in a computer-readable medium in connection with the necessary hardware components, such as processor 1110, connection 1105, output device 1135, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

The term "network entity" or "base station" may refer to a single physical Transmission-Reception Point (TRP) or to multiple physical Transmission-Reception Points (TRPs) that may or may not be co-located. For example, where the term "network entity" or "base station" refers to a single physical TRP, the physical TRP may be an antenna of a base station (e.g., satellite constellation ground station/internet gateway) corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Because a TRP is the point from which a base station transmits and receives wireless signals, as used herein, references to transmission from or reception at a base station are to be understood as referring to a particular TRP of the base station.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("$<$") and greater than ("$>$") symbols or terminology used herein can be replaced with less than or equal to ("$\leq$") and greater than or equal to ("$\geq$") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method comprising: obtaining monitoring log information corresponding to an edge device and a plurality of connected edge assets associated with the edge device; detecting, based on the monitoring log information, a plurality of faults for the edge device or for one or more connected edge assets of the plurality of connected edge assets; obtaining remediation information indicative of one or more remediation actions performed for individual faults or combinations of faults included in the plurality of faults; generating a hierarchical fault tree data structure mapping between the plurality of faults and the remediation information, wherein each fault of the plurality of faults corresponds to a root node or child node of the fault tree, and wherein each remediation action corresponds to a leaf node of the fault tree; providing an indication of one or more faults to a self-healing machine-learning (ML) or artificial intelligence (AI) engine configured to generate a corresponding fault remediation action based on traversing the hierarchical fault tree according to the indicated one or more faults; and outputting the fault remediation action for self-healing of the indicated one or more faults.

Aspect 2. The method of Aspect 1, further comprising: obtaining conformance information corresponding to one or more of the edge device, the plurality of connected edge assets, or an edge site deployment location of the edge device; and pruning the fault tree based on using the conformance information to remove leaf nodes corresponding to non-conforming remediation actions.

Aspect 3. The method of Aspect 2, wherein pruning the fault tree is based on analyzing the conformance information to a conformance validation engine.

Aspect 4. The method of any of Aspects 2 to 3, wherein the conformance information includes one or more conformance rules or conformance conditions corresponding to the edge site deployment location or inventory availability information for the edge site deployment location.

Aspect 5. The method of any of Aspects 2 to 4, wherein pruning the fault tree includes generating remediation prescription information indicative of a subset of conforming remediation actions included in the one or more remediation actions.

Aspect 6. The method of Aspect 5, wherein the self-healing ML or AI engine generates the corresponding fault remediation action based on traversing a decision tree based on one or more of the fault tree or the remediation prescription.

Aspect 7. The method of any of Aspects 1 to 6, further comprising: performing a first continuous learning process to update or refine a space of possible faults included in the plurality of faults; or performing a second continuous learning process to update or refine a space of possible remediation actions included in the one or more remediation actions.

Aspect 8. The method of Aspect 7, further comprising: performing a third continuous learning process to update or refine the mapping between the plurality of faults and the remediation information; or performing a fourth continuous learning process to update or refine the fault map based on updated conformance information corresponding to a limited subset of permissible remediation actions for a deployment site location of the edge compute unit.

Aspect 9. The method of any of Aspects 1 to 8, wherein detecting the plurality of faults includes: analyzing the monitoring log information using one or more hardware failure machine learning models, wherein the one or more hardware failure machine learning models generate as output failure probability information corresponding to at least a portion of the plurality of faults.

Aspect 10. The method of Aspect 9, wherein the one or more hardware failure machine learning models are configured to generate failure probability information corresponding to one or more of: single-event upset (SEU) hardware faults, single-event transient (SET) hardware faults, stuck-at-fault or delay-fault hardware fault events, or thermal modeling hardware fault events.

Aspect 11. The method of any of Aspects 9 to 10, further comprising updating the hierarchical fault tree data structure based on the generated failure probability information determined using the one or more hardware failure machine learning models.

Aspect 12. The method of Aspect 11, further comprising updating the hierarchical fault tree data structure based on a comparison between predicted faults corresponding to the generated failure probability information, and observed faults determined from the monitoring log information.

Aspect 13. An apparatus comprising: at least one memory; and at least one processor coupled to the at least one memory, the at least one processor configured to: obtain monitoring log information corresponding to an edge device and a plurality of connected edge assets associated with the edge device; detect, based on the monitoring log information, a plurality of faults for the edge device or for one or more connected edge assets of the plurality of connected edge assets; obtain remediation information indicative of one or more remediation actions performed for individual faults or combinations of faults included in the plurality of faults; generate a hierarchical fault tree data structure mapping between the plurality of faults and the remediation information, wherein each fault of the plurality of faults corresponds to a root node or child node of the fault tree, and wherein each remediation action corresponds to a leaf node of the fault tree; provide an indication of one or more faults to a self-healing machine-learning (ML) or artificial intelligence (AI) engine configured to generate a corresponding fault remediation action based on traversing the hierarchical fault tree according to the indicated one or more faults; and output the fault remediation action for self-healing of the indicated one or more faults.

Aspect 14. The apparatus of Aspect 13, wherein the at least one processor is further configured to: obtain conformance information corresponding to one or more of the edge device, the plurality of connected edge assets, or an edge site deployment location of the edge device; and prune the fault tree based on using the conformance information to remove leaf nodes corresponding to non-conforming remediation actions.

Aspect 15. The apparatus of Aspect 14, wherein the at least one processor is configured to prune the fault tree based on analyzing the conformance information using a conformance validation engine.

Aspect 16. The apparatus of any of Aspects 14 to 15, wherein the conformance information includes one or more conformance rules or conformance conditions corresponding to the edge site deployment location or inventory availability information for the edge site deployment location.

Aspect 17. The apparatus of any of Aspects 14 to 16, wherein the at least one processor is configured to prune the fault tree based on generating remediation prescription information indicative of a subset of conforming remediation actions included in the one or more remediation actions.

Aspect 18. The apparatus of Aspect 17, wherein the self-healing ML or AI engine generates the corresponding fault remediation action based on traversing a decision tree based on one or more of the fault tree or the remediation prescription.

Aspect 19. The apparatus of any of Aspects 13 to 18, wherein the at least one processor is further configured to: perform a first continuous learning process to update or refine a space of possible faults included in the plurality of faults; or perform a second continuous learning process to update or refine a space of possible remediation actions included in the one or more remediation actions.

Aspect 20. The apparatus of Aspect 19, wherein the at least one processor is configured to: perform a third continuous learning process to update or refine the mapping between the plurality of faults and the remediation information; or perform a fourth continuous learning process to update or refine the fault map based on updated conformance information corresponding to a limited subset of permissible remediation actions for a deployment site location of the edge compute unit.

Aspect 21. The apparatus of any of Aspects 13 to 20, wherein, to detect the plurality of fault, the at least one processor is configured to: analyze the monitoring log information using one or more hardware failure machine learning models, wherein the one or more hardware failure machine learning models generate as output failure probability information corresponding to at least a portion of the plurality of faults.

Aspect 22. The apparatus of Aspect 21, wherein the one or more hardware failure machine learning models are configured to generate failure probability information corresponding to one or more of: single-event upset (SEU) hardware faults, single-event transient (SET) hardware faults, stuck-at-fault or delay-fault hardware fault events, or thermal modeling hardware fault events.

Aspect 23. The apparatus of any of Aspects 21 to 22, wherein the at least one processor is further configured to update the hierarchical fault tree data structure based on the generated failure probability information determined using the one or more hardware failure machine learning models.

Aspect 24. The apparatus of Aspect 23, wherein the at least one processor is further configured to update the hierarchical fault tree data structure based on a comparison between predicted faults corresponding to the generated failure probability information, and observed faults determined from the monitoring log information.

Aspect 25. A non-transitory computer-readable storage medium comprising instructions stored thereon which, when executed by at least one processor, causes the at least one processor to: obtain monitoring log information corresponding to an edge device and a plurality of connected edge assets associated with the edge device; detect, based on the monitoring log information, a plurality of faults for the edge device or for one or more connected edge assets of the plurality of connected edge assets; obtain remediation information indicative of one or more remediation actions performed for individual faults or combinations of faults included in the plurality of faults; generate a hierarchical fault tree data structure mapping between the plurality of faults and the remediation information, wherein each fault of the plurality of faults corresponds to a root node or child node of the fault tree, and wherein each remediation action corresponds to a leaf node of the fault tree; provide an indication of one or more faults to a self-healing machine-learning (ML) or artificial intelligence (AI) engine configured to generate a corresponding fault remediation action based on traversing the hierarchical fault tree according to the indicated one or more faults; and output the fault remediation action for self-healing of the indicated one or more faults.

Aspect 26. The non-transitory computer-readable storage medium of Aspect 25, wherein the at least one processor is further configured to: obtain conformance information corresponding to one or more of the edge device, the plurality of connected edge assets, or an edge site deployment location of the edge device; and prune the fault tree based on using the conformance information to remove leaf nodes corresponding to non-conforming remediation actions.

Aspect 27. The non-transitory computer-readable storage medium of Aspect 26, wherein the at least one processor is configured to prune the fault tree based on analyzing the conformance information using a conformance validation engine.

Aspect 28. The non-transitory computer-readable storage medium of any of Aspects 26 to 27, wherein the conformance information includes one or more conformance rules or conformance conditions corresponding to the edge site deployment location or inventory availability information for the edge site deployment location.

Aspect 29. The non-transitory computer-readable storage medium of any of Aspects 26 to 28, wherein the at least one processor is configured to prune the fault tree based on generating remediation prescription information indicative of a subset of conforming remediation actions included in the one or more remediation actions.

Aspect 30. The non-transitory computer-readable storage medium of Aspect 29, wherein the self-healing ML or AI engine generates the corresponding fault remediation action based on traversing a decision tree based on one or more of the fault tree or the remediation prescription.

Aspect 31. The non-transitory computer-readable storage medium of any of Aspects 25 to 30, wherein the at least one processor is further configured to: perform a first continuous learning process to update or refine a space of possible faults included in the plurality of faults; or perform a second continuous learning process to update or refine a space of possible remediation actions included in the one or more remediation actions.

Aspect 32. The non-transitory computer-readable storage medium of Aspect 31, wherein the at least one processor is configured to: perform a third continuous learning process to update or refine the mapping between the plurality of faults and the remediation information; or perform a fourth continuous learning process to update or refine the fault map based on updated conformance information corresponding to a limited subset of permissible remediation actions for a deployment site location of the edge compute unit.

Aspect 33. The non-transitory computer-readable storage medium of any of Aspects 25 to 32, wherein, to detect the plurality of faults, the at least one processor is configured to: analyze the monitoring log information using one or more hardware failure machine learning models, wherein the one or more hardware failure machine learning models generate as output failure probability information corresponding to at least a portion of the plurality of faults.

Aspect 34. The non-transitory computer-readable storage medium of Aspect 33, wherein the one or more hardware failure machine learning models are configured to generate failure probability information corresponding to one or more of: single-event upset (SEU) hardware faults, single-event transient (SET) hardware faults, stuck-at-fault or delay-fault hardware fault events, or thermal modeling hardware fault events.

Aspect 35. The non-transitory computer-readable storage medium of any of Aspects 33 to 34, wherein the at least one processor is further configured to update the hierarchical fault tree data structure based on the generated failure probability information determined using the one or more hardware failure machine learning models.

Aspect 36. The non-transitory computer-readable storage medium of Aspect 35, wherein the at least one processor is further configured to update the hierarchical fault tree data structure based on a comparison between predicted faults corresponding to the generated failure probability information, and observed faults determined from the monitoring log information.

What is claimed is:

1. A method comprising:

obtaining monitoring log information corresponding to an edge device comprising a containerized edge data center unit and a plurality of connected edge assets associated with the edge device, the monitoring log information including at least one of rack health information, power supply monitoring information, or sensor data streams from the plurality of connected edge assets;

detecting, based on the monitoring log information, a plurality of faults for the edge device or for one or more connected edge assets of the plurality of connected edge assets;

obtaining remediation information indicative of one or more remediation actions performed for individual faults or combinations of faults included in the plurality of faults;

generating a hierarchical fault tree data structure mapping between the plurality of faults and the remediation information, wherein each fault of the plurality of faults corresponds to a root node or child node of the fault tree, and wherein each remediation action corresponds to a leaf node of the fault tree;

obtaining conformance information corresponding to one or more of the edge device, the plurality of connected edge assets, or an edge site deployment location of the edge device;

pruning the fault tree based on analyzing the conformance information using a conformance validation engine, to remove leaf nodes corresponding to non-conforming remediation actions;

generating, in response to an indication of one or more faults provided to a self-healing machine-learning (ML) or artificial intelligence (AI) engine, a corresponding fault remediation action for each fault of the indicated one or more faults based on traversing the hierarchical fault tree according to the indicated one or more faults; and outputting the fault remediation action for self-healing of the indicated one or more faults.

2. The method of claim 1, wherein the conformance information includes one or more conformance rules or conformance conditions corresponding to the edge site deployment location or inventory availability information for the edge site deployment location.

3. The method of claim 1, wherein pruning the fault tree includes generating remediation prescription information indicative of a subset of conforming remediation actions included in the one or more remediation actions.

4. The method of claim 3, wherein the self-healing ML or AI engine generates the corresponding fault remediation action based on traversing a decision tree based on one or more of the fault tree or the remediation prescription.

5. The method of claim 1, further comprising:

performing a first continuous learning process to update or refine a space of possible faults included in the plurality of faults; or performing a second continuous learning process to update or refine a space of possible remediation actions included in the one or more remediation actions.

6. The method of claim 5, further comprising:

performing a third continuous learning process to update or refine the mapping between the plurality of faults and the remediation information; or performing a fourth continuous learning process to update or refine the fault map based on updated conformance information corresponding to a limited subset of permissible remediation actions for a deployment site location of the containerized edge data center unit.

7. The method of claim 1, wherein detecting the plurality of faults includes:

analyzing the monitoring log information using one or more hardware failure machine learning models, wherein the one or more hardware failure machine learning models generate as output failure probability information corresponding to at least a portion of the plurality of faults.

8. The method of claim 7, wherein the one or more hardware failure machine learning models are configured to generate failure probability information corresponding to one or more of: single-event upset (SEU) hardware faults, single-event transient (SET) hardware faults, stuck-at-fault or delay-fault hardware fault events, or thermal modeling hardware fault events.

9. The method of claim 7, further comprising updating the hierarchical fault tree data structure based on the generated failure probability information determined using the one or more hardware failure machine learning models.

10. The method of claim 9, further comprising updating the hierarchical fault tree data structure based on a comparison between predicted faults corresponding to the generated failure probability information, and observed faults determined from the monitoring log information.

11. An apparatus comprising:

at least one memory; and at least one processor coupled to the at least one memory, the at least one processor configured to:

obtain monitoring log information corresponding to an edge device comprising a containerized edge data center unit and a plurality of connected edge assets associated with the edge device, the monitoring log information including at least one of rack health information, power supply monitoring information, or sensor data streams from the plurality of connected edge assets;

detect, based on the monitoring log information, a plurality of faults for the edge device or for one or more connected edge assets of the plurality of connected edge assets;

obtain remediation information indicative of one or more remediation actions performed for individual faults or combinations of faults included in the plurality of faults;

generate a hierarchical fault tree data structure mapping between the plurality of faults and the remediation information, wherein each fault of the plurality of faults corresponds to a root node or child node of the fault tree, and wherein each remediation action corresponds to a leaf node of the fault tree;

obtain conformance information corresponding to one or more of the edge device, the plurality of connected edge assets, or an edge site deployment location of the edge device;

prune the fault tree based on analyzing the conformance information using a conformance validation engine, to remove leaf nodes corresponding to non-conforming remediation actions;

generate, in response to an indication of one or more faults provided to a self-healing machine-learning (ML) or artificial intelligence (AI) engine, a corresponding fault remediation action for each fault of the indicated one or more faults based on traversing the hierarchical fault tree according to the indicated one or more faults; and output the fault remediation action for self-healing of the indicated one or more faults.

12. The apparatus of claim 11, wherein the conformance information includes one or more conformance rules or conformance conditions corresponding to the edge site deployment location or inventory availability information for the edge site deployment location.

13. The apparatus of claim 11, wherein the at least one processor is configured to prune the fault tree based on generating remediation prescription information indicative of a subset of conforming remediation actions included in the one or more remediation actions.

14. The apparatus of claim 13, wherein the self-healing ML or AI engine generates the corresponding fault remediation action based on traversing a decision tree based on one or more of the fault tree or the remediation prescription.

15. The apparatus of claim 11, wherein the at least one processor is further configured to:

perform a first continuous learning process to update or refine a space of possible faults included in the plurality of faults; or perform a second continuous learning process to update or refine a space of possible remediation actions included in the one or more remediation actions.

16. The apparatus of claim 15, wherein the at least one processor is configured to:

perform a third continuous learning process to update or refine the mapping between the plurality of faults and the remediation information; or perform a fourth continuous learning process to update or refine the fault map based on updated conformance information corresponding to a limited subset of permissible remediation actions for a deployment site location of the containerized edge data center unit.

* * * * *